(12) United States Patent
Misbhauddin et al.

(10) Patent No.: US 9,158,503 B2
(45) Date of Patent: Oct. 13, 2015

(54) UML MODEL INTEGRATION AND REFACTORING METHOD

(71) Applicants: KING FAHD UNIVERSITY OF PETROLEUM AND MINERALS, Dhahran (SA); KING ABDULAZIZ CITY FOR SCIENCE AND TECHNOLOGY, Riyadh (SA)

(72) Inventors: Mohammed Misbhauddin, Dammam (SA); Mohammad Alshayeb, Dhahran (SA)

(73) Assignees: KING FAHD UNIVERSITY OF PETROLEUM AND MINERALS, Dhahran (SA); KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 238 days.

(21) Appl. No.: 14/049,112

(22) Filed: Oct. 8, 2013

(65) Prior Publication Data
US 2015/0100942 A1 Apr. 9, 2015

(51) Int. Cl.
*G06F 9/44* (2006.01)
(52) U.S. Cl.
CPC ... *G06F 8/20* (2013.01); *G06F 8/72* (2013.01)
(58) Field of Classification Search
CPC .................................... G06F 8/20; G06F 8/72
USPC ........................................................ 717/104
See application file for complete search history.

(56) References Cited

U.S. PATENT DOCUMENTS

| | | | |
|---|---|---|---|
| 8,234,303 B2 | 7/2012 | Bahl et al. | |
| 8,312,418 B2 | 11/2012 | Cowan et al. | |
| 2008/0127049 A1 | 5/2008 | Elaasar | |
| 2008/0134135 A1* | 6/2008 | Elaasar | 717/104 |
| 2009/0113380 A1* | 4/2009 | Ploesser et al. | 717/104 |
| 2009/0235229 A1 | 9/2009 | Dangeville et al. | |
| 2010/0146479 A1 | 6/2010 | Arsanjani et al. | |
| 2010/0269096 A1 | 10/2010 | Araya et al. | |
| 2011/0067003 A1 | 3/2011 | Slothouber et al. | |
| 2012/0060142 A1 | 3/2012 | Fliess et al. | |
| 2012/0192143 A1* | 7/2012 | Elaasar | 717/104 |

OTHER PUBLICATIONS

Jancke, Sebastian, and Armin B. Cremers. "Smell detection in context." University of Bonn (2010).*
Wong, Sunny, et al. "Detecting design rule violations." Drexel University, Tech. Rep. DU-CS-10-01, 2010.*
Misbhauddin, M. and Alshayeb, M., "Extending the UML Metamodel for Sequence Diagram to Enhance Model Traceability", 2010 Fifth International Conference on Software Engineering Advances (ICSEA), Aug. 22-27, 2010, pp. 129-134.

* cited by examiner

*Primary Examiner* — Li B Zhen
*Assistant Examiner* — Arshia S Kia
(74) *Attorney, Agent, or Firm* — Richard C. Litman

(57) ABSTRACT

The UML model integration and refactoring method steps include extending the metamodels, composing an integrated UML model derived from the extended metamodels, defining refactoring opportunities and transformation operations during the integrated UML composition, and applying a set of composite refactorings to remove an identified smell from the integrated UML model.

26 Claims, 78 Drawing Sheets

| | |
|---|---|
| Use Case: Perform Transaction<br>UC-ID: 005 | `<?xml version="1.0" encoding="UTF-8"?>`<br>`<UseCaseModel>` |
| SCOPE: System | `<Actor id="actor_0" name="Customer" type="Human" num_roles="1"/>` |
| LEVEL: Primary Task | `<Actor id="actor_1" name="Bank System" type="NetworkSystem" num_roles="1"/>` |
| PRIORITY: High | `<UseCase actor-ref="actor_0" id="UC-005" name="Perform Transaction"` |
| ASYNCHRONOUS<br>Lost Connectivity<br>*(System is not connected)*<br>   1. Display Error Message<br>   2. Terminate User Session<br>   3. Use Case End | isAbstract="false">    6500b<br>`<Supporting actor-ref="actor_1"/>`<br>`<Description scope="System" level="PrimaryTask" Priority="high"/>`<br>`<Precondition>`<br>   `<Constraint>` |
| PRECONDITIONS<br>System is Connected |       `<Entity name="System"/>`<br>      `<Relation name="equals"/>` |
| ACTOR<br>  PRIMARY<br>    Customer<br>  SUPPORTING<br>    Bank System |       `<Value name="Connected"/>`<br>   `</Constraint>`<br>`</Precondition>`<br>`<Postcondition>`<br>  `<Success>` |
| MAIN FLOW<br>1. *Include* Login<br>2. System Displays a list of Transactions<br>3. Customer Selects Transaction<br>4. {Transfer}<br>5. {Pay Bill}<br>6. System displays Transaction Summary<br>7. Use Case Ends |    `<Constraint>`<br>      `<Entity name="Transaction"/>`<br>      `<Relation name="equals"/>`<br>      `<Value name="Successful"/>`<br>   `</Constraint>`<br>  `</Success>`<br>  `<Failure>` |
| ALTERNATIVE FLOW<br>6 (a) Customer Selects Print<br>1. The system sends the summary to the Printer<br>2. Return: 6 |    `<Constraint>`<br>      `<Entity name="Transaction"/>`<br>      `<Relation name="equals"/>`<br>      `<Value name="Failed"/>` |
| SUCCESS POST-CONDITION<br>Transaction is Successful |    `</Constraint>`<br>  `</Failure>` |
| FAILURE POST-CONDITION<br>Transaction failed | `</Postcondition>`<br>`<AsyncExtend name="Lost Connectivity" uc-ref="UC-013">` |
| EXTENSION POINTS<br>Transfer [transaction = transfer] : Transfer, return: 6<br>Pay Bill [transaction = pay] : PayBill, return: 6 |    `<Constraint>` |

6500a (label for left table); 6500b (label for right XML)

*Fig. 65A*

```xml
<Step step-no="3">
    <Sender name="Customer"/>
    <Receiver name="System"/>
    <Action type="action" name="select"/>
    <Argument name="transaction"/>
</Step>
<Step step-no="4">
    <ExternalVariation extPoint="Transfer"/>
```
274
```xml
</Step>
<Step step-no="5">
<ExternalVariation extPoint="Pay Bill"/>
</Step>
<Step step-no="6">
<Sender name="System"/>
<Receiver name="Customer"/>
<Action type="action" name="display"/>
<Argument name="tranbsaction summary"/>
</Step>
</Transaction>
</MainFlow>
<AlternativeFlow variationStep="6" sequence="a">
<Constraint>
<Entity name="selection"/>
<Relation name="equals"/>
<Value name="print"/>
</Constraint>
<Transaction order="1">
<Step step-no="1">
<Sender name="System"/>
<Receiver name="Printer"/>
<Action type="action" name="send"/>
<Argument name="summary"/>
</Step>
</Transaction>
<RejoinLocation step="6"/>
</AlternativeFlow>
</UseCase>
</UseCaseModel>
```

*Fig. 65C*

UML MODEL INTEGRATION AND REFACTORING METHOD

BACKGROUND OF THE INVENTION

1. Field of the Invention

The present invention relates to Unified Modeling Language (UML) metamodeling with respect to refactoring, and particularly to a UML model integration and refactoring method that integrates use case, object constraint language (OCL), sequence, and class description metamodels.

2. Description of the Related Art

Code refactoring is a "disciplined technique for restructuring an existing body of code, altering its internal structure without changing its external behavior", undertaken in order to improve some of the nonfunctional attributes of the software. Code refactoring provides improved code readability and reduced complexity to improve the maintainability of the source code, as well as a more expressive internal architecture or object model to improve extensibility.

By continuously improving the design of code, developers make it easier and easier to work with. This is in sharp contrast to what typically happens, which is little refactoring and a great deal of attention paid to expediently adding new features. Continuous refactoring of code makes it easier to extend and maintain code.

Typically, refactoring is done by applying a series of standardized basic "micro-refactorings", each of which is a (usually) tiny change in a computer program's source code that either preserves the behavior of the software or at least does not modify its conformance to functional requirements. Many development environments provide automated support for carrying out the mechanical aspects of these basic refactorings.

In computer programming, code smell is any symptom in the source code of a program that possibly indicates a deeper problem. Code smells are usually not bugs. They are not technically incorrect and don't currently prevent the program from functioning. Instead, they indicate weaknesses in design that may be slowing down development or increasing the risk of bugs or failures in the future. Refactoring is usually motivated by noticing a code smell. For example, the method at hand may be very long, or it may be a near duplicate of another nearby method. Once recognized, such problems can be addressed by refactoring the source code, or transforming it into a new form that behaves the same as before, but that no longer "smells". For a long routine, one or more smaller subroutines can be extracted; or for duplicate routines, the duplication can be removed and replaced with one shared function. Failure to perform refactoring can result in accumulating technical debt.

There are two general categories of benefits to the activity of refactoring. Maintainability is a benefit because it makes it easier to fix bugs due to the fact that the source code is easy to read and the intent of its author is easy to grasp. This might be achieved by reducing large monolithic routines into a set of individually concise, well-named, single-purpose methods. It might be achieved by moving a method to a more appropriate class, or by removing misleading comments. Extensibility is a benefit because it makes it easier to extend the capabilities of the software application if it uses recognizable design patterns, and it provides some flexibility where none before may have existed.

Software development utilizes a systematic approach to design and development in the software engineering discipline. Methodologies can either be expressed in natural language description, or by a modeling language if the underlying methodology is complex and non-trivial. Since software design is composed of diagrams and elements that refer to each other in complicated manner, it is more viable for it to be expressed by a modeling language, rather than described through natural language.

Due to the popularity of the Object-oriented (OO) paradigm, UML has been adopted as a modeling language to express OO development methodology. Gonzalez-Perez and Henderson-Sellers defined a relationship between a methodology, model, and a metamodel as, "If a methodology is a model, creating that methodology is modeling, whereas creating the language concepts used to describe the methodology is metamodeling".

The Object Management Group currently defines the UML language using a metamodel. The UML specification document defines the metamodel in terms of abstract syntax in which a class diagram describes the abstract syntax of UML, which is composed of meta-classes and meta-associations. A meta-class describes each model element (e.g. Class, Attribute, Lifeline, Use case etc.) and meta-associations describe the interrelationships between these meta-classes. The syntax of UML is well defined and unambiguous.

The UML specification document metamodel definition includes well-formedness Rules, i.e., the specification of constraints on instances of the meta-classes (that represent the UML language constructs) is through a set of well-formedness rules. These constraints for well formedness are semiformal, specified by a combination of OCL expressions and an informal description.

Moreover, the UML specification document metamodel definition includes semantics, which describe the meanings of the meta-classes introduced in the abstract syntax. Semantics of the metamodel consists of natural language description of the language constructs and their collaboration. Although the use of natural language makes them easier to understand, it also includes some incomplete and ambiguous information.

One of the main reasons of why UML is popular among OO developers is because it allows extension or even modification of the base language metamodel in order to adapt the language to a specific situation or domain. Lightweight extension mechanism and Heavyweight extension mechanism are extension mechanism categories provided by UML.

Lightweight extension mechanisms are termed as lightweight because they do not add new model elements to the UML metamodel. UML profiles are used to implement these types of extensions. A UML Profile is a collection of extensions that are packaged together to customize UML for a particular domain. It specifies a set of standard elements, well-formedness rules and semantics, beyond those specified by the UML metamodel. A UML profile consists of stereotypes, tagged values and constraints.

Tagged values allow association of user defined variables or metadata to a model element. A tag value is represented by a name-value pair and must be compatible with the constraints of the base class of the model element. Constraints, on the other hand, allow addition of semantic restrictions to the model elements. Constraints, similar to UML semantics, are written in OCL and must also be compatible with the constraints of the base class of the model element. Tagged values and constraints are grouped under a meaningful name that forms a stereotype.

Stereotypes are defined as an extension to the UML model elements, which implies that the tagged values and constraints it contains are associated with the model element implicitly. The keywords <<stereotype>>, <<TaggedValue>> and <<Constraint>> are used when including them in the extended metamodel. The relationship between stereotypes, tagged values, and constraints as part of a UML profile metamodel is shown in FIG. 11.

Adding new elements in the form of meta-classes, and defining suitable metadata and meta-associations is referred to as heavyweight extension. These extensions are guided by the Meta-Object Facility's (MOF) meta-metamodel language. The MOF meta-metamodel is a standard provided by OMG for specifying, interchanging, and extending the UML metamodel. The metamodel constructed by using the heavyweight extension mechanism is more expressive, but might end up with an exceedingly complex notation.

Both these approaches have their share of advantages and disadvantages. Using the lightweight extension mechanism allows the availability of standard UML notation, and hence, generic UML tools could be used. On the other hand, the stereotypes must adhere to the constraints of the base element it extends, which severely limits its expressiveness.

Using the heavyweight extension mechanism makes the metamodel incompatible with UML-compliant tools, as the notation would not conform to the UML standard. However, using this extension mechanism allows addition of any desired feature to the metamodel.

Instances of the UML metamodel form a suite composed of all the UML models. UML models are classified into three categories, based on the aspect of the system they describe. These categories are referred to as views, including structural view, behavioral view, and functional view. The structural view includes diagrams that capture the physical organization of the basic elements (classes, objects etc.) in the system. It describes the static structure of the system.

The behavioral view includes diagrams that focus on the interactions between the elements in the system. This view represents how elements work together, interact, and respond to the environment. The functional view is a collection of diagrams that depict how a system is supposed to work, modeling the workflow and business processes. It captures information about the system from the user's perspective. An integrated approach combining these three views is desired, and the aforementioned refactoring should be applied thereto.

Thus, a UML model integration and refactoring method solving the aforementioned problems is desired.

SUMMARY OF THE INVENTION

The Unified Modeling Language (UML) model integration and refactoring method steps include extending the metamodels, composing an integrated UML model derived from the extended metamodels, defining refactoring opportunities and transformation operations during the integrated UML composition, and applying a set of composite refactorings to remove an identified smell from the integrated UML model.

These and other features of the present invention will become readily apparent upon further review of the following specification and drawings.

BRIEF DESCRIPTION OF THE DRAWINGS

FIGS. 65A-65C is a computer program listing showing an exemplary use case flow description and its equivalent XMI according to the present invention.

Similar reference characters denote corresponding features consistently throughout the attached drawings.

DETAILED DESCRIPTION OF THE PREFERRED EMBODIMENTS

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method described herein. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

The Unified Modeling Language (UML) model integration and refactoring method steps include extending a plurality of metamodels, composing an integrated UML metamodel derived from the extended metamodels, defining refactoring opportunities and transformation operations during the composition of the integrated UML, and applying a set of composite refactorings to remove identified smells from the integrated UML model.

The present method automatically detects and corrects code smells in the integrated UML model. The code smells subject to the present refactoring method include creeping featurism, multiple personality, excessive alternation, undue familiarity, spider's web, specters' smell, model duplication, and ripple effect smell.

Figure 1A:
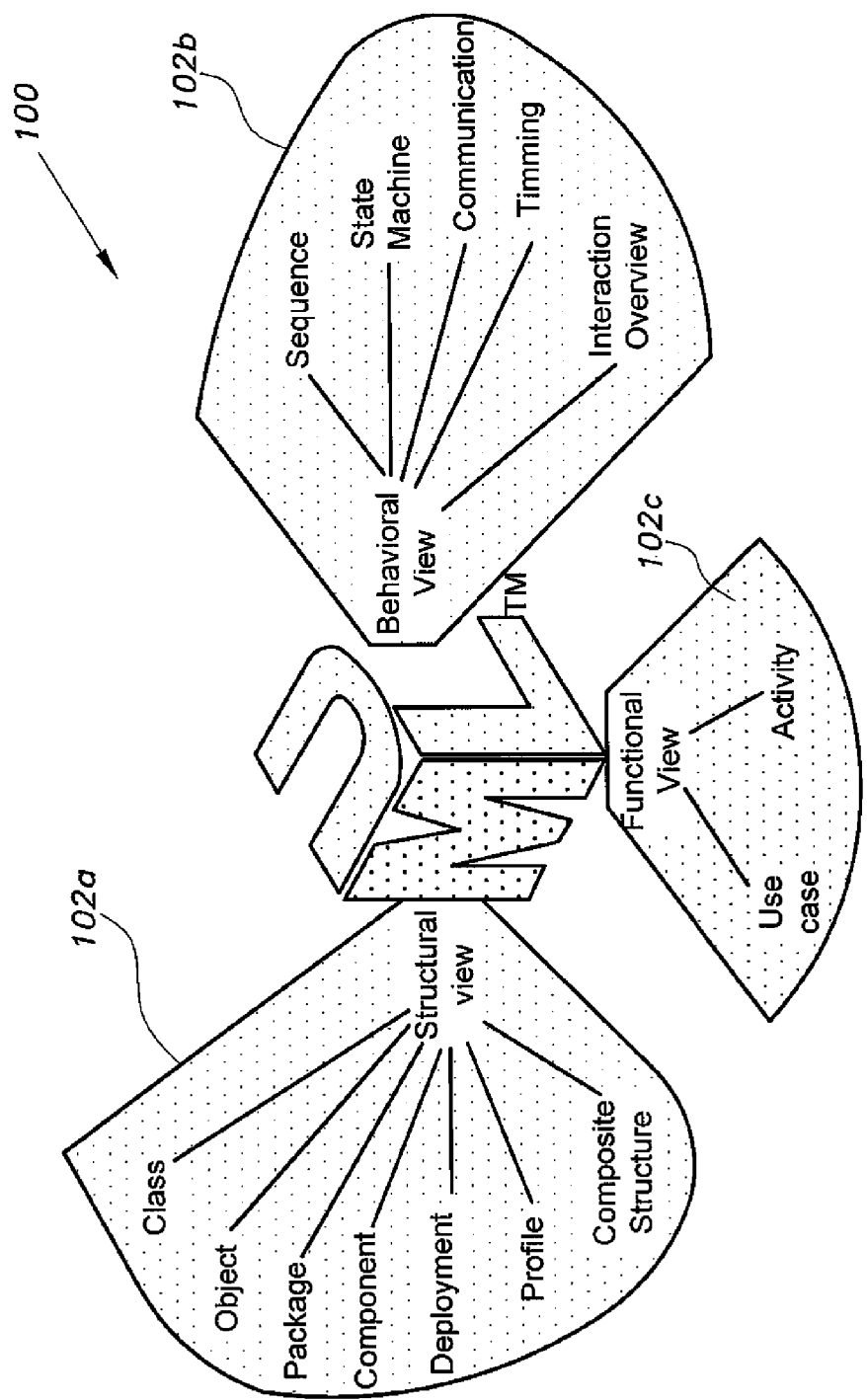
FIG. 1A is a diagram showing classification of UML diagrams into structural, behavioral, and functional views.
Figure 1B:
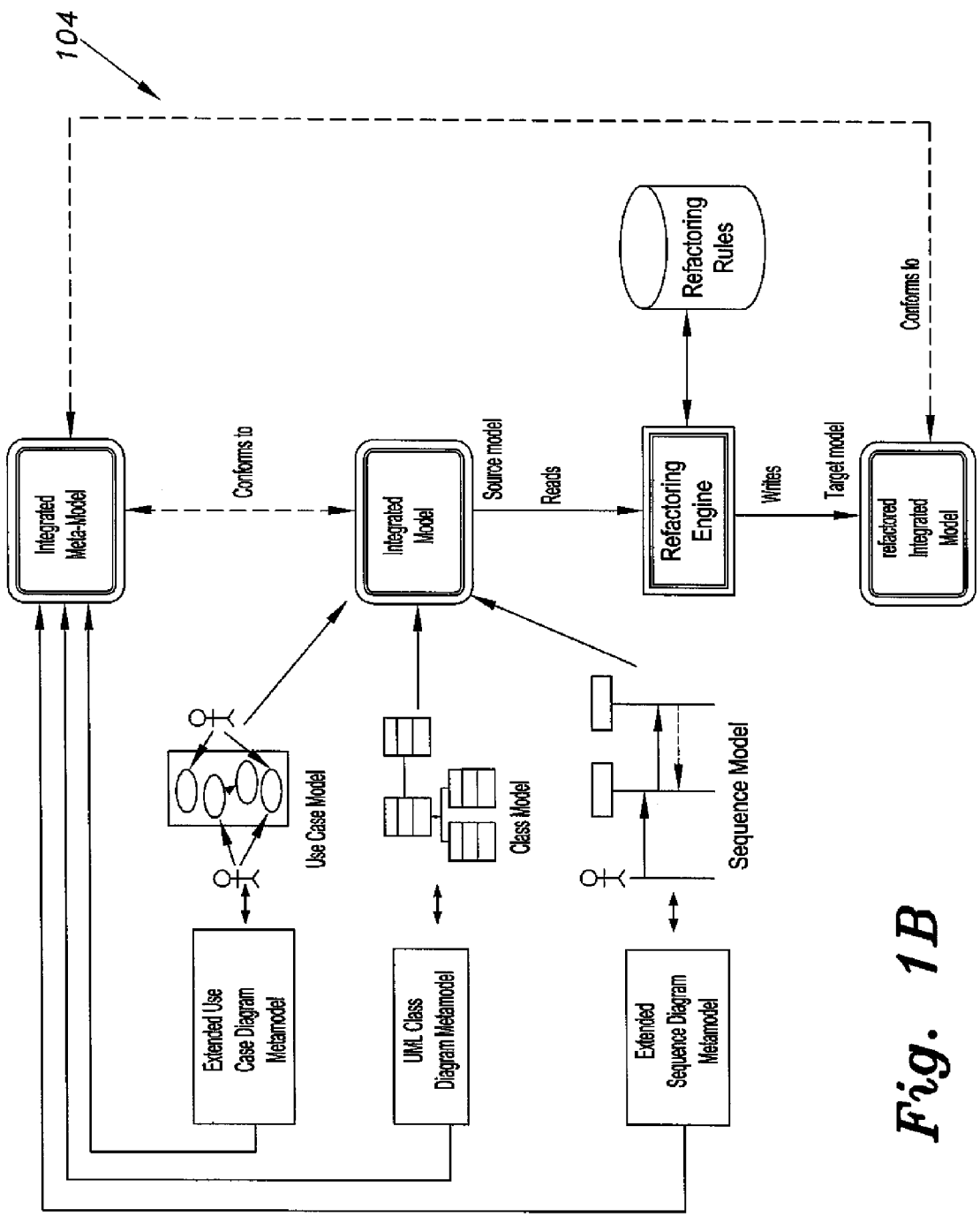
FIG. 1B is a block diagram showing integration and refactoring components that implement the integration and refactoring method.

Diagram 100 of FIG. 1A depicts the structural, behavioral, and functional UML model views which the present invention uses to construct an integrated UML model. The Integrated Metamodel of the present invention is composed of one model from each view. Class diagram from structural view 102a, sequence diagram from behavioral view 102b and use case diagram from functional view 102c are used as core models for composing the integrated metamodel. Although UML metamodel does not differentiate between model elements, subsets of UML metamodel are referred to herein as class diagram metamodel, sequence diagram metamodel and use case diagram metamodel. These subsets include all model elements that are used when constructing respective models. Block diagram 100b of FIG. 1B depicts integration and refactoring components 104 which implement the integration and refactoring method.

The class diagram represents the structural view of an object-oriented system. It includes a set of classes designating important entities of the system modeled. Along with classes, a class diagram also includes relationships between these classes. It is the most common diagram and considered as the backbone for modeling object-oriented systems. As is generally known, a class diagram is defined as outlined in Table 1.

TABLE 1

Definition of class diagram

Figure 2:
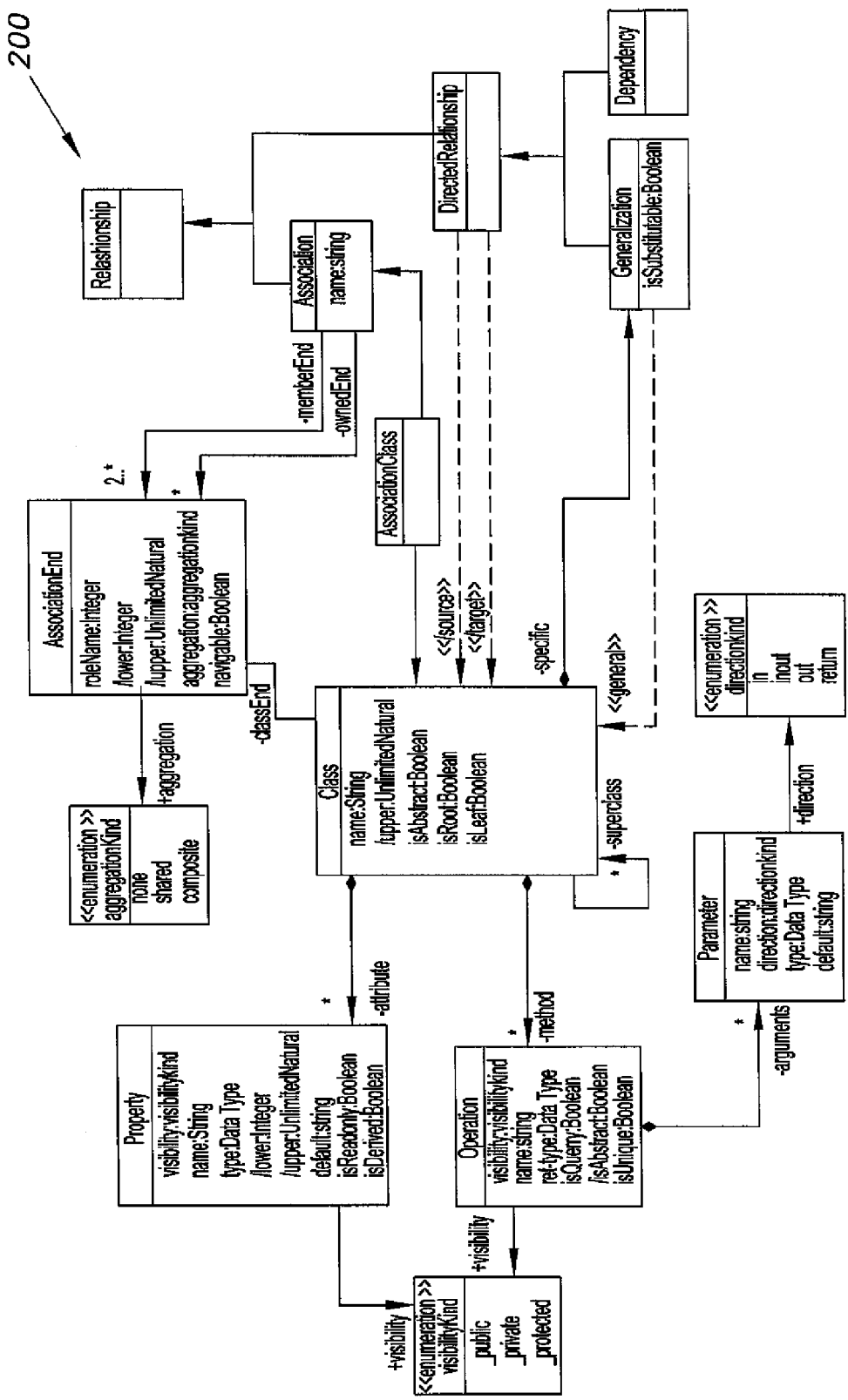
FIG. 2 is a block diagram showing subset of the UML class diagram metamodel according to the present invention.

Definition 4.1: A class diagram is a 4-tuple CD = { $\mathbb{C}, \mathbb{A}, \mathbb{R}, WF_{CD}$ } where:
$\mathbb{C}$ is a non-empty finite set of classes
$\mathbb{A}$ is a finite set of associations
$\mathbb{R} \in \mathbb{C} \times \mathbb{C}$ is the relationship between classes
$WF_{CD}$ is a set of well-formedness rules on the Class Diagram CD The UML specification document describes the UML abstract syntax in the form of a class diagram representing the UML metamodel and well-formedness rules. The UML class diagram metamodel is composed of a number of metaclasses. Some of these metaclasses may not be useful for the intended application of refactoring; hence, a UML Class diagram metamodel subset 200 to be used for the integrated model is shown in FIG. 2. The metamodel for class diagram is used as-is without any extension. The reason for not extending the class diagram metamodel is that it is extensively and precisely described in the UML specification.

The sequence diagram represents the dynamic view of an object oriented system. The main purpose of a sequence diagram is to capture dynamic behavior of a system. This is realized by modeling flow of events leading to a desired result. Formally, a sequence diagram can be defined as outlined in Table 2.

TABLE 2

Definition of sequence diagram

Definition 4.2: A sequence diagram is a 7-tuple SEQ = $\{\mathbb{L}, End, Mes, \mathbb{E}, \leq, fragment, WF_{SEQ}\}$ where:
$\mathbb{L}$ is a finite set of lifelines
End is a finite set of end locations
Mes is a finite set of message labels
$\mathbb{E} \subseteq End \times Mes \times End$ is the relationship (event) between lifelines
$\leq \subseteq End \times End$ is a partial order providing the position of ends within each of the lifelines
fragment is an ordered set of fragments in the sequence diagram
$WF_{SEQ}$ is a set of well-formedness rules on the Sequence Diagram SEQ Vital information made available reading a sequence diagram are the messages that are sent between objects as well as the order in which they occur. This information is conveyed along the horizontal and vertical dimensions of the diagram. Moving through the vertical dimension from left to right, we can identify the objects between which the messages are exchanged and moving along the horizontal dimension from top to bottom provides the time sequence of these messages. Objects on a sequence diagram are depicted as a "lifeline" which includes a dotted line along the vertical axis, which extends for the period of the interaction. In general, messages are shown with arrows moving from the sending object to the receiving object. Different messages are depicted by different styles of arrows. Each message contains two events: a send event occurring at the sender's end of the message and a receive event occurring at the receiver' end of the message.

Figure 3:
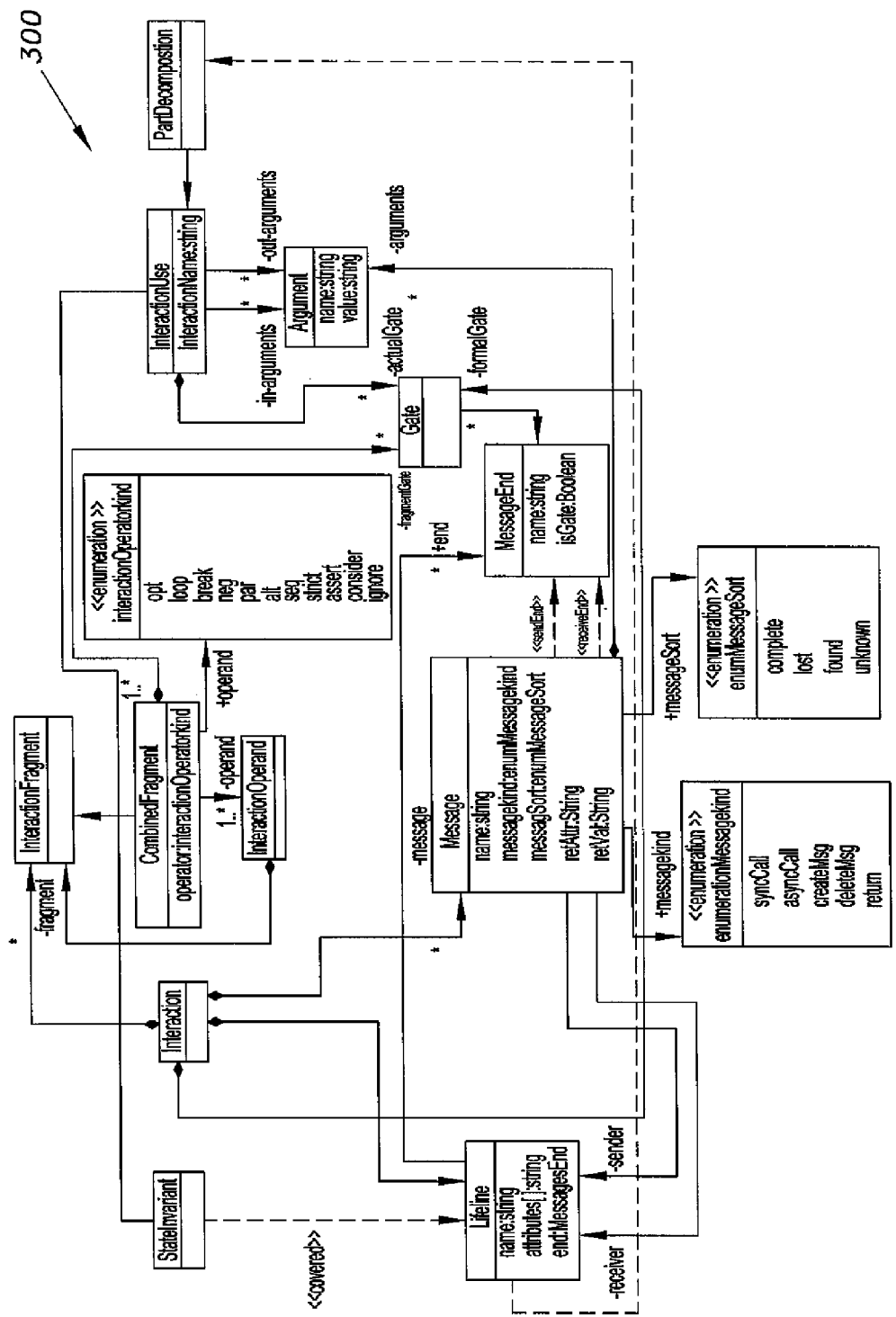
FIG. 3 is a block diagram showing subset of the UML sequence diagram metamodel according to the present invention.

Similar to that of the Class diagram, the UML Specification document also describes the Sequence Diagram metamodel by an abstract syntax in the form of a class diagram and the well-formedness rules. A subset 300 of the UML Sequence diagram metamodel to be used for the integrated model is shown in FIG. 3.

The main motivation for proposing an extension to the UML metamodel for sequence diagram is to make it easier to integrate with the other metamodels. Apart from this, the extended metamodel accommodates future extensions made to sequence diagram notations. By extensions we mean either integration of domain-specific information or modeling syntactic variability due to difference in comprehension. It will allow advanced UML modelers to define domain-specific extensions to the sequence diagram in a precise and usable manner. Furthermore, this modification also provides ease of mapping program code to sequence diagrams thereby providing a means of validating consistency between them. Extensions to Sequence diagram notations and metamodel have been proposed quite a few times in the literature.

The UML sequence diagram metamodel contains a metaclass called "CombinedFragment". The UML specification provides twelve types of combined fragments that are given by an enumerated attribute called "InteractionOperatorKind". The present extended sequence diagram metamodel restructures the combined fragment logic by suggesting a change to the abstract syntax and well-formedness rules of the metamodel elements. Initially two new meta-classes SingleOperand and MultiOperand are introduced. The motivation behind the inclusion of these meta-classes is to remove the well-formedness rule (WF_SEQ Rule 6) enforced through constraints on the sequence diagram in the UML specification. Based on this rule, all the sub-classes of the meta-class SingleOperand can have only one operand in its body. These two meta-classes are defined similar to the manner of meta-class description in the UML specification as follows in Table 3.

TABLE 3

Definition of SingleOperand and MultipleOperand Metaclasses

SingleOperand Metaclass
   Description
      SingleOperand is an abstract meta-class, which declares a combined fragment with only one single operand in its body definition. SingleOperand is a specialization of CombinedFragment.
   Associations
      InteractionOperand—the operand of the fragment
MultipleOperand Metaclass
   Description
      MultipleOperand is an abstract meta-class, which declares a combined fragment with more than one single operand in its body definition. MultipleOperand is a specialization of CombinedFragment.
   Attributes
      isStrict—if false, the messages between different operands can be interleaved but messages within a single operand should be ordered; the default is false
   Associations
      InteractionOperand—the set of operands of the fragment The proposed metamodel modifies one class declaration from the standard metamodel. The "CombinedFragment" meta-class will no longer have the attribute "InteractionOperatorKind". In addition, the association of this class with the "Interaction Operand" meta-class is also removed.

Apart from the above modifications, a single meta-class for each "InteractionOperandKind" was also added to the extended metamodel. These meta-classes are then made subclasses of either the SingleOperand or the MultipleOperand meta-class. The Opt, Loop, Break and Neg meta-classes are made subclasses of SingleOperand as they require only one operand. The remaining Par, Alt, Assert, Strict, Seq and ConsiderIgnore meta-classes are made subclasses of the MultipleOperand meta-class. The main motivation behind this modification is because a number of suggestions have been proposed in the literature to modify the semantics of some combined fragment operators such as "alt", "neg", "assert" and so on. In order for the above-mentioned proposed operators to be added as metamodel extensions, existing combined fragment operators need to be treated as model elements. The present method's extended metamodel allows researchers to define their modifications in a usable manner by making use of lightweight extensions. In order to illustrate this, we take an example of the extension proposed prior art literature to include probabilistic choice to the existing "alt" operator. The prior art proposed an operator "palt" (probabilistic alternative), in which the choice between alternatives is expressed as probabilities between two or more operands.

Apart from deprecating the well-formedness rule $WF_{SEQ}$ Rule 6, another rule $WF_{SEQ}$ Rule 7 is also removed. This is because the conditions minint and maxint are included as metadata in the loop meta-class and removed from the InteractionConstraint meta-class. This ensures that they are valid only when the loop fragment is used. The "Loop" meta-class can hence be defined as described in Table 4.

TABLE 4

Definition of Loop Metaclass

Loop Metaclass
   Description
      Loop is a meta-class, which declares a combined fragment representing a loop. The single operand in the fragment body will be repeated a number of times as specified by constraint attached to it. Loop is a specialization of SingleOperand.

TABLE 4-continued

Definition of Loop Metaclass

Attributes
      minint—the minimum number of iterations of a loop
      maxint—the maximum number of iterations of a loop
   Well-formedness rules
      If minint is specified, then the expression must evaluate to a non-negative integer.
      If the maxint is specified, then the expression must evaluate to a positive integer.
      If both minint and maxint are specified, the value of maxint must be greater than or equal to the value of minint.

Figure 4:
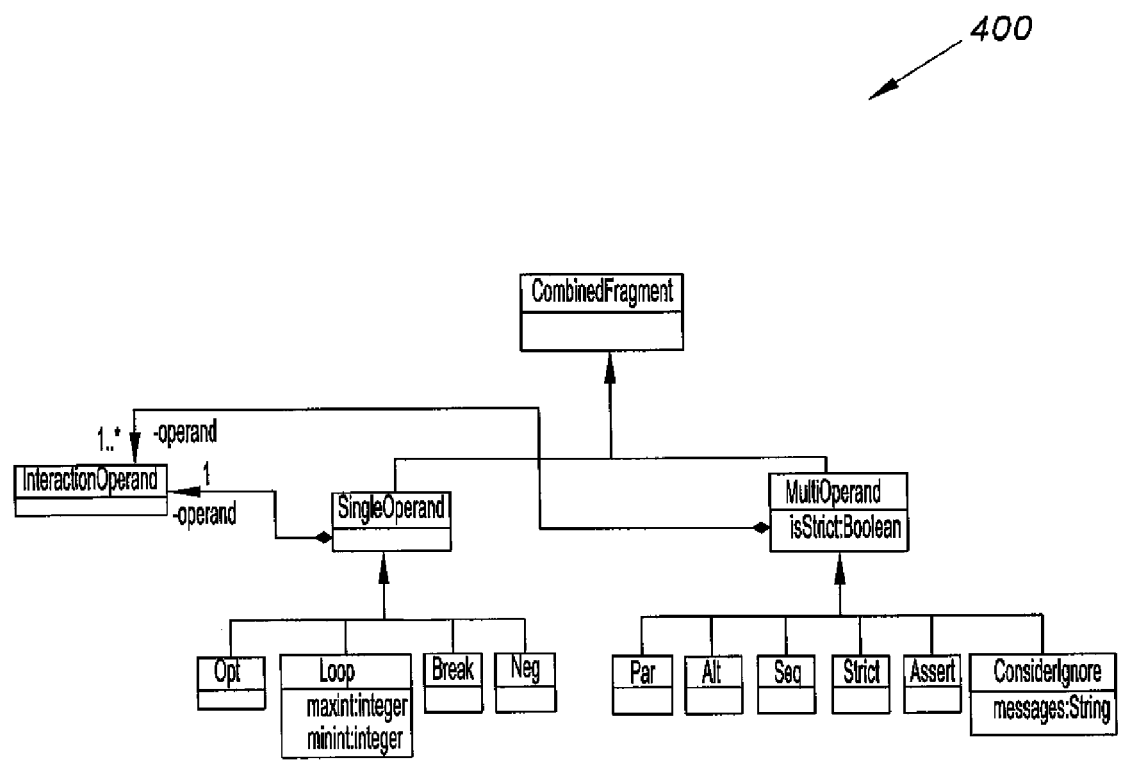
FIG. 4 is a block diagram showing extended component of the sequence metamodel according to the present invention.
Figure 5:
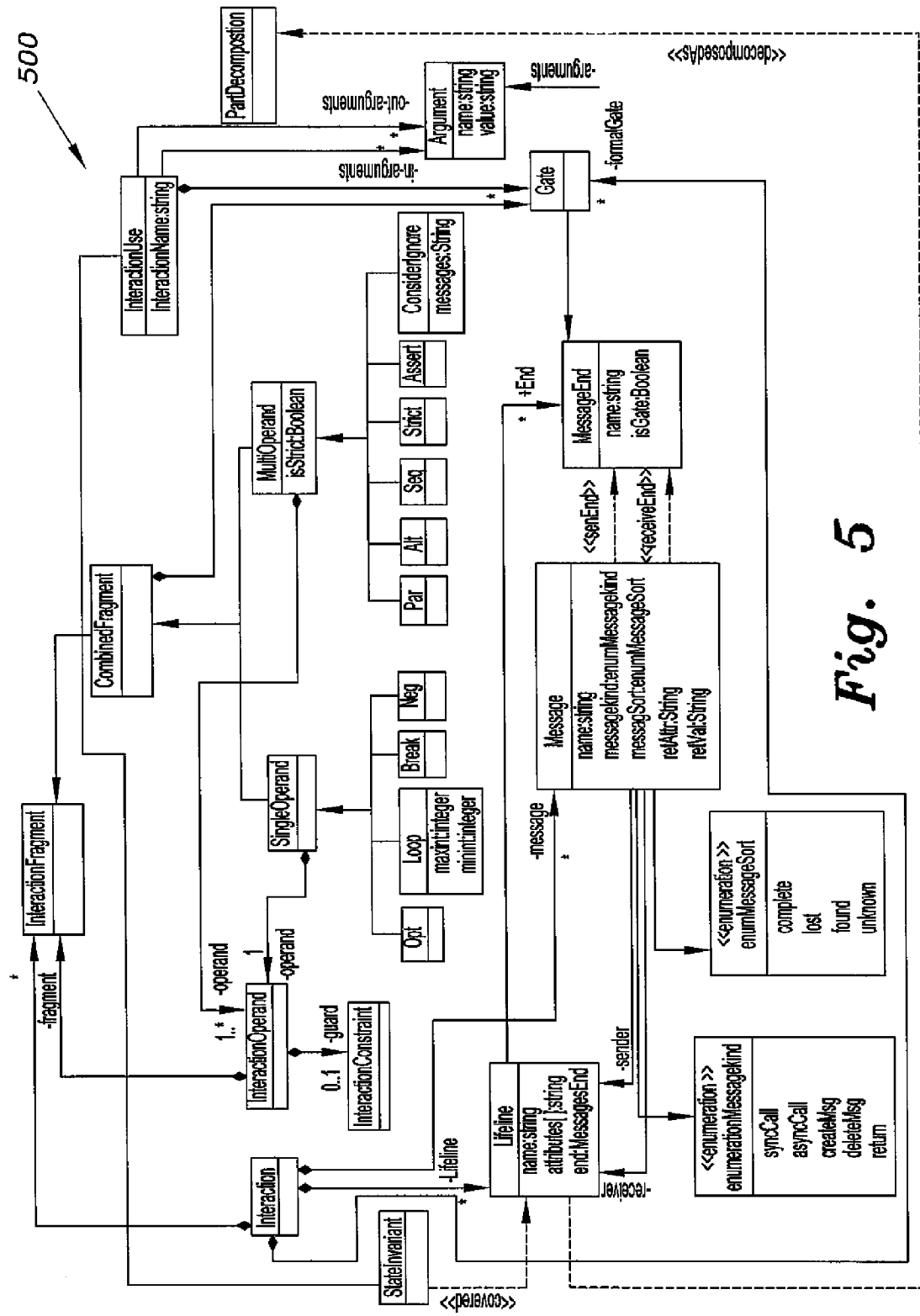
FIG. 5 is a block diagram showing extended sequence metamodel according to the present invention.

The descriptions of all other meta-classes are left for future improvements and extensions to the UML Metamodel. The proposed extension component 400 for the Sequence Metamodel along with its related meta-classes from the original UML Sequence Metamodel is shown in FIG. 4. FIG. 5 presents the complete extended sequence diagram metamodel 500. The present invention provides the extended sequence diagram metamodel along with promising applications apart from metamodel integration.

Use case diagrams have been adopted by the OMG to be part of UML. A use case diagram represents a functional view of an object-oriented system and plays a vital role in modeling the system's functional requirements. To model these requirements, the use case diagram represents them as a set of use cases. Each use case is a specification of a set of operations between the system and actors resulting in an output valuable to actors or stakeholders of the system. Formally, a use case diagram is defined in Table 5.

TABLE 5

Definition of Use Case Diagram

Definition 4.3: A use case diagram is a 5-tuple UC =
$\{\mathbb{U}, \mathbb{A}, \mathbb{m}, \mathbb{r}, WF_{UC}\}$ where:
$\mathbb{U}$ is a finite set of use cases
$\mathbb{A}$ is a finite set of actors
$\mathbb{m} \subseteq \mathbb{A} \times \mathbb{U}$ is a finite set of associations
$\mathbb{r} \subseteq \mathbb{U} \times \mathbb{U}$ is the relationship between use cases
$WF_{UC}$ is a set of well-formedness rules on the Use Case Diagram UC A use case model represents the functional view of an Object Oriented (OO) system and plays a vital role in modeling the system's functional requirements. The use case model represents the functional requirements as a set of use cases. Each use case is a specification of a set of operations between the system and the actors resulting in an output valuable to actors or stakeholders of the system. UML use case diagram models use cases and their relationships with actors and other use cases. Behavior of each use case is typically documented either through other UML models, i.e., sequence or activity diagrams, formal modeling languages, or as natural language text.

Figure 6:
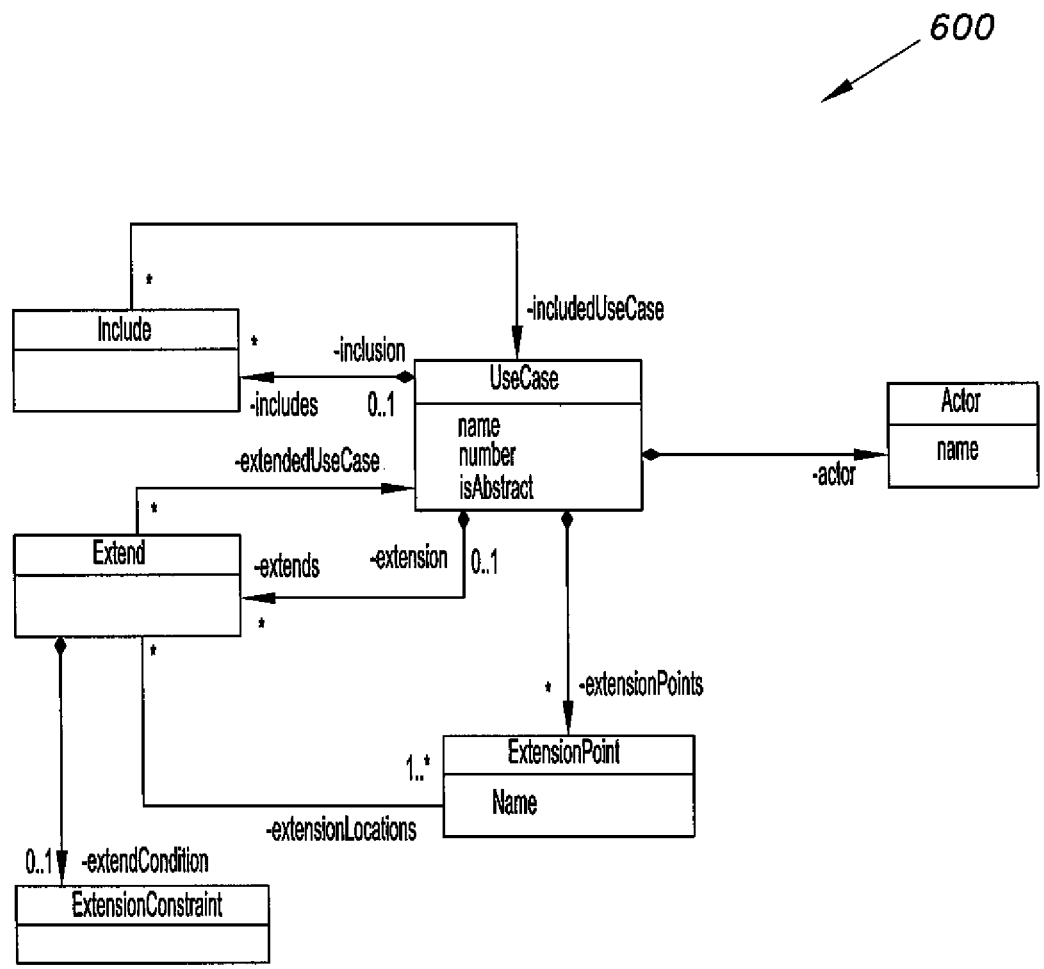
FIG. 6 is a block diagram showing subset of the UML use case diagram metamodel according to the present invention.

UML models are described by a metamodel detailed out in its specification document. A UML metamodel is a qualified alternate of the UML models and is a representative of any model that can be expressed with it. Since the UML metamodel includes information for all the diagrams in the modeling suite, a subset 600 of the UML metamodel that includes all elements related to modeling a use case diagram is shown in FIG. 6.

The use case model that is part of the UML specification describes only its structural view. The structural view defines the services provided by the system without divulging its internal structure. The internal structure presents the behavioral aspect of the use case. A use case, once initiated by an actor, performs a number of operations to provide a meaningful output to the invoking actor. These sets of operations constitute a use case's behavior. There are a number of ways in which the behavioral information can be presented. The present method provides textual presentation and a metamodel that extracts useful information from the text and maps it to the metamodel elements for further analysis. Notations or templates for composing them have two major parts of information: description and dynamics. The description part includes elements such as name, number, goal, scope, level, description, actors (primary and secondary), preconditions, post-conditions (success and failure), priority, frequency, open issues, due date and special requirements. The dynamics part captures the use case's flow of execution. Flow of execution of a use case includes a sequence of steps that can either be events (messages exchanged between actors and use case objects), or anchors (that disrupt the main flow by allowing access to sub flows, alternate flows, use case extensions and inclusions). The present invention provides an extension to the use case metamodel. The extended metamodel takes into consideration information from all published templates. But information that is useful for further analysis of the use case model is included as meta-classes so other tools can access and extend it easily and other information can be included as meta-attributes of the respective meta-classes. This makes information for use case analysis, model evaluation, and model interchange readily available and accessible from the metamodel. The extended metamodel of the present method provides an integrated global modeling environment for tools and users and provides seamless transition from requirements to system modeling.

With respect to construction of the use case (UC) extended metamodel, Actors are a modeling agent which models users of a system. The UML Specification defines actors as entities that can communicate with several use cases. In the present method's extension to the use case metamodel, actors are classified based on two criterions: the role they play in a use case and the role they play in the system. Many authors define different types of actors based on their role in the use case. Known exemplary actor classification types are listed in Table 6.

TABLE 6

Exemplary Actor Classifications Types

1: Primary Actor—An actor that initiates the use case and helps realize its goal.
2: Supporting Actor—An actor that participates in a use case that helps realize a primary actor's goal.
3: Offstage Actor—An actor that does not interact with the system but has needs that should be addressed in the system. Offstage actors are considered as stakeholders of the system under development.

The actor's type may differ from use case to use case. Based on the above classification, we added three associations between the UseCase meta-class and the Actor meta-class to denote the role an actor plays in a use case. Popularity of the use of use case modeling as a de facto standard for requirement modeling in the field of software engineering was further enhanced with the establishment of a software estimation technique known as Use Case Points (UCP). UCP became a good candidate for early estimation of software size and effort because of its simplicity and ease of use. The main activity of UCP is to estimate the complexity of actors and use cases. The complexity of actors is identified based on the role an actor plays in the system (as opposed to in a use case as discussed above). In order to incorporate this information in our extended metamodel, we categorized actors based on information from both the original UCP model known by artisans having ordinary skill and also the known enhanced iUCP model. Based on this, the present method classifies the actors into the following categories listed in Table 7.

TABLE 7

Categories of Actors

1: System Actor—This type of actor is another system interacting with the base system through an application programming interface (API). For example, the ATM system reads the credit card information directly from a credit card reader. In this case, the credit card reader is outside the system and accessed through an API; therefore, the credit card reader is a system actor.
2: Network System Actor—This type of actor is another system interacting with the base system through a protocol or data store. For example, the ATM system verifies the credit card information from an accounting system. In this case, the accounting system is outside the system and accessed through a network. Therefore the accounting system is a network system actor.
3: Human Actor—This type of actor is a person or a user who will use the system. It is the most common type of actor. For example in the ATM system, a customer will ask the system to perform a transaction and therefore, the customer is a human actor.

The iUCP model differs from the original UCP model as it is based on the usage-centered design method in contrast to the conventional use case model for classifying actors. The main reason behind this is because of the richness of the information conveyed by the usage-centered method regarding the complexity underlying each actor. Human actors are divided into simple, average and complex based on the number of roles they play in the system. In the usage-centered design method, the concept of actor is expanded through user roles that represent the relationship between users and a system. A user role is characterized by the "context in which it's performed, the characteristic manner in which it's performed, and the design criteria for the role's supporting performance". The number of roles supported by each human actor provides an important way to infer the complexity associated with each actor. In order to incorporate this, we added a meta-attribute called num_roles to the Actor meta-class. Since this attribute is associated with human actors only, a default value of 1 is used for system and network system actors.

Figure 7:
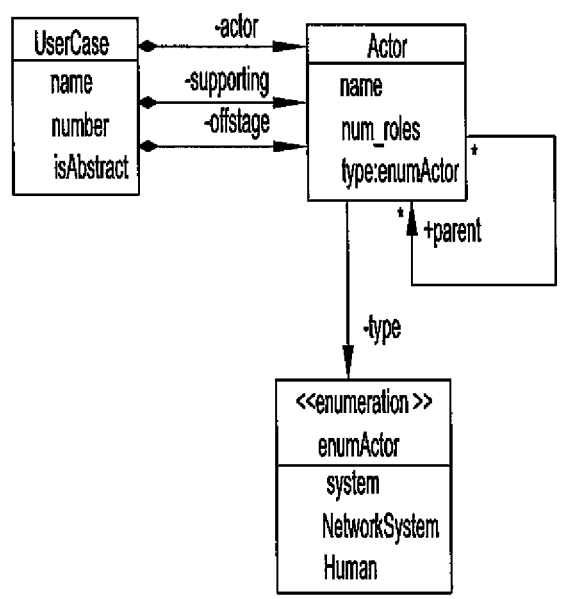
FIG. 7 is a block diagram showing addition to the extended UML metamodel for Actor according to the present invention.

Actors in a use case model can be associated to each other using the generalization relationship. It is the only kind of relationship that exists between actors. The actor modeling the common role is referred to as the parent actor and the actors using the common role are called the child actors. In simple terms, a child actor inherits the capability to communicate with the use cases its parent actor is associated with. The metamodel representation 700 with the modified Actor meta-class and its relationship with the UseCase meta-class are presented in FIG. 7. A use case within a use case model includes a number of information elements as shown in Table 8.

TABLE 8

Template Elements

Name: Unique name assigned to a use case
Number: Unique ID assigned to a use case
Goal: Statement of goals expected from the use case
Scope: System being considered black-box under design
Level: Level of use case description
Description: Brief summary of use case purpose
Primary Actor: Actor that initiates the use case

TABLE 8-continued

Template Elements

Figure 8A:
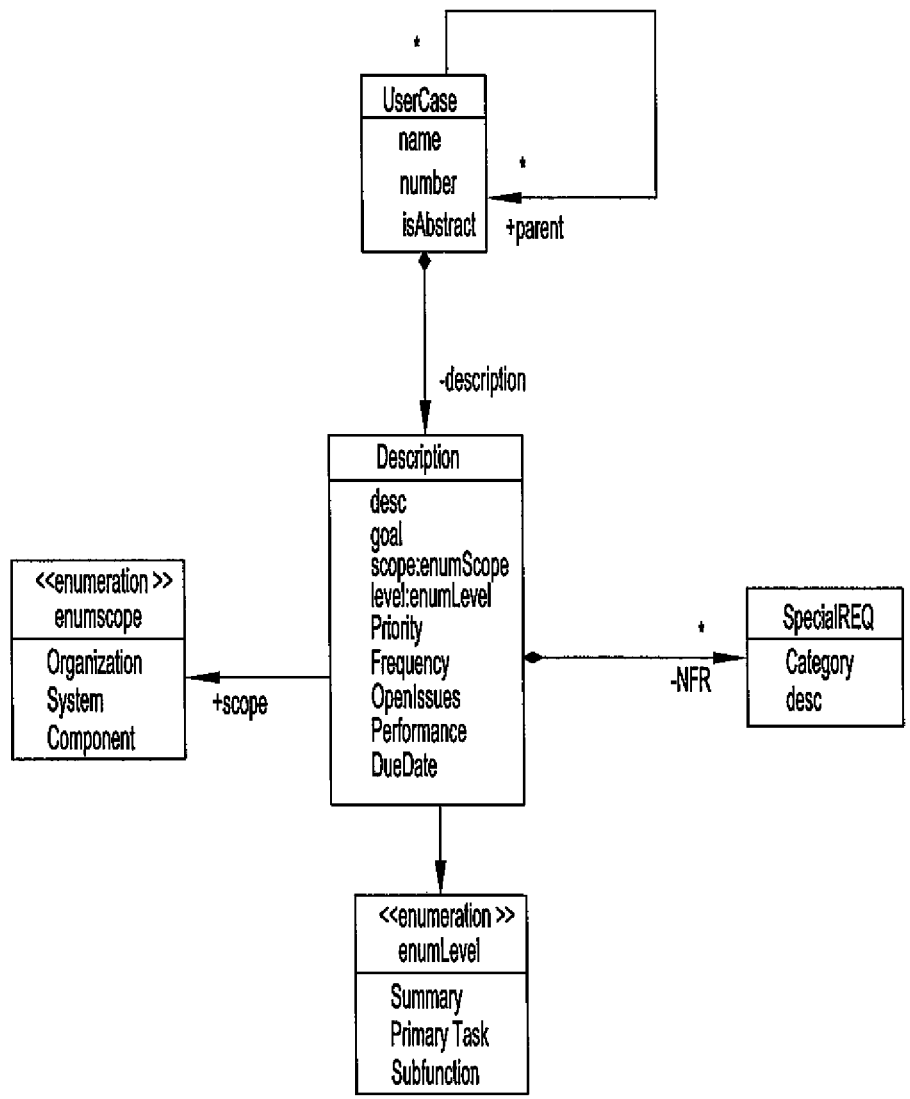
FIG. 8A is a block diagram showing addition to the extended UML metamodel for use case according to the present invention.

Secondary/Supporting Actors: Actors that participate within the use case
Offstage Actors: Non-interacting actors concerned with the outcome of the use case
Special Requirements: List of non-functional requirements
Preconditions: Expected state of the system prior to use case execution
Post-conditions (Success): State of the system upon successful completion of the use case
Post-conditions (Failure): State of the system if goal is abandoned
Performance Target: The amount of time this use case should take
Priority: How critical to the system/organization is the use case
Frequency: How often is it expected to happen
Open Issues: List of issues about this use case awaiting decisions
Due Date: Date or release of deployment
Main Flow: Steps of the scenario from trigger to goal delivery
Sub Flows: Sub-variations that will cause eventual bifurcation in the flow
Alternate Flows: Conditional variations that will cause eventual bifurcation in the flow
Extension Points: List of extensions each referring to a step in the main flow
Exceptions: Conditional variations that will cause unsuccessful termination of use case flow
Super Use Case: Name of use case that this one specializes
Sub Use Case: Links to all use cases that specialize this use case Despite the difference of information portrayed by different templates, each template has two major parts of information: the description part and the dynamics part separated by the empty row in Table 8. Information within the use case description can be classified into two categories; information that is used for "mere" documentation purpose and information that will be used for use case analysis at later stages of software development. Keeping in lieu with the above mentioned criteria, we decided to separate these elements and depict them independently in the enhanced metamodel according to (1) use case description elements that will be used for its documentation will be represented as meta-attributes in a separate meta-class called Description (see use case extended UML addition 800*a* of FIG. 8A) and (2) use case description elements that will be used for analysis will be represented as separate meta-classes.

UML defines three types of relationships between use cases: <<include>>, <<extends>> and generalization. When describing these relationships through a metamodel, we need to discuss the relationship depiction on the use case structural view and within the use case flow of execution (its behavioral view).

With respect to the include relationship, two use cases are related by the <<include>> relationship if one use case (known as the base use case) uses the functionality offered by the other use case (known as the included use case). Two main reasons for using the <<include>> relationship in a use case model according to the UML specification are: to fragment Complex Use Case into manageable ones and to reuse use Cases. Apart from this, some authors recommend the use of <<include>> relationship for conditional behavior and to handle asynchronous events. The main motivation behind the use of <<include>> relationship for conditional behavior by the above-mentioned authors is that this relationship is much easier for most people to understand and use than other relationships such as <<extends>> and generalization. Also the use of <<extends>> is restricted to cases where the base use case is locked or "closed for modification". Since it is difficult to gauge when a use case is closed for modification, we adopted the semantics of the <<include>> relationship as outlined in the UML specification and accepted by majority of the authors and leave the concept of conditional behavior to the <<extends>> relationship. The present method does not modify the meta-classes related to the <<include>> relationship in the extended metamodel.

Regarding the extend relationship, two use cases are related by the <<extends>> relationship if one use case (known as the base use case) implicitly incorporates the behavior of another use case (known as extension use case) at a specified location. The extension use case is executed only when some particular condition is satisfied in the base use case. There have been many reasons proposed in the literature for the use of the <<extends>> relationship in the use case model. These are summarized in Table 9.

TABLE 9

Reasons for Use of <<extends>> Relationship

1. Optional or Exceptional Behavior: Behavior that is optional to the base use case can be separated and defined in an extending use case. Most authors agree with this usage of the extend relationship.
2. Asynchronous Events: An asynchronous event is one that can be called at any point in the base use case. Use of the extend relationship to describe asynchronous events is supported in the prior art.
3. Defer Behavior Implementation: The prior art has suggested the use of
extend relationship to separate behavior from the base use case that can be developed later in order to assign it a lower priority.

The semantics of the <<extends>> relationship has created a lot of disagreement among authors. The present method resolves these concerns by extending the metamodel to incorporate necessary information in order to ensure consistency in semantics of this relationship. Since the extend relationship is optional and controlled by an execution condition, it requires the specification of the elements listed in Table 10.

TABLE 10

Specification of Elements for <<extends>> Relationship

| | |
|---|---|
| Extension Point: | The point in the behavior of the base use case where an extended use case can be inserted is known as the extension point. |
| Extension Constraint: | This is an optional constraint that specifies the condition that must be true for the extension use case to be invoked from the base use case. |

Figure 8B:
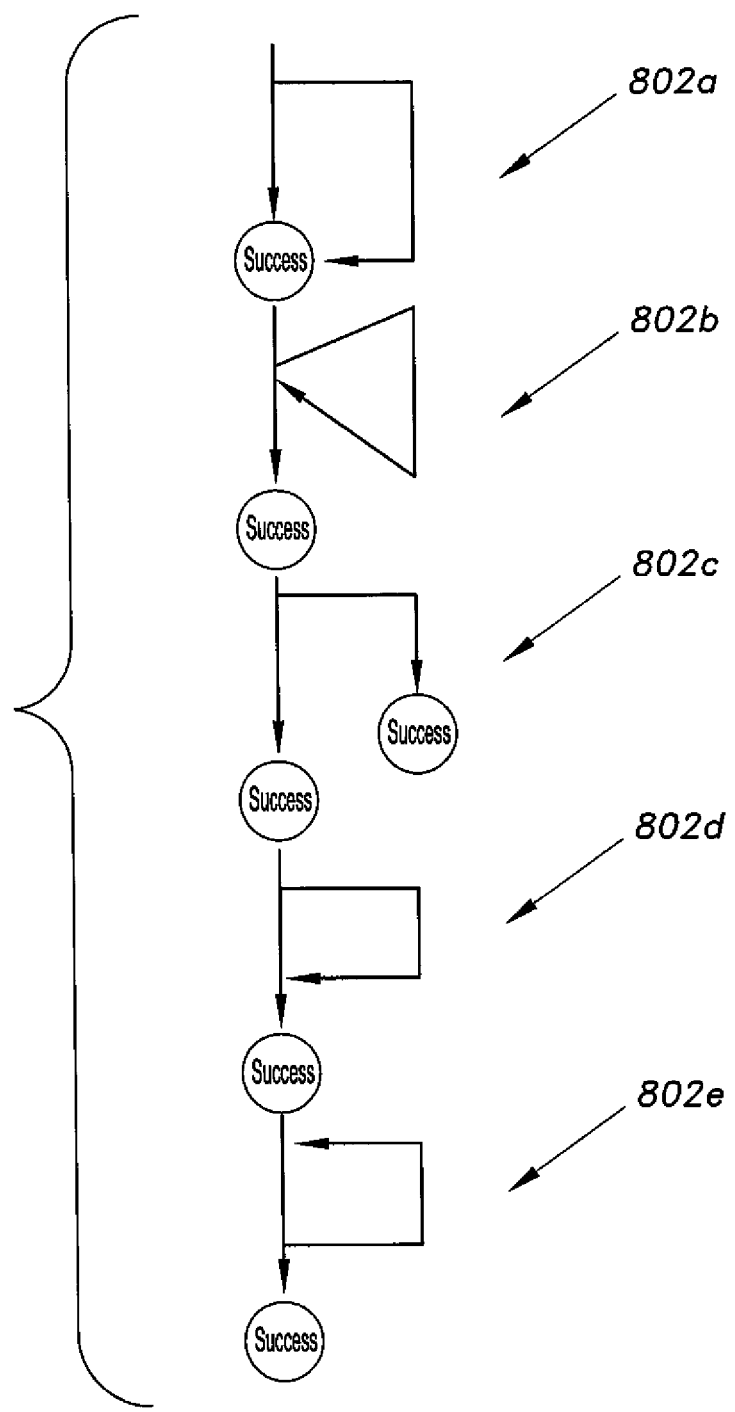
FIG. 8B is a flow control diagram showing alternative sequences and flow control relative to a base use case scenario.

When the extension point in the base use case scenario is reached, the extension constraint is evaluated and control is switched to the extension use case. After the execution of the extension use case, the control is resumed just after the extension point in the base use case scenario. But in order to use the extend relationship to model exceptional behavior, the control should be allowed to return to any point in the base use case flow or be allowed to end the use case resulting in a failure or alternative success scenario. In order to handle these situations, prior art research has defined five types of alternative sequences listed in Table 11 and depicted in FIG. 8B.

TABLE 11

Summary of Alternative Scenarios
Control Flow Description

Alternative History 802a: The control in this type of alternative sequence never returns to the base use case scenario. The success post-condition in this case can either be the overall success post condition of the base use case or its subset.
Alternative Insertion 802b: The control in this type of alternative sequence returns to the point just after the extension point in the base use case.

TABLE 11-continued

Summary of Alternative Scenarios
Control Flow Description

Use Case Exception 802c: The control in this type of alternative sequence never returns back to the base use case scenario. In contrast to alternative history, the use case exception is always a failure scenario and results in a failure post condition.
Alternative Fragment 802d: The control in this type of alternative sequence returns to any point after the extension point in the base use case.
Alternative Cycle 802e: The control in this type of alternative sequence returns to any point before the extension point in the base use case.

In order to accommodate sequences of Table 11, the concept of rejoin point was proposed in the prior art. A rejoin point allows the control to return to separate point in the main flow after performing the steps specified in the extension use case. We followed a similar approach in our extension of the use case metamodel and added a meta-class called RejoinPoint. When the rejoin point is equal to the extension point it leads to an alternative insertion fragment. When the rejoin point is a point that occurs either before or after the extension point, then the alternate scenario leads to an alternative cycle or alternative fragment respectively. Finally when the rejoin point is not specified, it leads to a use case exception.

In order to complete our extension to the Use Case metamodel for <<extends>> relationship, we considered an interesting premise put forward by the prior art. An extension point in the base use case can be extended by several use cases. An issue arises when this extension point is reached and a decision is to be made if whether only one or at least one among these extension use cases are to be selected. In order to complete and clarify the behavior of the base use case and to aid in the process of elicitation of requirements, the prior art adds multiplicity attributes to the extension point meta-class. Following this approach, the present method adds the lower and upper meta-attributes to the ExtensionPoint meta-class to clarify the behavior of extend relationship in case of multiple use case extensions. A multiplicity of 0 . . . 1 states that the extension use case can be executed when the constraint is true (equivalent to the original UML extend semantics), a multiplicity of 1 . . . 1 states that only one of the possible extension use case can be selected and finally a multiplicity of 1 . . . * allows more than one use case to be inserted.

Figure 9:
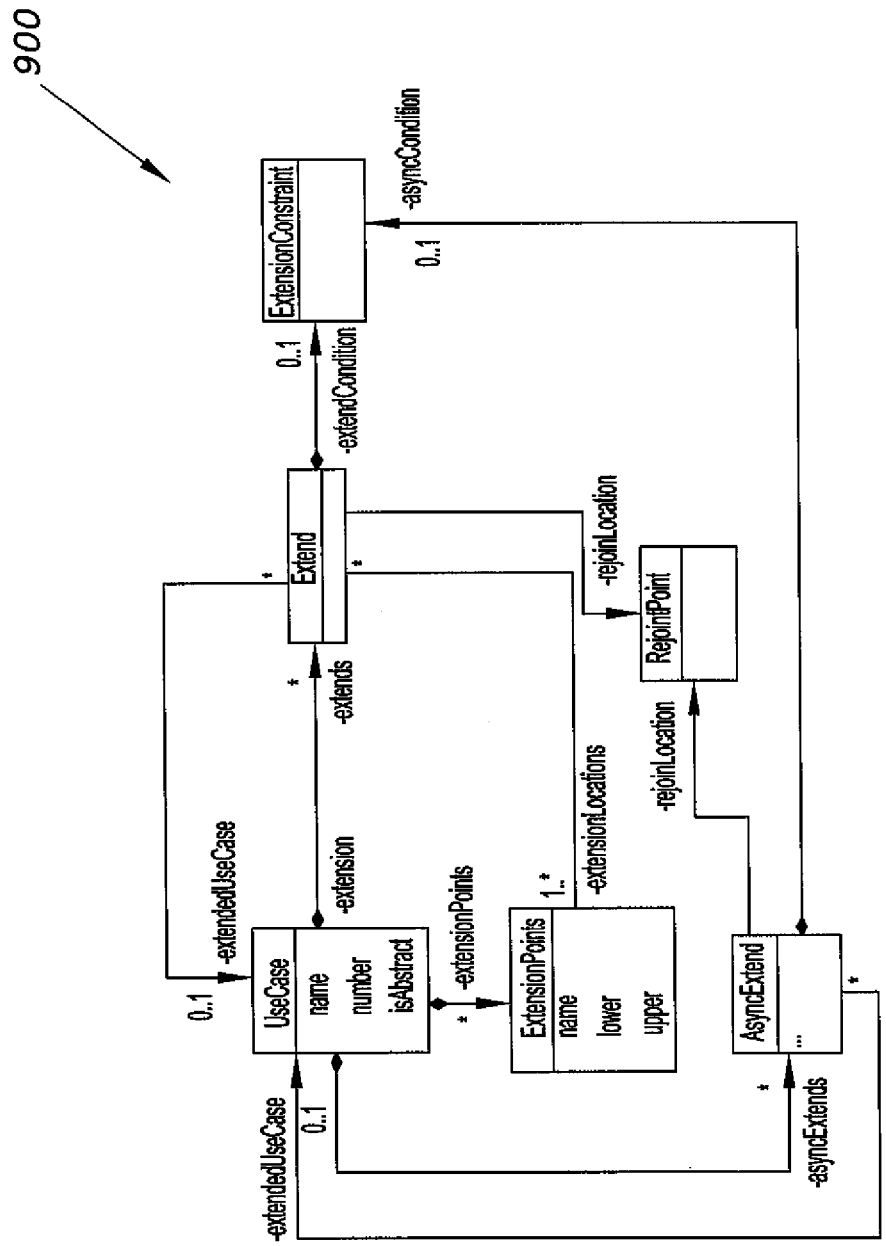
FIG. 9 is a block diagram showing addition to the extended UML metamodel for extend relationship according to the present invention.

In addition, following the prior art in our metamodel extension, we have considered the concept of asynchronous extensions in which an extension use case can be called asynchronously at any step of the use case flow. Asynchronous extensions are defined in our metamodel as a separate meta-class called AsyncExtend. It is defined separately as it lacks an extension point and extension location. For example, a customer can press cancel at any time during his usage of the ATM Machine. FIG. 9 shows the extended metamodel 900 for <<extends>> relationship.

A generalization relationship in a use case model allows a given use case to be defined as a specialized form of an existing use case. Common behaviors, constraints and assumptions are factored out into a general use case (also known as the parent use case) which can then be inherited by a specialized use case (also known as the child use case). The concept of generalization and specialization gives rise to the two types of use cases listed in Table 12.

TABLE 12

Two Types of Use Cases

| | |
|---|---|
| Abstract Use Case: | An abstract use case is an incomplete use case that can only be invoked by another use case. An actor cannot directly invoke it. Jacobson refers to the generalized use case as an abstract use case. |
| Concrete Use Case: | A concrete use case is a self-contained complete use case one that can be directly invoked by an actor. A concrete use case provides an implementation to an abstract use case. The specialized use case is often referred to as a concrete use case. |

Most authors agree with the definition and usage of the generalization relationship. FIG. 8 depicts the use case metamodel for generalization. Although the structural representation of this relationship is straightforward, its usage within a use case scenario description is vaguely described in the literature.

Figure 10:
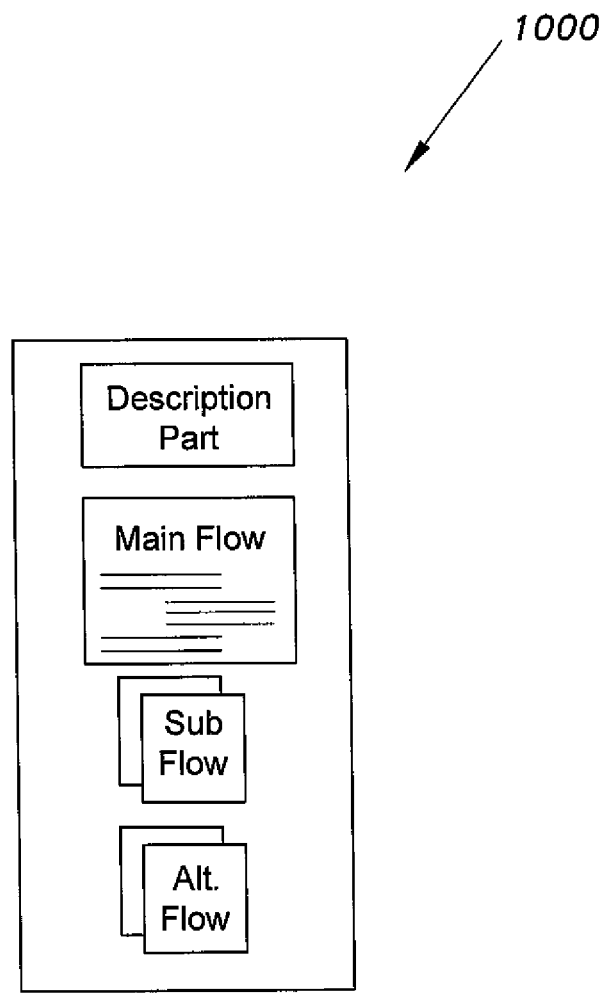
FIG. 10 is a diagram showing structure of a typical text-based use case description according to the present invention.

With respect to use case flows, use case dynamics may be expressed through a sequence of steps grouped to form behavioral fragments called flows. A single use case 1000 consists of multiple flows as shown in FIG. 10, but the flow of events that is initiated when the use case is executed by an actor is called the main flow. Apart from the main flow, a use case can also have multiple sub flows and alternate flows. These flows are initiated from the main flow. A sub flow is used either to describe complex logic associated with a particular step or to factor out redundant steps described in a flow. Alternate flows include behavior that is alternate to the use case. This could be optional or exceptional behavior Steps within a flow are usually atomic events, having a specific content interpretation. Usually unconstrained natural language is used to describe the steps within a flow. Following the flow composition architecture described in FIG. 10, we initially added a meta-class called Flow to the extended use case metamodel. Different types of flows are then represented as specialized meta-classes of the Flow meta-class: MainFlow, SubFlow and AlternateFlow. Apart from terminological differences and elements used, there are some noteworthy semantic differences between templates found in the literature. The semantics description that the present extended metamodel is built upon is listed in Table 13 and ensures deterministic initiation of use cases and their completeness.

TABLE 13

Semantic Description for Extended Metamodel

| | |
|---|---|
| 1. | Restrict the number of main flows to only one. |
| 2. | Allow sub flows and alternate flows within sub flows and alternate flows. |
| 3. | Allow multiple extension points |

Figure 11:
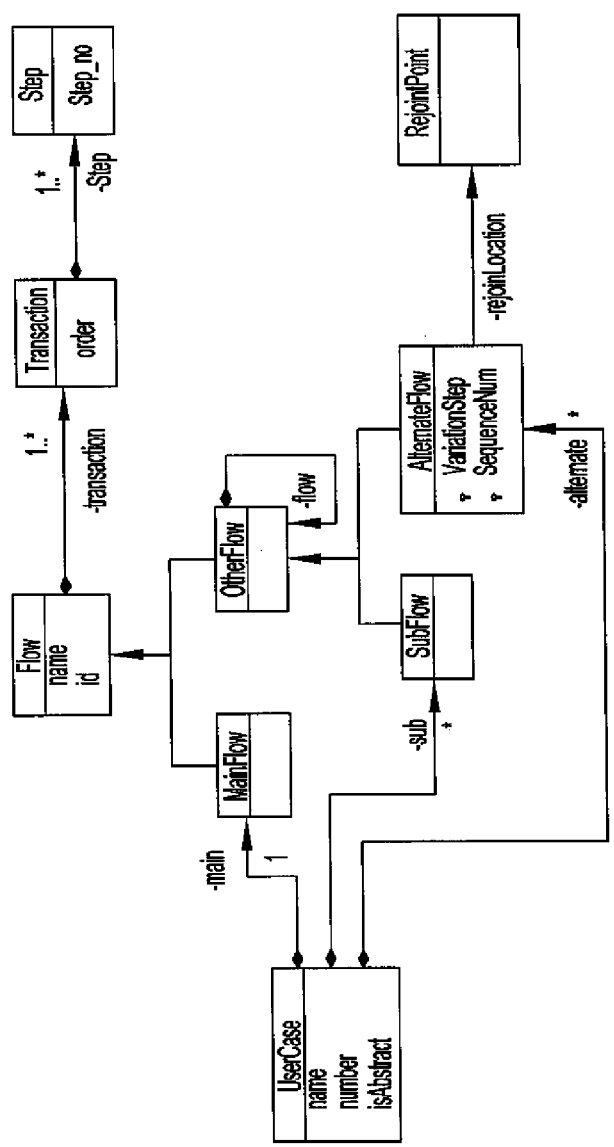
FIG. 11 is a block diagram showing an excerpt of the extended metamodel for the use case flow of events according to the present invention.

In order to allow sub flows and alternate flows to have sub flows and alternate flows within them, we added another level of inheritance between the Flow meta-class and SubFlow and AlternateFlow. This intermediate meta-class is called OtherFlow. Most authors define use case flow as a composition of a sequence of steps. Since one of our main goals for extending the use case metamodel is to use the instantiated use case model for analysis, we used the concept of transactions. Our main motivation in the use of transactions to describe flows is because transactions are mainly used as a complexity metric within the use case point method. A transaction is a shortest sequence of use case steps starting from an actor's request and ending in a system response. Hence, a use case flow is composed of a number of ordered transactions included in the metamodel by the Transaction meta-class. Each transaction is then composed of a sequence of steps modeled by the Step meta-class. FIG. 11 shows the excerpt 1100 of the extended metamodel for the use case flow of events.

Regarding use case action steps, in a flow description, a step can be classified as either an action step or a branching step. A step that performs a certain action (from the actor to the system or vice versa) is referred to as an event. A branching step is a step that alters the sequential order of the flow by invoking the behavior of another flow of events. Branching steps are discussed in the next subsection. Natural language sentences are used to describe an event. A number of approaches that make use of the grammatical structure of the natural language and natural language processing (NLP) techniques, to analyze and extract relevant information, have been proposed in the literature. As far as the metamodel is concerned, we focused on the elements that make up a typical event sentence. An event allows a sender to communicate with one or more receivers through a message (action) that may or may not include additional parameters (arguments). Hence, it is safe to assume that an event is composed of a sender, multiple receivers, an action and zero or more arguments.

Figure 12:
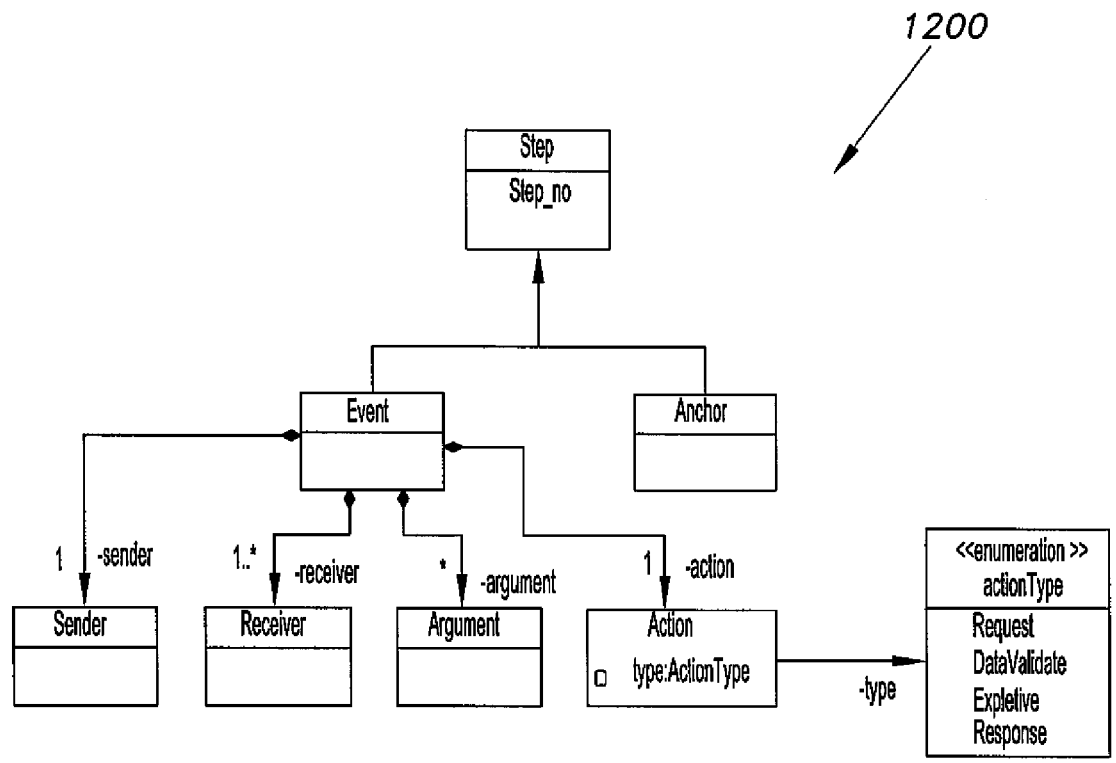
FIG. 12 is a block diagram showing an excerpt of the extended metamodel for the use case flow steps according to the present invention.

Since a step can either be an event or a branching action, it is specialized by two meta-classes called Event and Anchor. The Event meta-class is further extended to include Sender, Receiver, Action and Argument meta-classes based on the above mentioned reasons. In addition, we enumerated four types of actions relevant from the use case transaction point of view. This is shown through an enumerated meta-attribute called actionType in the Action meta-class. Excerpt 1200 of the metamodel depicting the meta-classes relevant to a use case step is shown in FIG. 12.

With respect to use case steps, a step can either be an event or a branching action. We refer to the branching action step as anchors as they are mere placeholders or locations within the main flow that invoke another flow or use case. The natural order in which steps occur within a flow is sequential from top to bottom. This concept of sequential ordering can be altered by including the behavior of another flow in the main flow. A flow may include another flow in its execution. This insertion can either be conditional or unconditional. Unconditional insertions of a flow are referred to as Inclusion. A flow may include another flow which is part of the same use case description (also known as sub flows) or may include a flow defined in another use case description (i.e. use cases related to each other by the UML include relationship). These two inclusions are referred to as Internal Inclusion and External Inclusion respectively. An internal inclusion anchor specifies the name of a sub-flow (bolded out to differentiate) whereas an external inclusion anchor is composed of the keyword include followed by the name of the use case to be included.

Use case descriptions, apart from allowing unconditional insertions, also provide a means of including another flow based on a condition. Conditional insertions of a flow are referred to as a Variation. Similar to that of Inclusion, a flow may include a variation flow part of the same use case description (also known as alternate flows) or may include a flow defined in another use case description (i.e. use cases related to each other by the UML extends relationship). These two variations are referred to as Internal Variation and External Variation respectively. Internal Variation anchors usually do not include branching information. Information about an alternative flow is specified in the alternative flow itself. Table 14 presents an exemplary internal variation scenario.

TABLE 14

Exemplary Internal Variation Scenario

| Main Flow | |
| --- | --- |
| 1. | |
| 2. | |
| 3. | The Customer enters the withdrawal amount. |
| 4. | |
| Alternative Flow | |
| 3 (a) | ATM System has no currency |
| 1. | The system notifies the customer that the ATM is out of cash. |
| 2. | The use case ends. |

Based on the example illustrated above, we modified the AlternativeFlow meta-class shown in FIG. 11 with the following meta-attributes: VariationStep and SequenceNum (for cases when a single step in the main flow can result in multiple alternative flows). Since the internal variation is a conditional branch, a constraint element needs to be added to the extended metamodel. All discussions related to constraints are deferred towards the end of this section. In addition, since the alternation scenarios depicted in Table 11 are applicable to alternative flows, an association is added between the AlternativeFlow meta-class and the RejoinPoint meta-class.

An external variation anchor specifies the name of the extension point. Information regarding the extension use case to invoke, condition and location is included in the extension point. Table 15 presents an exemplary use of an extension point and its description.

TABLE 15

Exemplary Use of Extension Points

| Main Flow | |
| --- | --- |
| 1. | |
| 2. | System requests withdrawal amount |
| 3. | The Customer enters the withdrawal amount. |
| 4. | {Exceeds Limit} |
| 5. | |
| Extension Points | |
| Exceeds Limit [amount >= maxAmount]: Exceed Error, return: 2 | |
| Constraint    Extension Use Case Rejoin Point | |

Figure 13:
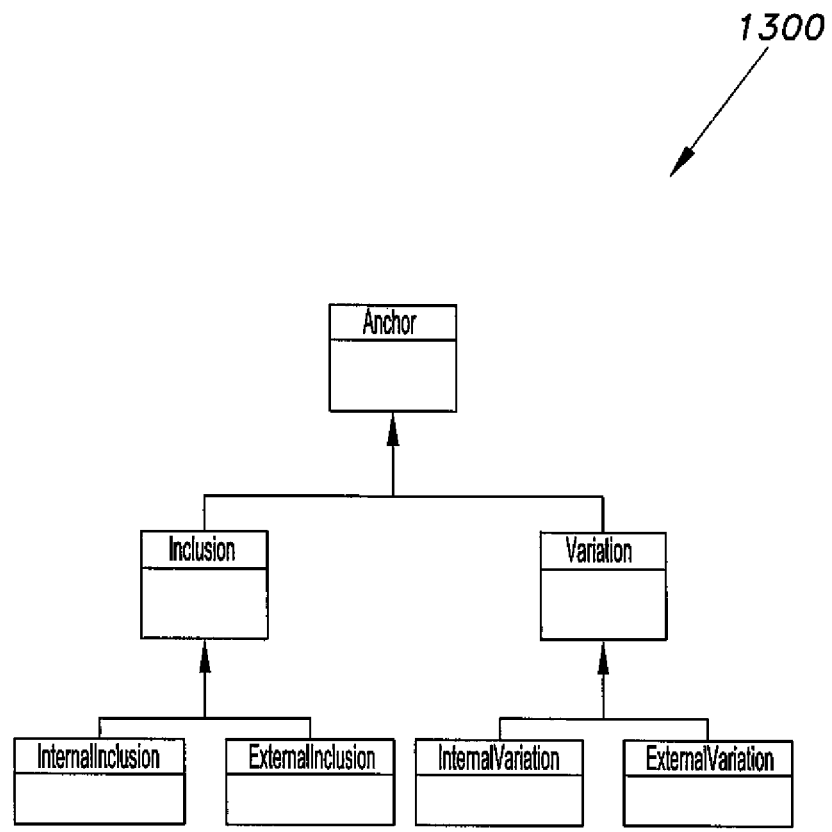
FIG. 13 is a block diagram showing a metamodel for the exemplary anchor meta-class according to the present invention.

FIG. 13 illustrates the metamodel 1300 with specialized meta-classes of the Anchor meta-class shown in FIG. 12.

Regarding use case generalization, one area when describing textual use case metamodels that has been given least attention is how a specialized flow of a child use case is specified. A known concept includes a general narrative description and a specialized narrative description to differentiate between original use case flow and inherited use case flow. Although the formalization provided by them has its own merits, inheriting all elements of the general narrative description within the specialized description causes redundancy and makes the behavioral model difficult to maintain. Another known use case generalization concept includes requiring a generalized use case to define points (called Generalization Points) where the specialized use cases can add additional behavior. A first main problem with this approach is that a specialized use case can only add additional behavior but cannot modify or replace the steps of the generalized use case. A second main problem with this approach is that the use of "Generalization Point" within the generalized use case defeats the purpose of allowing the generalized use case not to care about what specialization use cases exist.

The present method clarifies the semantics of use case generalization and provides an extension to the use case metamodel. The term "parent use case" refers to the generalized use case and the term "child use case" refers to the specialized use case. The two main functions of the child use case when inheriting from a parent use case are: modifying existing behavior and adding new behavior. The child use case replaces a portion of actions, conditions and rules of the parent use case. The steps to be replaced are rewritten; steps not rewritten are executed as in parent use case. Apart from this, new actions, conditions and rules can be added, thus enhancing the behavior of the child use case. Since the flow description of a child use case will be either adding new behavior or inheriting existing behavior from the parent use case, we included it as a separate meta-class called ChildFlow inheriting from the Flow meta-class. Since the use case can either have a MainFlow or a ChildFlow depending on whether it is a parent use case or child use case, we modified the multiplicities on these two associations in the metamodel to 0 . . . 1 instead of 1.

Figure 14:
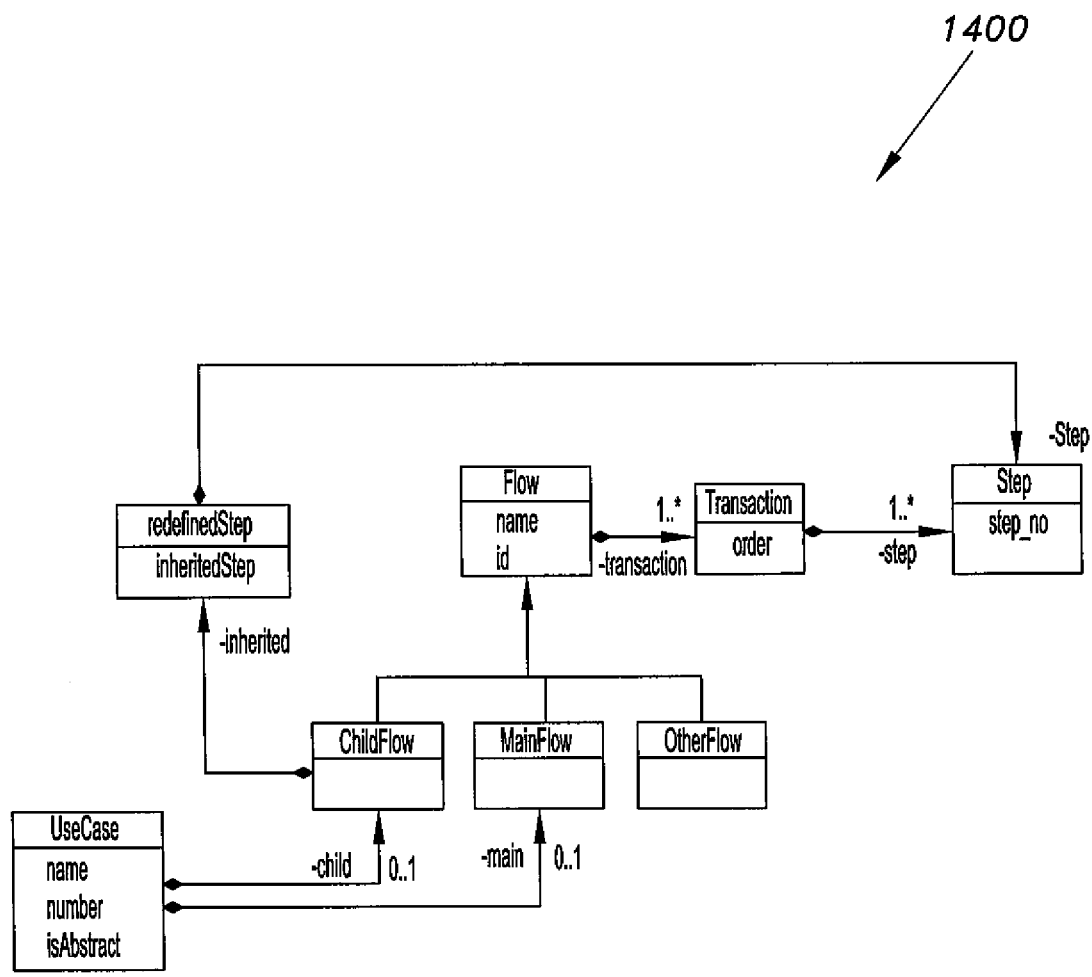
FIG. 14 is a block diagram showing excerpt of the extended metamodel for UC flow with generalizations according to the present invention.

Steps in the child use case flow can be defined locally (added behavior) which is handled by association between the super meta-class Flow and Transaction in the metamodel. Inherited behavior can either be modified or executed and used as-is. Similar to the manner we handled Alternative Flow in describing use case branching steps; we define a new meta-class redefinedStep. This meta-class has a meta-attribute inheritedStep, which references the step number inherited from the parent use case. Hence, a child flow is composed of regular steps and redefined steps. A redefined step can be rewritten; hence, we add a relationship between the inheritedStep meta-class and the Step meta-class to facilitate this information. A modified version 1400 of the use case metamodel extension depicted in FIG. 12 that handles use case flow generalization is shown in FIG. 14.

Table 16 exemplifies how the main flow of use case Reservation is redefined in the child use case Reserve Conference. We used the keyword "super" to differentiate between a regular step and inherited step within the child flow description. Hence, our proposed extension not only allows reusability of actions that do not require rewriting, it also allows child use case to modify actions inherited from parent use case flow.

TABLE 16

UC Flow Generalization example

| Use Case: Reservation Main Flow | | Use Case: Reserve Conference Child Flow | |
|---|---|---|---|
| 1. | The system displays a list of options available for reservation. | 1. | super: 1 |
| | | 2. | super: 2 |
| | | a. | The customer selects to reserve a conference room. |
| 2. | The customer selects an option. | | |
| 3. | The system displays the total cost. | 3. | The customer selects the room size, duration and additional equipment required |
| 4. | The system displays the reservation confirmation number. | 4. | The system computes the cost. |
| | | 5. | super: 3 |
| 5. | The use case ends | 6. | super: 4 |
| | | 7. | super: 5 |

Regarding use case constraints, a use case model is composed of a number of constraints related to different model elements. Constraints within a use case model are included in Table 17.

TABLE 17

Constraints for a Use Case Model

Figure 15:
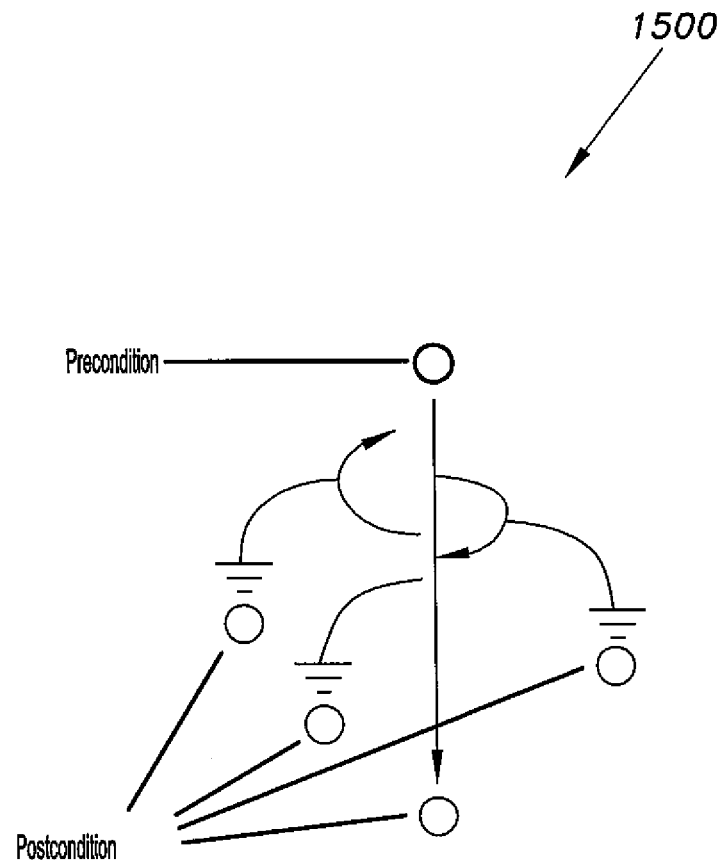
FIG. 15 is a diagram showing multiple use case scenarios according to the present invention.

1. Preconditions: indicate circumstances that must be true prior to the execution of the use case behavior. A precondition on a use case explains the state the system must be in for the use case to begin.
2. Post-condition: indicates circumstances that must be true after execution of the use case behavior. A post-condition on a use case explains the state the system will be at the end of its execution. Based on the concept of alternate scenarios a use case can result in one of many states depending on the execution path (scenario) followed. Hence, a use case can have a single successful post-condition and multiple failure or alternate post-conditions (see graph 1500 of FIG. 15)
3. Extension/Alternate Flow Constraint: Execution of use case alternate flows or extension use cases require a condition to be satisfied. This condition is referred to as a flow constraint.

All approaches that provide extensions to use case metamodel make use of a single meta-class called Constraint to handle use case constraints. Recent advancements in the field of use case modeling prompted the necessity of a structured storage and representation mechanism for constraints. Two main research proposals that make use of the use case constraint structure are: (1) Inferring use case sequencing relations from preconditions and post-conditions for requirements verification, use case synchronization and test scenario generation; (2) Enhancing software effort estimation process by assigning weights to preconditions, post-conditions and exceptions.

Prior to describing the use case metamodel extension with use case constraints, we included a meta-class in the metamodel called Entity. An entity, what most use case modeling tools refer to as Vocabulary or Glossary, refers to the systems under consideration, use cases, actors of the system and their attributes. For instance, Customer and Transaction are entities of an ATM System use case model.

Figure 16:
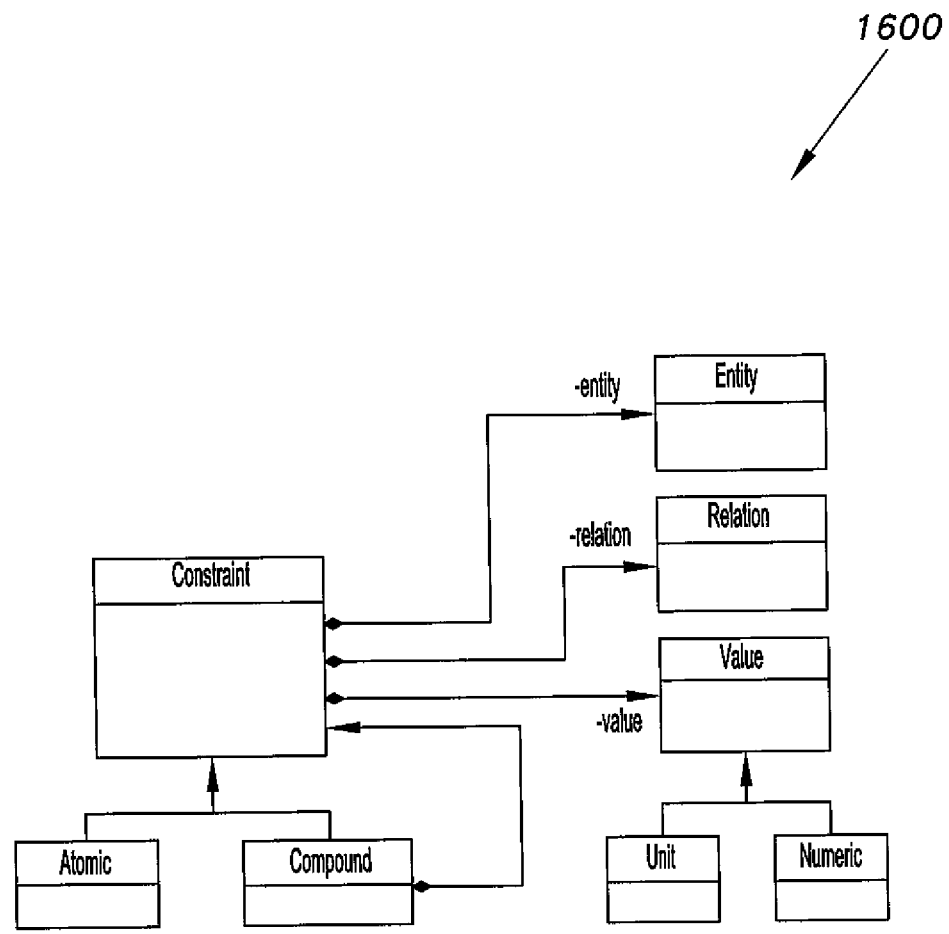
FIG. 16 is a block diagram showing an excerpt of the extended metamodel for constraint according to the present invention.
Figure 17:
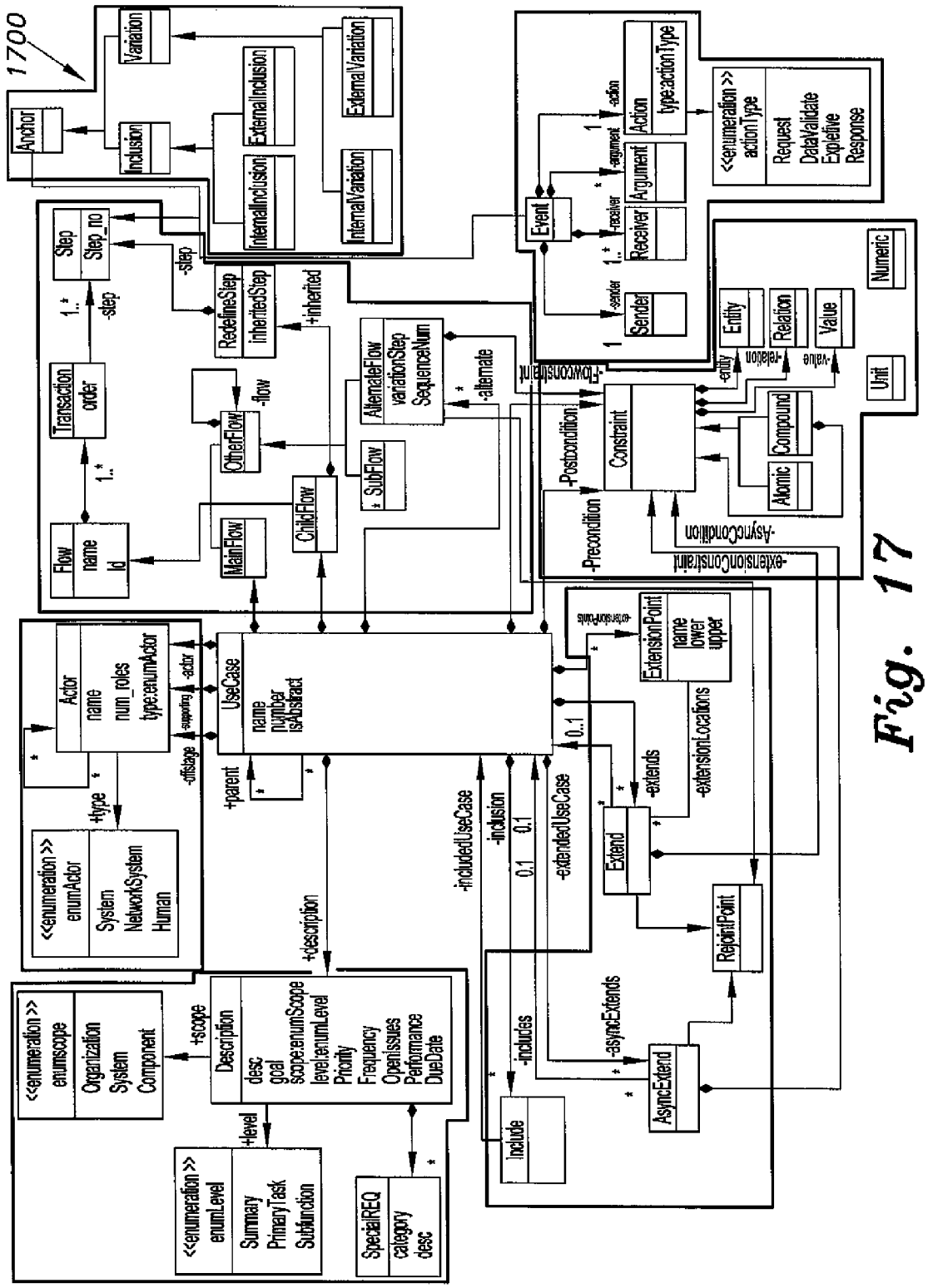
FIG. 17 is a block diagram showing the complete extended use metamodel according to the present invention.

A use case constraint can be either atomic or compound. A compound constraint is composed of multiple atomic constraints constructed using Boolean operators (and, or and not). An atomic constraint is a 3-tuple <E, R, V> where E is the entity, R is the relational operator and V is the value. Values assigned to entities of the system can be either units such as "logged in" or numeric. For instance a use case precondition "System is Active" can be written as <System, =, Active>. In order to incorporate this structure in the use case metamodel, we add the following meta-classes: Constraint, Atomic, Compound, Value, Relation, Numeric and Unit. FIG. 16 shows the excerpt of the use case constraint metamodel 1600. The complete extended use case metamodel 1700 visualizing the completeness and the connectivity between the components is shown in FIG. 17. The shaded meta-classes are enumeration classes. The extended use case diagram metamodel along with other encouraging applications such as Effort Estimation for use case analysis and application for metamodel interchange among UML tools are provided by the inventors, M. Misbhauddin and M. Alshayeb, "Extending the UML Use Case Metamodel with Behavioral Information to Facilitate Model Analysis and Interchange," Manuscript submitted for publication, King Fand University (KFUPM), Saudi Arabia.

Since the extended metamodel for use case diagram adds behavior, we need to augment the formal definition of the use case. A formal definition of a use case flow is given in Table 18.

TABLE 18

Formal Definition of a Use Case Flow

| | |
|---|---|
| Definition 4.4: | A use case flow is a 6-tuple = $\mathbb{U}_{flow}$ = {𝕒, action, step, ≤, anchor,$WF_{\mathbb{U}_{flow}}$} where: |
| 1. | 𝕒 is a finite set of actors |
| 2. | action is a finite set of action labels |
| 3. | step ⊆ 𝕒 × action × 𝕒 is a finite set of steps in a use case flow |
| 4. | ≤ is a partial ordering between steps and anchor |
| 5. | anchor is a set of location anchors part of the use case flow causing inclusion or variation |
| 6. | $WF_{\mathbb{U}_{flow}}$ is a set of well-formedness rules on the Use Case Diagram UC |

A use case step s ∈ step consists of the components listed in Table 19.

TABLE 19

Components of a Use Case Step

| | |
|---|---|
| sender(s) ∈ 𝕒: | the actor initiating the action event. |
| acc(m) ∈ action: | the action event performed by the use case step. |
| arg(m): | a list of arguments. |
| receiver(m) ∈ 𝕒: | the actor receiving the action event. |

Anchors in a use case flow are classified into two different categories, i.e., Inclusion and Variation. An inclusion anchor inc ∈ anchor consists of a name and a body. The body of an inclusion anchor is given by another flow $\mathbb{U}_{include}$. A variation anchor var ∈ anchor consists of the following components listed in Table 20.

TABLE 20

Components of a Variation Anchor

| | |
|---|---|
| name(var): | the name of the alternate flow or another use case. |
| constraint(var): | the condition at which the variation is invoked. |
| rejoin (var): | the rejoin point from the variation. |

The body of a variation anchor is given by another flow $\mathbb{U}_{extend}$.

Object Constraint Language (OCL) is a specification language and not an action language for UML. It is mainly used to write queries to access model elements and their values and state constraints on model elements. UML model elements are annotated with OCL constraints to ensure their proper usage and validity of the whole model.

Figure 18:
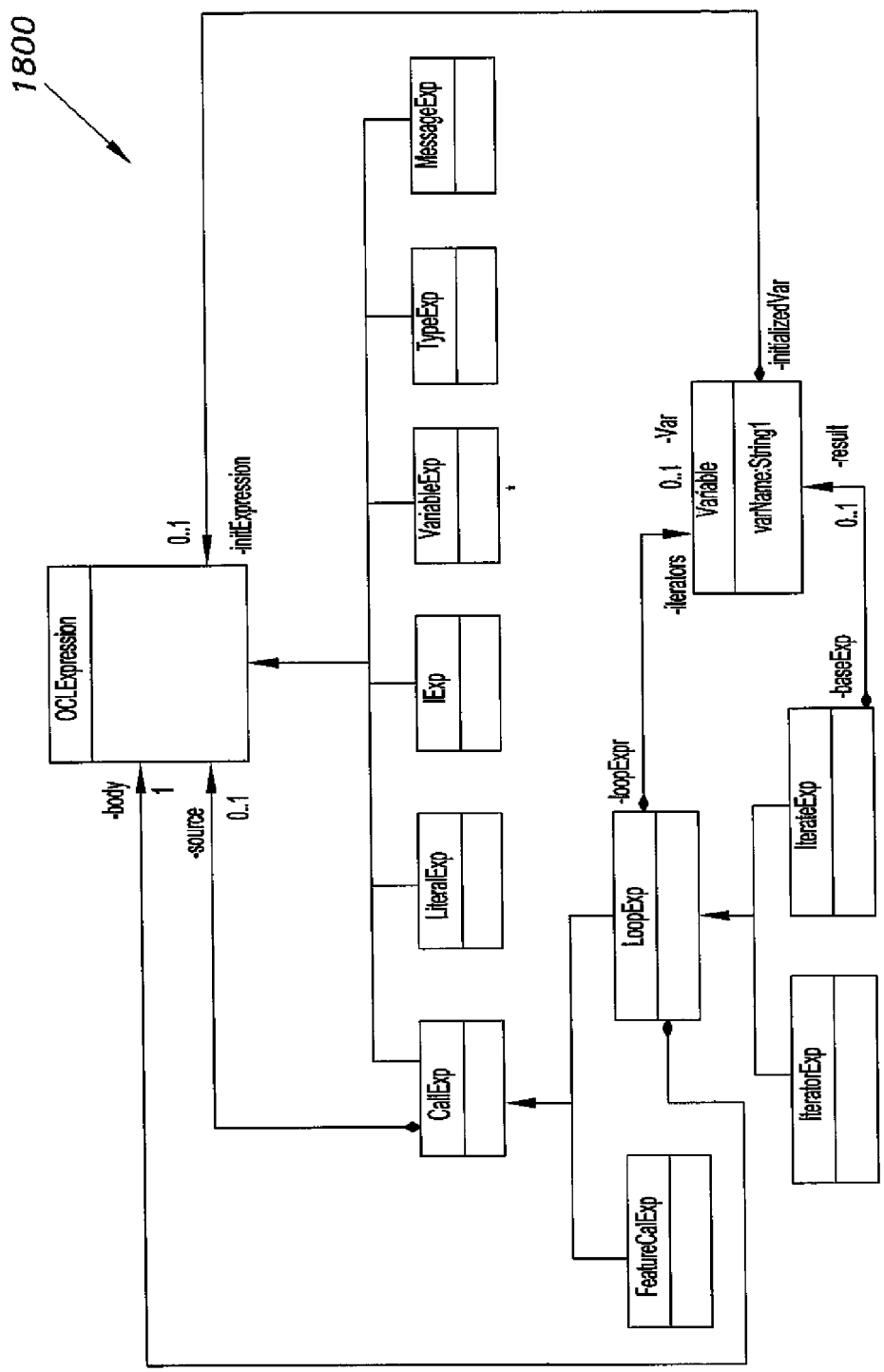
FIG. 18 is a block diagram showing the OCL metamodel according to the present invention.

The OCL Metamodel 1800 part of the UML OCL 2 specification is given in FIG. 18. As with the UML diagrams described in the previous subsections, all of them have constraints associated with one or more of their elements. The main reason for including the OCL metamodel, as part of the integrated model, is to have a consistent structure for all the constraints provided by the UML diagrams. A constraint in OCL is composed of a context and a set of expressions as defined in Table 21.

TABLE 21

Constraint in an OCL Metamodel

| | |
|---|---|
| [Context] | The context contextof an OCL constraint consists of: name (context), an optional name to address the context within the constraint's body of expressions. Alternatively, the "self" is also used.<br>element(context) ∈ {ℂ ∩ Attr ∩ Op} refers to the model element on which the constraint is defined. |

TABLE 21-continued

Constraint in an OCL Metamodel

| | |
|---|---|
| [Expression] | An expression exp of a constraint consists of the following components:<br>type (exp) ∈ {inv, pre, post, init}<br>name (exp)<br>body (context) |

Figure 19:
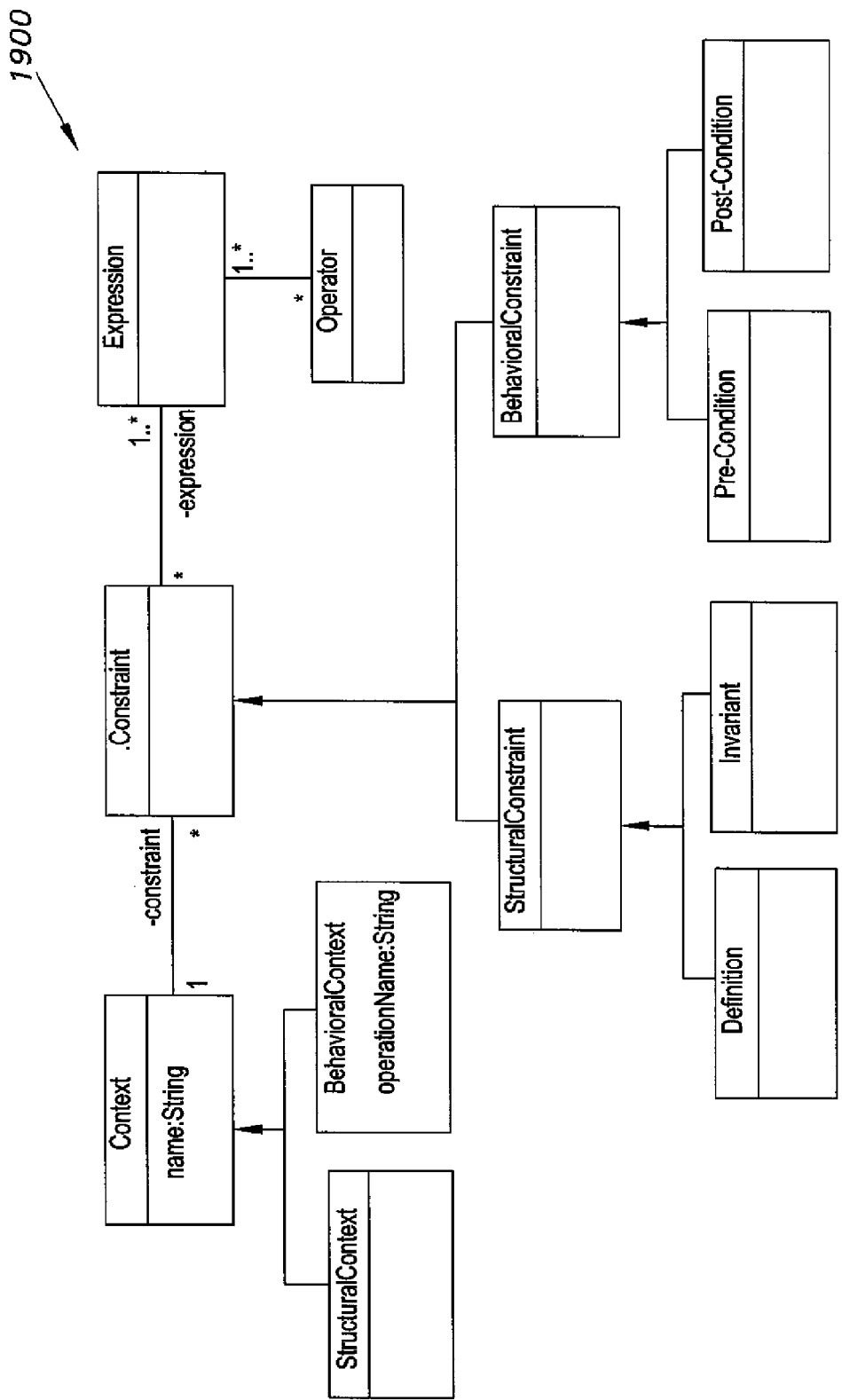
FIG. 19 is a block diagram showing an excerpt of the extended OCL metamodel according to the present invention.

Although the OCL metamodel proposed by OMG is complete, it is rather comprehensive. Not all meta-classes included in the metamodel are used when describing constraints over the diagrams considered in our work. To make the OCL metamodel usable for describing constraints from class, sequence and use case diagrams in a structured yet simple manner, we adopt the extension proposed in the prior art in which a metamodel is developed from the UML metamodel to ensure integration with the latest UML standard, the OCL EBNF (Extended Bacchus-Naur Form) grammar and the OMG OCL Metamodel. The excerpt 1900 of the OCL metamodel considered for our work is shown in FIG. 19. The Constraint meta-class consists of one or more expressions (Expression meta-class) and is associated with a Context meta-class.

Modeling a complex system requires the software designers to concentrate on multiple different aspects of the system. Designers have to take into account the static structure (attributes and operations), the dynamic behavior (scenarios, invariants), and its functional behavior (requirements, access rights) etc. Often complex metamodels are decomposed into a number of views particularly for multi-perspective metamodels such as UML. Designing models that conform to these metamodels often face consistency and integration problems between the different views. Usually, different views of the same metamodel share a common core. This common core inter-relates different views both at syntactic and semantic level. The UML specification provides only the syntactic commonality between views through high-level packages. With the advent of MDA, a number of approaches to integrate multiple views synthesizing semantic information have been proposed in the literature. We identify an Integrated Metamodel for refactoring multiple UML views.

Model Integration can be defined as the creation of links between previously separated models, services or processes. Although referenced by multiple terms such as Model Composition, Model Synthesis, Model Weaving and Model Merging, the concept of model integration has been applied to the domain of Model-driven software engineering for numerous applications. Some of the prominent applications include integrating formal approaches to visual modeling languages, integrating complementary information, merging/synthesizing models and interoperability with other enterprise metamodels. In order to link models at the same or different levels of abstraction, MDA provides two model integration approaches as set forth in Table 22.

TABLE 22

Model Integration Approaches

| | |
|---|---|
| 1. | Model merging-based integration: Two or more models are merged together to produce a model at the same or lower level of abstraction. |
| 2. | Metamodel-based integration: A mapping is defined between the metamodels of the models to integrate |

The present UML model integration and refactoring method uses the metamodel-based integration approach to propose an Integrated metamodel. Integrating models at the metamodel level allows efficient use of Model-Driven Architecture techniques such as model weaving and model transformation. The main motivation for integrating metamodels in the present refactoring method is to propose model-driven refactoring over multiple views of UML. Two main advantages of using an integrated metamodel for refactoring are set forth in Table 23.

TABLE 23

Advantages of Using an Integrated Metamodel for Refactoring

1. Interoperability: The flow of information between multiple views can be visualized and aids in establishing techniques on how to extract or understand the information in order to process them.
2. Inter-navigability: Navigating across multiple models to identify refactoring opportunities can be very difficult. An integrated metamodel provides inter-navigability that allows accessing related information for smell detection and model refactoring.

Figure 20:
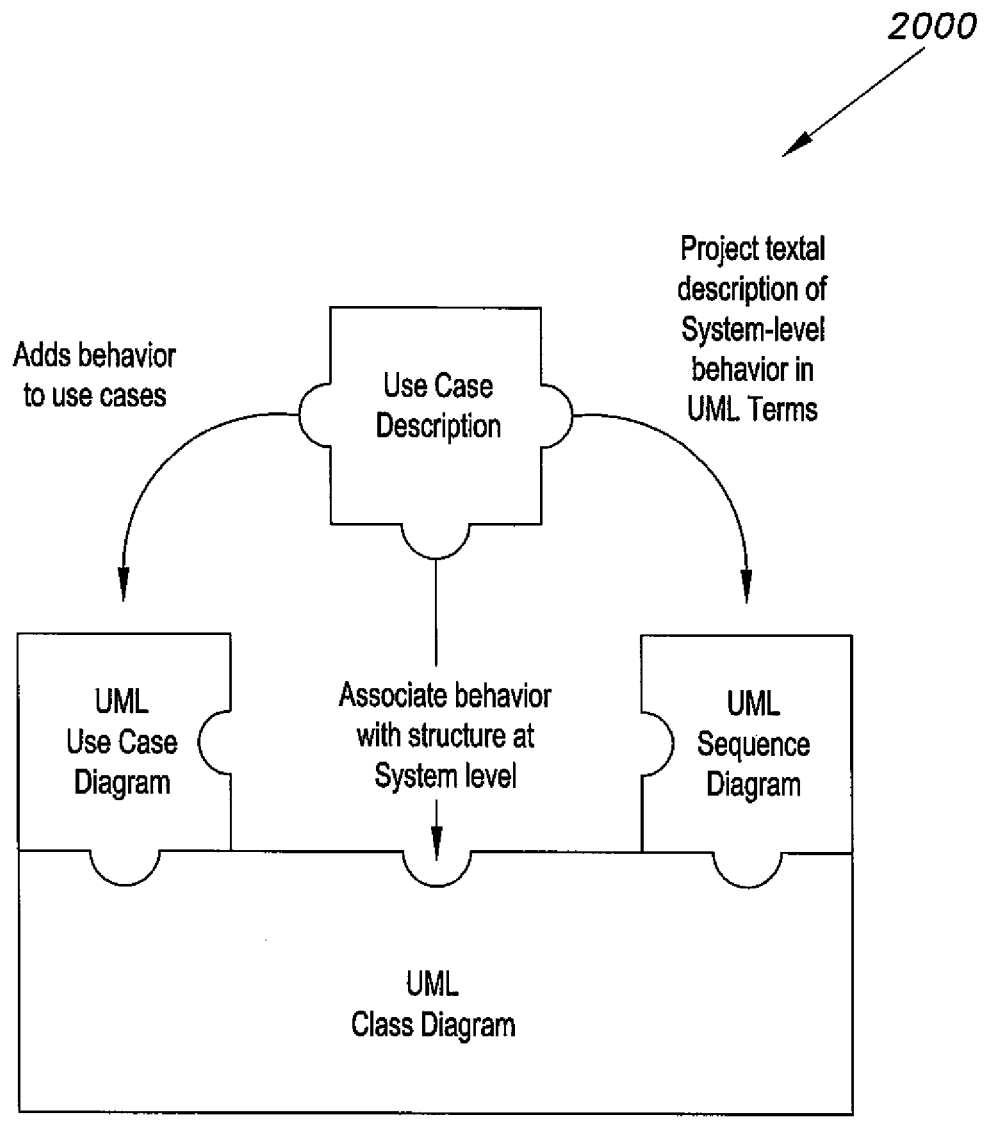
FIG. 20 is a diagram showing UML model integration elements according to the present invention.

The UML specification provides numerous different diagrams that allow designers to model the structural, behavioral and functional aspects of the system under development. The Integrated Metamodel proposed in this work is developed incorporating one diagram from each UML view. These diagrams cover structural, behavioral and functional concepts of UML. This restriction is introduced for a single primary reason: to avoid unnecessary complication in metamodel integration and model-driven refactoring. However, the approach can be extended and applied to the entire suite of UML diagrams. To allow smooth integration of the metamodels, we initially identified missing information required to synthesize these metamodels. This information is pictorially depicted as the UML Model Integration Elements 2000 in FIG. 20.

In order to facilitate integration of the missing information, the present method extends the UML metamodels of Use Case diagram and Sequence diagram to ensure seamless integration. The Integrated metamodel is composed of metamodel of the class diagram (see FIG. 2) that represents the structural view, extended metamodel of the sequence diagram (see FIG. 5) that represents the behavioral view and the extended metamodel of the use case diagram (see FIG. 17) that represents the functional view. In order to ensure complete modeling of information, the Integrated metamodel also incorporates the OCL metamodel so that constraints (from class diagrams), invariants and guards (from sequence diagrams) and pre and post conditions (from use case diagrams) are structurally represented. In order to ensure that the integrated approach is unobtrusive, we followed known integration principles summarized in Table 24.

TABLE 24

Integration Principles

1. Standard UML should be retained as a subset in which existing constructs keep their roles and semantics.
2. Integration should support complete applications, so links between integrated models and existing UML models should be well defined and close.
3. Integration should introduce as few new model elements into UML as possible.

In order to obtain the integrated metamodel, we follow a stepwise model composition approach. The metamodels for use case and sequence diagrams are initially composed and then this resultant metamodel is composed with the class diagram metamodel.

Figure 21:
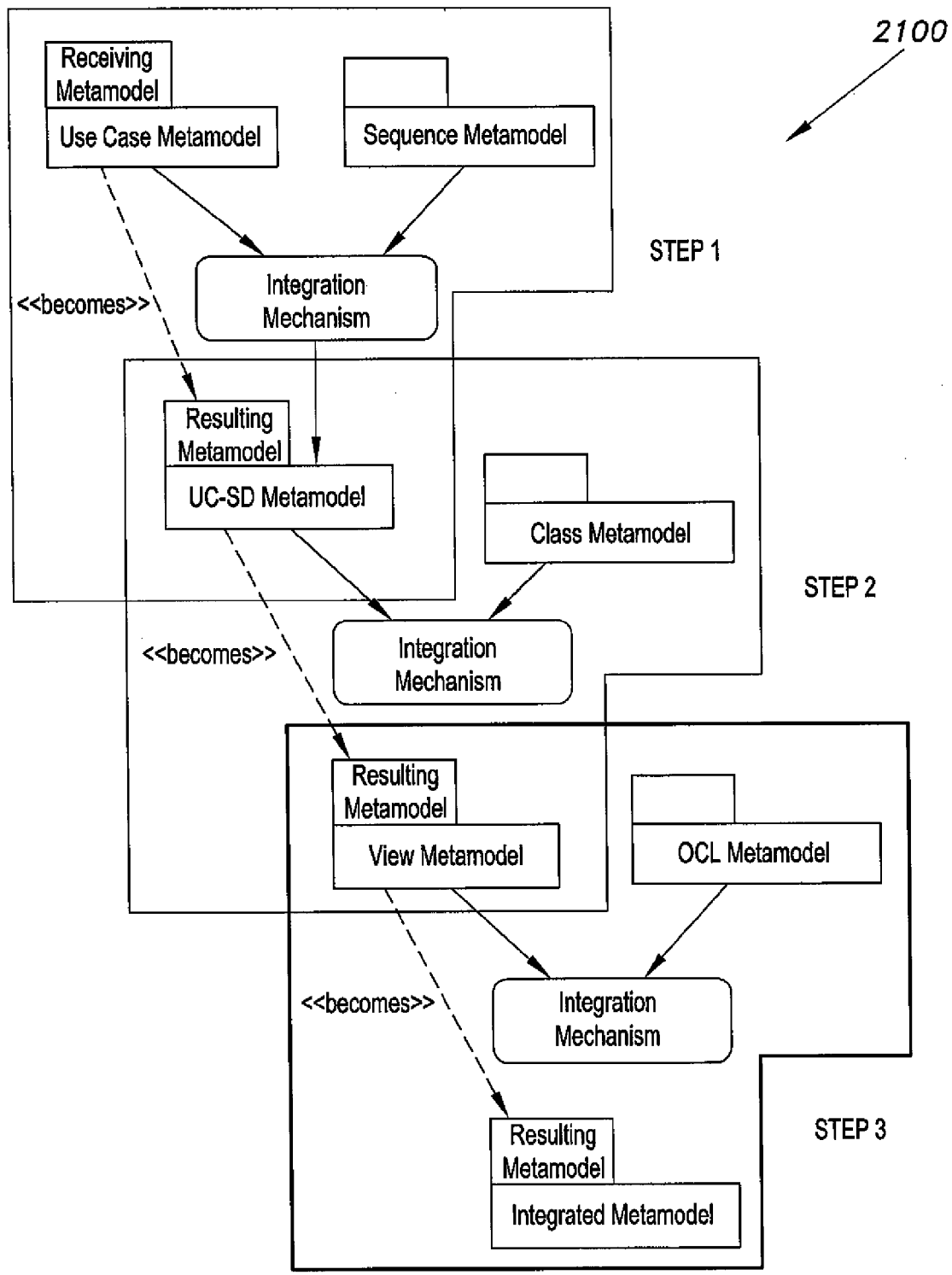
FIG. 21 is a block diagram showing a Model Integration Framework according to the present invention.

The OCL metamodel is added to get the Integrated metamodel. Based on a known composition semantic definition, a block diagram of integrated metamodel composition 2100 is shown in FIG. 21. The receiving metamodel is a term used to specify the metamodel into which the other metamodel is composed inside. The resulting metamodel is a term used to specify the metamodel obtained after the composition has been performed. Based on existing methodologies metamodel integration mechanism involves steps: (1) a comparison step in which Correspondence between elements of the metamodel are identified and stored as a set of rules known as correspondence rules (also called comparison rules, mapping rules or matching rules); (2) an integration step in which Models mapped in the previous step are integrated in this step based on an integration strategy. The integration strategy defines which elements will appear in the integrated model and how these elements will be organized, and (3) a consistency step in which design errors, adverse properties and conflicts are discovered.

With respect to STEP 1, the Sequence and Use Case Metamodel Composition, in each step, we first identify correspondence between elements of the two metamodels. In order to identify correspondence, we generate a traceability matrix that highlights the mapping links between the two metamodels. The traceability matrix identifies the following types of correspondence links between the metamodel elements.

The Syntactic Similarity (SYN) correspondence relationship indicates that the two meta-classes related to each other by this link are syntactically equivalent. Usually, syntactically similar meta-classes are specializations of a common super-class in the UML Specification. Syntactically similar meta-classes are merged together in the resulting metamodel.

The Semantic Similarity (SEM) correspondence relationship indicates that the two meta-classes related to each other by this relation are semantically equivalent. In order to integrate semantically similar meta-classes in the resulting metamodel, correspondence rules are defined.

The Inclusion (INC) mapping link indicates that the meta-class is included in the resulting metamodel although no similarity exists between this meta-class with other meta-classes. Correspondence rules are defined to describe the association of this meta-class with other meta-classes in the receiving metamodel.

The Exclusion (EXC) mapping link indicates that the meta-class is excluded from the resulting metamodel. Typically, the main reason for exclusion is its relevance to the application of the Integrated Metamodel.

Figure 22:
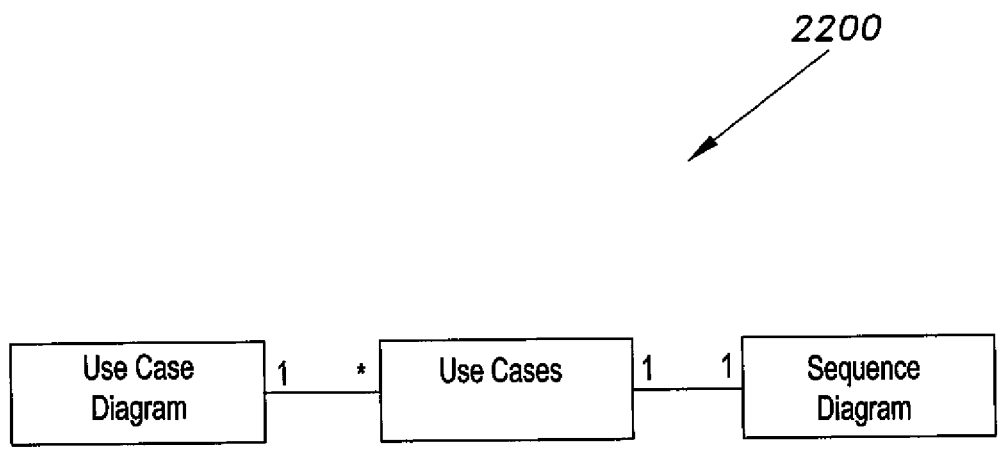
FIG. 22 is a block diagram showing the abstract relationship between Use Case and Sequence Diagram.

The Dependency (DEP) mapping link indicates that the two meta-classes related to each other by this relation are dependent. Meta-classes related by this link are usually kept in the resultant model and a directed dependency link is added between them. A block diagram of the abstract relationship 2200 between Use Case (UC) and Sequence Diagram (SD) is shown in FIG. 22. The use case metamodel included in the UML specification provides only its structural elements. This is the reason why the use case metamodel was augmented with behavioral information by integrating use case flows or scenarios. Hence, this augmentation has made the use case diagram more similar to the sequence diagram. Based on this information, the use case metamodel is considered the receiving metamodel as it is composed of sequence diagrams. In order to keep the size of the traceability matrix to a manageable dimension, the inclusion and exclusion meta-classes are listed separately in Table 25.

TABLE 25

Inclusion and Exclusion Meta-classes in Step 1

| Mapping Link | INC | EXC |
|---|---|---|
| Use Case Meta-classes | Use Case Constraint Include Extend AsyncExtend | Description SpecialREQ RejoinPoint |
| Sequence Meta-classes | StateInvariant | PartDecomposition ConsiderIgnore |

Another important observation is that the Constraint and StateInvariant meta-class are added to the Integrated metamodel as-is in this step until the final step of OCL metamodel integration. Another important decision is to decide which meta-class to include in the Integrated metamodel in case of Structural Similarity. Based on the principles of integration summarized supra, meta-classes closer to the UML standard are retained.

Figure 23:
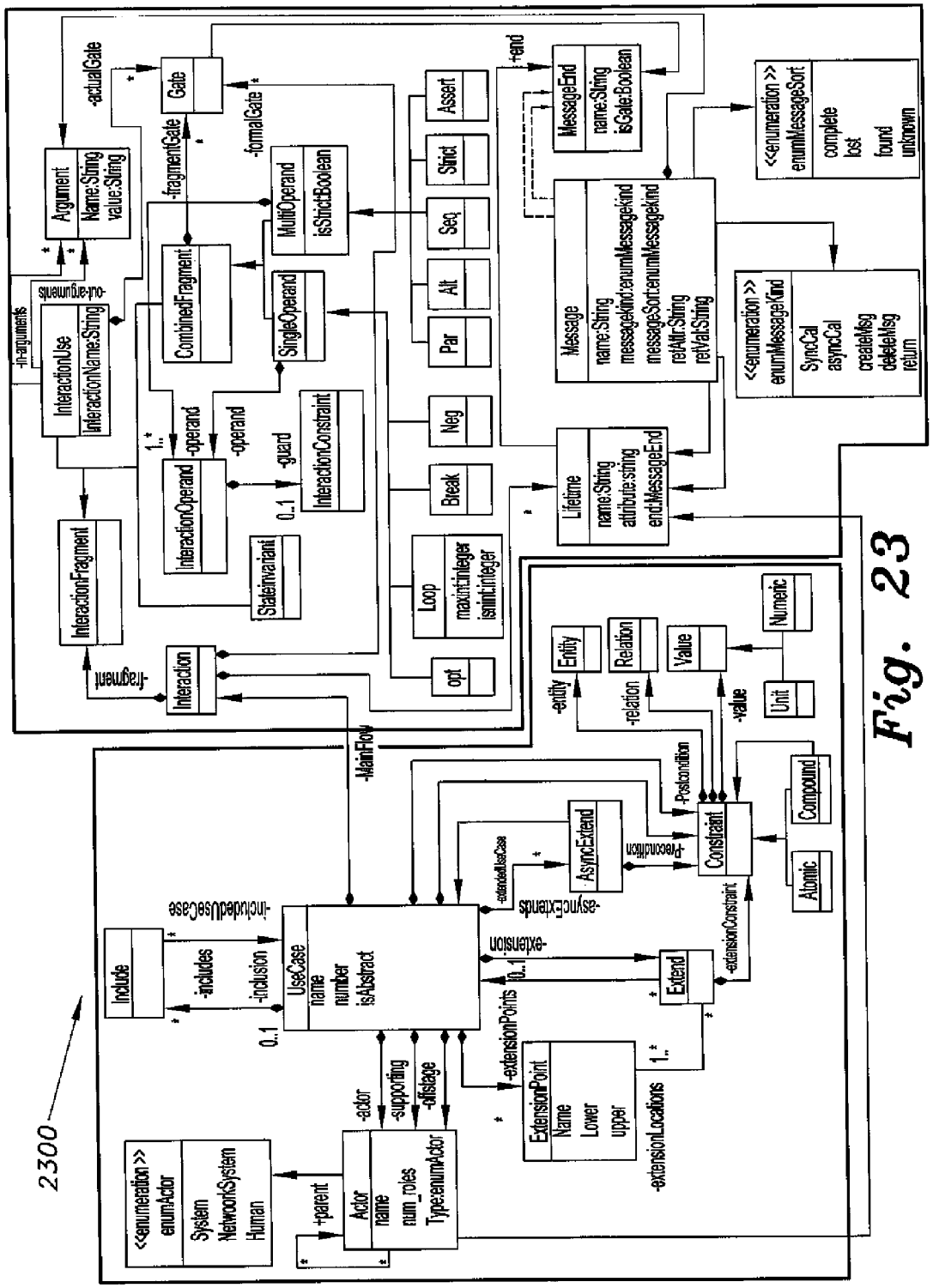
FIG. 23 is a block diagram showing the UC-SD (Intermediate) Metamodel according to the present invention.

The meta-classes for Include and Extend are added to the Inclusion list as they merely list the use cases included or extended by the base use cases. Their use in the behavior is provided by anchors (inclusion and variation) included in the traceability matrix. Based on the traceability matrix shown in Table 26, a set of correspondence rules were generated that can be used for composing the use case and sequence diagram metamodel. The intermediate resulting metamodel (referred to as UC-SD metamodel 2300) is shown in FIG. 23.

TABLE 26

Traceability Matrix for Use Case and Sequence Metamodel Composition

| Sequence Diagram Meta-classes | Use Case Diagram Meta-classes | | | | | | | | |
|---|---|---|---|---|---|---|---|---|---|
| | Extension | | Flow | | | | Event Step | | |
| | Actor | Point | Main | Child | Sub | Alt | Sender | Receiver | Action | Argument |
| Lifeline | DEP | | | | | | | | | |
| Message | | | | | | | | | | SYN |
| Message End | | | | | | | SEM | SEM | | |
| Interaction | | | SYN | SEM | | | | | | |
| Opt | | | | | | SEM | | | | |
| Loop | | | | | | SEM | | | | |
| Break | | | | | | SEM | | | | |
| Neg | | | | | | SEM | | | | |
| Par | | | | | SEM | | | | | |
| Alt | | | | | | SEM | | | | |
| Seq | | | | | SEM | | | | | |
| Strict | | | | | SEM | | | | | |
| Assert | | | | | | SEM | | | | |
| Critical | | | | | | SEM | | | | |
| Gate | | | | | | | SEM | SEM | | |
| Interaction Use | | SEM | | | | | | | | |
| Argument | | | | | | | | | | SYN |

| Sequence Diagram Meta-classes | Use Case Diagram Meta-classes | | | |
|---|---|---|---|---|
| | Inclusion Anchor | | Variation Anchor | |
| | Internal | External | Internal | External |
| Lifeline | | | | |
| Message | | | | |
| Message End | | | | |
| Interaction | | | | |
| Opt | | | SEM | |
| Loop | | | SEM | |
| Break | | | SEM | |
| Neg | | | SEM | |
| Par | SEM | | | |
| Alt | | | SEM | |
| Seq | SEM | | | |
| Strict | SEM | | | |
| Assert | | | SEM | |
| Critical | | | SEM | |
| Gate | | | | |
| Interaction Use | | SEM | | SEM |
| Argument | | | | |

With respect to STEP 2, the Class Metamodel Composition, integrating the class diagram metamodel is simpler than the use case and sequence diagram metamodel integration. Although most of the traceability links between the class diagram metamodel and the UC-SD metamodel are structural similarity, we discourage its use due to the principles followed in the integration process. Hence, instead of merging the structurally similar meta-classes, we add the Dependency relationship between the related meta-classes. Thus, the structure of the class diagram remains intact for model evaluation and the dependency relation aids in navigating related information for model smell detection and refactoring. The mapping links between the class diagram meta-classes and the UC-SD meta-classes are shown in Table 27.

TABLE 27

Traceability Mapping Between Class
and UC-SD Metamodel Classes

| Class Diagram Meta-classes | Mapping Links | UC-SD Meta-classes |
|---|---|---|
| Class | DEP | Lifeline |
|  | DEP | Actor |
| Property | INC |  |
| Operation | DEP | Message |
| Parameter | SYN | Argument |
| AssociationEnd | INC |  |
| AssociationClass | INC |  |
| Association | INC |  |
| Generalization | INC |  |
| Dependency | INC |  |

Operation meta-class in the class diagram metamodel is structurally similar to the Message meta-class in the UC-SD metamodel. In order to keep the semantics of the class diagram intact, a dependency link between the Operation meta-class and the Message meta-class is added. Because of the above-mentioned composition, the Parameter meta-class is merged into the Arguments meta-class in the UC-SD metamodel. Since the Parameter meta-class has an attribute called direction, the association relationship between the Arguments meta-class and the Interaction Use meta-class is modified. Initially there were two associations differentiating between the input and the output arguments. These associations are now replaced with a single association and the direction attribute will handle the type of the argument (i.e. in or out).

Figure 24A:
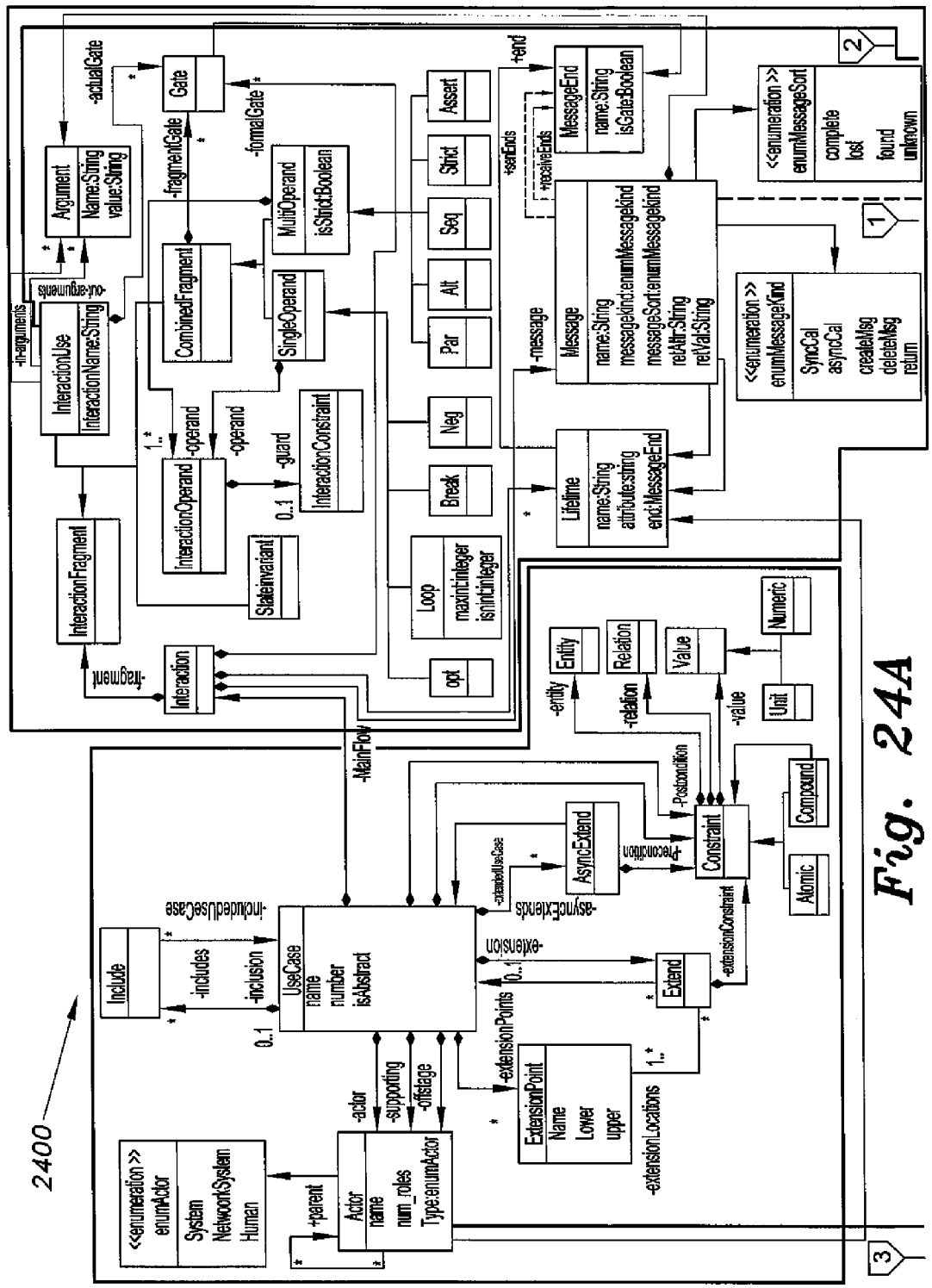
FIGS. 24A-24B show a block diagram of the View (Intermediate) Metamodel according to the present invention.
Figure 24B:
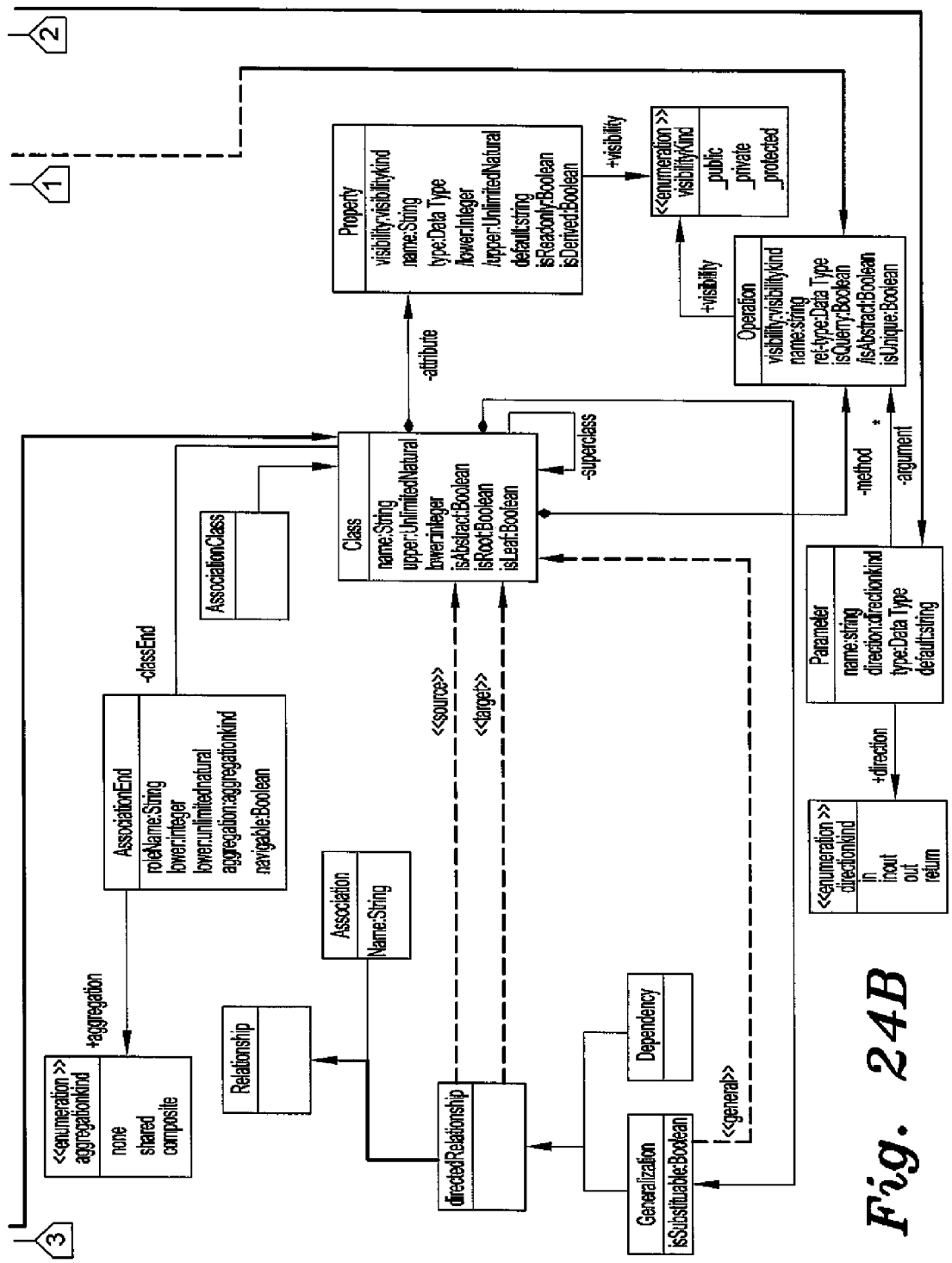

A dependency relation is added between the Class meta-class and the Lifeline and Actor meta-class. This relationship is justified by the fact that any lifeline included in a sequence diagram needs to be available as a class instance in the class diagram. Similarly, an actor in the use case represents the role, which is usually transformed into an entity class within the class diagram. Hence, a dependency link between the Class and Actor meta-class is also added to the Integrated Metamodel. A partially integrated metamodel 2400 that integrates the class diagram metamodel with the UC-SD metamodel is given in FIGS. 24A-24B.

STEP 3, the OCL Metamodel Composition, is the final step in the stepwise composition of the metamodels. The OCL metamodel defines a structure for describing the various constraints and invariants provided by the different views. The main meta-class in the OCL metamodel is the Constraint meta-class.

Figure 25:
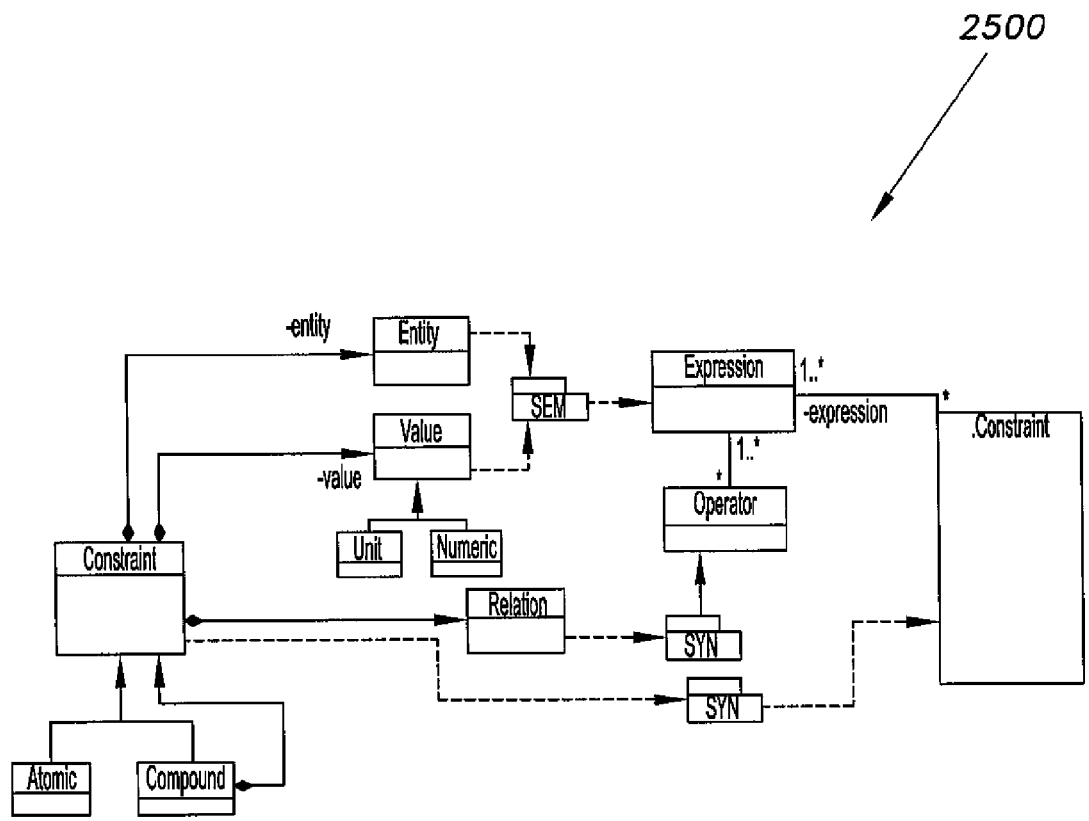
FIG. 25 is a block diagram showing Traceability Mapping between UC Constraint and OCL Metamodel according to the present invention.

Since the context will be directly related to the Constraint meta-class in the Integrated metamodel, the meta-classes Context and its specialized classes StructuralContext and BehavioralContext are excluded. Based on the extension proposed for the Use Case constraints in the extended use case metamodel, a traceability mapping 2500 was established between Constraint metamodel (from Use Case) and the OCL Metamodel, as shown in FIG. 25. Hence, as a result the constraints from the use case metamodel are mapped directly as context to the Constraint meta-class provided by the extended OCL metamodel.

The StateInvariant meta-class is replaced with a composition relation between the Constraint meta-class and the Lifeline meta-class. Although the StateInvariant meta-class was a subclass of the InteractionFragment meta-class in the View metamodel, the context of the invariant is the lifeline. Hence, the path "Interaction (composition) Interaction Fragment (super-sub) StateInvariant" was reduced by directly relating it to the Lifeline meta-class. Another constraint from the sequence metamodel is the Interaction Constraint that guards the Interaction Operand. Similar to the above mapping, a composition relationship is added between the InteractionOperand meta-class and the Constraint meta-class excluding the Interaction Constraint meta-class from the integrated metamodel.

The relationship between the Constraint meta-class and the Class, Property and Operation meta-classes is borrowed from the prior art. These relationships can be exploited to create a translation mapping between the OCL metamodel and the View metamodel.

The most important way in which an OCL expression with type as context can be used is as an invariant. An invariant can be defined as a Boolean expression that evaluates to true if the invariant is true. Associating an invariant with a Class in a model means that any system made according to the model is faulty when the invariant is not met. This is represented in the integrated metamodel by the composition relationship with role-name inv between the Class meta-class and Constraint meta-class.

An initial value for a property can also be given by an OCL expression. An initial value is the value that the instance of the class will have on creation. This is represented in the integrated metamodel by the composition relationship with role-name init between the meta-classes Property and Constraint.

An attribute may also have a derivation rule. Attribute is an instance of the meta-class Property in the Class Metamodel, and the derivation rule is an instance of the meta-class BehavioralConstraint. The fact that the rule describes the derivation for attribute is represented in the integrated metamodel by the composition relationship with role-name derivation between the meta-classes Property and Constraint.

Figure 26A:
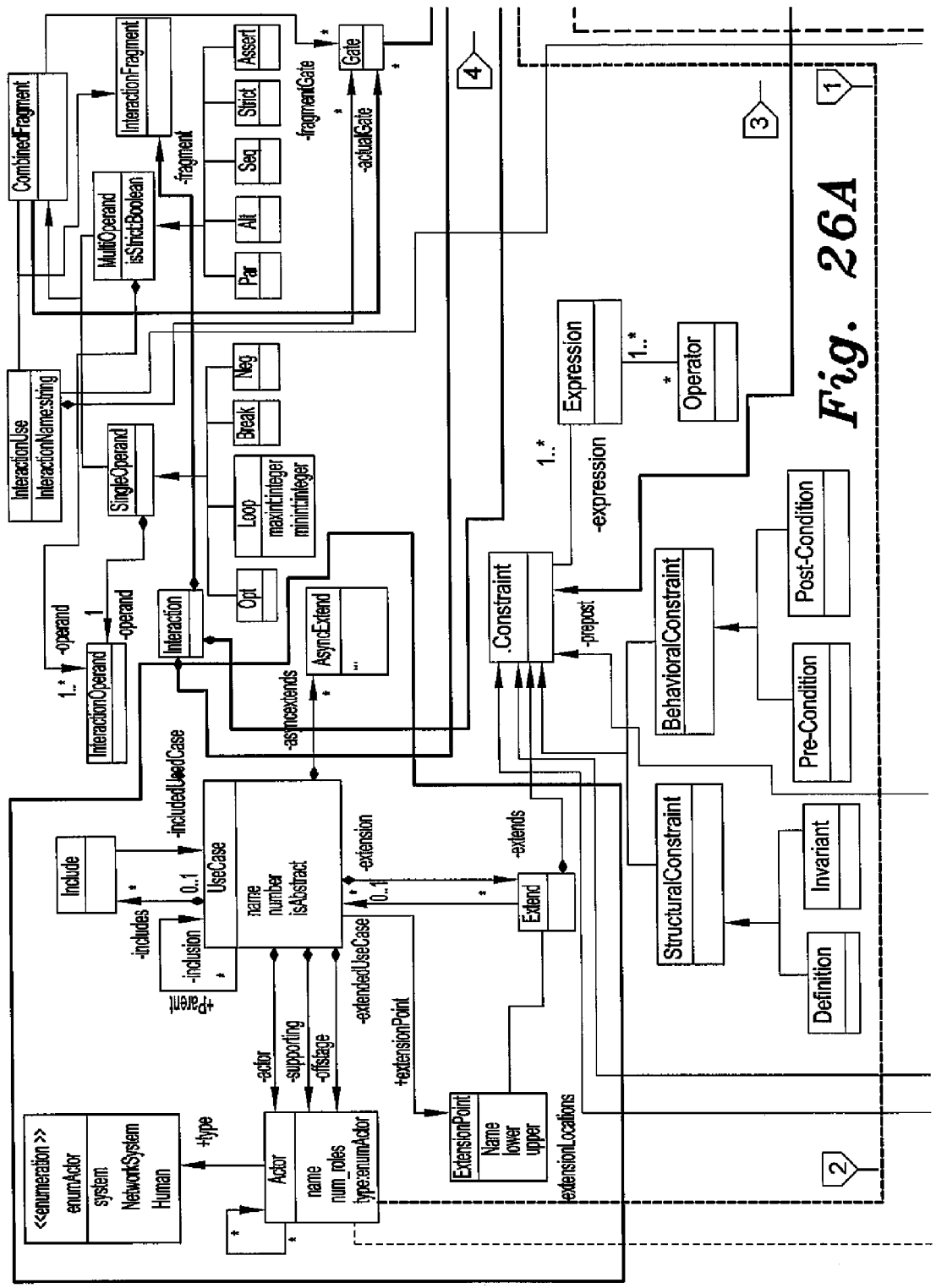
FIGS. 26A-26C are a block diagram showing the Complete Integrated Metamodel according to the present invention.
Figure 26B:
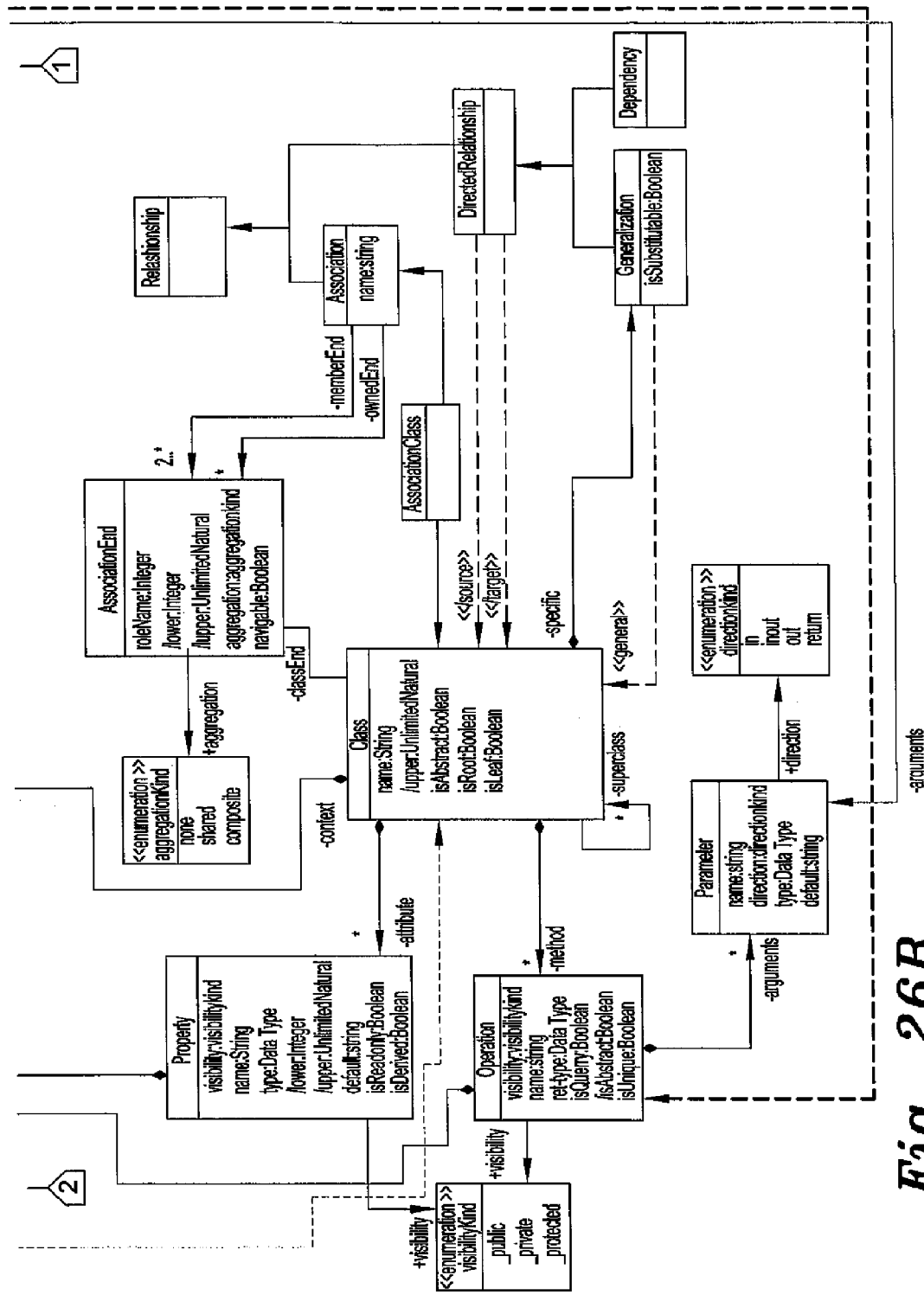
Figure 26C:
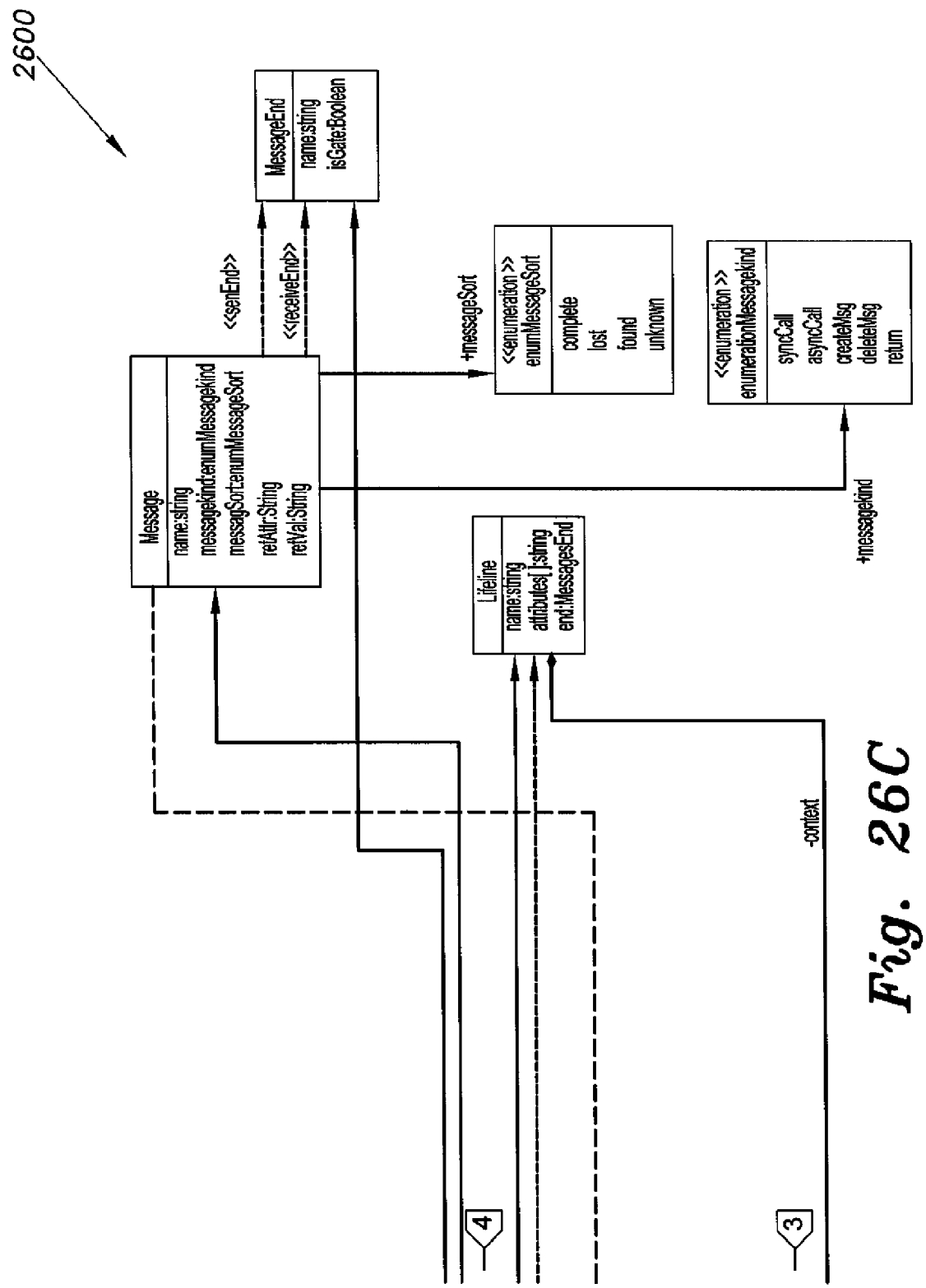

Constraints attached to an operation that defines what properties should be true at initiation of the operation and at termination of the operation when it executes normally are represented by preconditions and post-conditions. This is represented in the integrated metamodel by the composition relationship with role-name pre and post between the meta-classes Operation and Constraint. A complete diagram of Integrated metamodel 2600 is depicted in FIGS. 26A-26C.

Refactoring methods include a first style that identifies and describes a refactoring opportunity (or bad smell) first and then proposes a set of refactorings that either removes or alleviates the effect of this smell (also known as Smell-Based Refactoring). A second refactoring style describes a refactoring first and then provides a list of instances in which this refactoring can be applied. Both ways can be used when defining refactorings. For example, as known by artisans having ordinary skill, a Lazy Class can be identified as a bad smell that occurs when a class is not handling enough responsibility in a system. In order to remove this smell, either the Collapse Hierarchy refactoring (if a subclass) or Inline Class refactoring (if not a useful component) may be used. An Extract Method refactoring process may be defined and then provided motivations (Long Method or Complex Method) regarding when to use this refactoring (a.k.a. Bad Smell). The present method uses the former method of defining and describing refactorings over the integrated model because (1) All model elements in the integrated model are similar to the model elements provided by UML. Hence refactoring operations over these elements (add, modify or remove) are already proposed in the literature. We make use of these primitive refactorings and propose a composite refactoring to handle the refactoring opportunities identified in this work, and (2) Structuring refactoring definitions around bad smells increases comprehension and readability.

A text based extensible markup language metadata interchange (XMI) model specification and transformation language is used in the present refactoring method. XMI affords portability in that models created in any UML CASE tool can be used for refactoring with minimal translation effort. XMI affords ease of use in that models represented in XMI are easier to follow as they are based on well-structured XML Schemas. Simplicity of structure plays an important role when it comes to implementing complex refactoring operations. Moreover, XMI-based standards provide numerous ways in which important refactoring activities can be expressed. For instance, XPath or XQuery can be used to describe refactoring opportunity detections and the like.

Apart from numerous advantages, using text-based approaches such as XMI introduces a number of challenges. A major trade-off with XMI is the lack of formality. In order to overcome this issue, a lot of effort was invested in the design and implementation of parsing and model checking algorithms to ensure behavior preservation and model consistency. Two other relevant challenges posed are the amount of deep nesting and cross-referencing when working with XMI based approaches. The present refactoring method circumvents these issues by mapping original XMI representations of UML models onto a simpler schema (an intermediate XMI representation) which resolves cross-referencing by replacing IDREF's with relevant information for model analysis and transformation. The intermediate schema also reduces the depth of tag nesting to a maximum of three, which aids in model navigation for smell detection algorithms.

The focus of model smell detection is to fulfill the requirements regarding the description of the smell patterns. The core requirement for smell description is to describe them in a general and comprehensive manner. Smells are queries, which on execution must be able to detect their instances in the representation format of the model. The most well-known, widely used and standardized XML-aware query language is XQuery.

XQuery is a functional and declarative language that supports concepts of user-defined functions and modules which allows grouping of related functions into independent packages. In our approach, we use XQuery to describe models smells over the integrated model.

Several techniques are available to perform refactoring application over models. These techniques have been classified into different top-level taxonomies. Table 28 lists some of the popular approaches.

TABLE 28

Approaches for Refactoring

1. Direct Manipulation Approach: uses an internal representation of the model and a programming interface to manipulate the model. Tools that follow this approach make use of general programming TABLE 28-continued Approaches for Refactoring languages like Java, C++ etc. providing a minimal infrastructure to organize the transformations. Transformation rules, behavior preservation primitives and scheduling in this approach are mainly done from scratch. The advantage of using a direct manipulation approach includes control over the internal representation of the model for model traversal and reorganization. But since transformation rules are implemented by the user from scratch in this approach, it makes the transformation process cumbersome and hence affects reusability.
2. Generic Transformation Approach: uses tools and languages such as XSLT or graph transformation tools. Although a number of languages are available in the literature for XMI-based representations, XSLT is considered the most popular of them all. Implementing model transformations using generic approaches such as XSLT seem attractive as models are serialized using XMI. Model refactoring using XSLT usually leads to non-maintainable implementation because of the verbosity and poor readability of XSLT. an alternative approach proposed in the literature is to use XSLT to execute model transformation on the back-end instead of specification. An alternative approach used in the literature is to use QVT relations to specify transformations and implement each relation as an XSLT rule template. The main reason specified for using XSLT as a back-end language is due to its low-level syntax. However, these approaches overcoming the previously listed problems also suffer from poor efficiency, as the pass-by-value semantics of XSLT require a large amount information copying.
3. Template Based Approach: separates the process of transformation rules description from the rule engine. A template usually consists of the target model containing splices of meta-information to access model elements from the source and perform model transformation. The source model accessing logic in this approach can be implemented in numerous ways. For instance, the logic could be a java code accessing the API provided by the internal representation of the source model or it could be declarative queries.

In the present refactoring method, the direct manipulation approach is used to define and apply refactoring over the XMI representation of the UML models. The motivation behind this selection is mainly due to the use of the present Integrated metamodel to represent the source model. The use of a direct approach allows complete control over the internal representation of the model for model traversal and transformation. Although fairly popular, XSLT and the template-based approach is not considered mainly because of the amount of information copying required between source and target models after each refactoring application and the high dependence of transformation engine tools respectively.

As with other model-driven refactoring approaches proposed in the literature, we make use of pre-conditions and post conditions to ensure behavior preservation after application of refactoring. Each primitive refactoring operation is associated with pre and post conditions. Although an algebraic framework is used to describe these constraints, these are converted into programming language routines by the direct manipulation approach. The present model refactoring process is outlined in Table 29.

TABLE 29

Refactoring Process

1. Model Parsing and Integration: To start, one model from each view specifically the class diagram, set of sequence diagrams and the use case diagram (along with use case descriptions) comprise the input layer of the approach. Each of these diagrams are serialized using XMI and are imported by the prototype tool. Before the integration, each diagram is checked for structural and semantic well-formedness based on the rules provided. Models are then unified into a single integrated model following the composition rules. The resultant model conforms to the integrated metamodel.

TABLE 29-continued

Refactoring Process

2. Model Traversal and Smell Detection: The integrated model is internally represented in the form of a Document Object Model (DOM) tree and traversed using an XMI parser. Model smells in the form of XQuery modules are then applied over the integrated model one-by-one. If a model smell exists within the model, the refactoring module is invoked.
3. Model Refactoring: The refactoring module invokes applicable rules from the repository and applies it over the model. Each refactoring rule in the repository is associated with two constraints ($T_{pre}$, $T_{post}$). If the pre-condition is satisfied, refactoring operations are applied over the source model. After refactoring, the post conditions are checked over the target model. If not satisfied, the refactoring operations are rolled-back and the source model is returned without any transformation.

The model refactoring template addresses (1) a description of the situation in which the refactoring opportunity is likely to occur; (2) a rationale i.e., reasons why the pattern described above is considered a model smell and is in need of change; (3) target quality improvements, i.e., quality aspects violated if this smell occurs. These usually include object-oriented principles, concepts and good design practices; (4) Smell Detection Strategy, i.e., a description of model smells using XQuery which is the actual core of the Refactoring Engine. As the framework is customized for the detection of model smells, it is demonstrated how XQuery is used to describe and detect bad smells in the Integrated Model. An algorithm of the detection strategy is included. The XQuery functions that realize this algorithm are also included; (5) Refactoring Mechanics, i.e., Refactoring operations can be classified into three categories based on their level of granularity: Primitive, Composite and Fine-Grain. Primitive refactoring is an atomic refactoring operation that cannot be split into more than one refactoring during application. A sequence of primitive refactorings is known as composite refactoring. Composition of refactoring allows application of sequential refactoring operations on the model as a single unit. Composite refactoring rules are provided (mainly due to the use of primitive refactoring operations for class, sequence and use case diagrams from the literature) to handle the detected model smell. This discussion is structured into four parts as follows: Name, Preconditions, Mechanics and Post conditions. Behavior preservation in the target model is ensured with the help of preconditions and behavior-preserving transformations (Mechanics). A list of post conditions, which should be valid after a refactoring, are also specified. Post conditions are useful in building tool support; (6) A simple example to illustrate the applicability of the model refactoring is included. Of course, such examples can only show certain aspects of the usability of model refactorings. They cannot demonstrate their complete functionality and the variety and flexibility of possible applications. Since there is no visual representation of the integrated model, the examples include separate class, sequence and use case diagrams; (7) Post Refactoring Improvements: The effect of refactoring on each view of UML considered is discussed to highlight the expected improvement; (8) Side Effects: Refactoring sometimes lead to violation of user-implemented strategies. Any side effects as a result of refactoring application are included in this subsection.

The present refactoring method is demonstrated herein over a Net Banking System (NBS) running case study. NBS is designed for financial institutions such as banks to provide their basic banking operations over the internet. The system allows customers to open accounts, perform online transactions like transferring money, paying bills and viewing account summaries. The system also allows bank operators and administrators to perform updates to the system online and handling other online operations.

Figure 27:
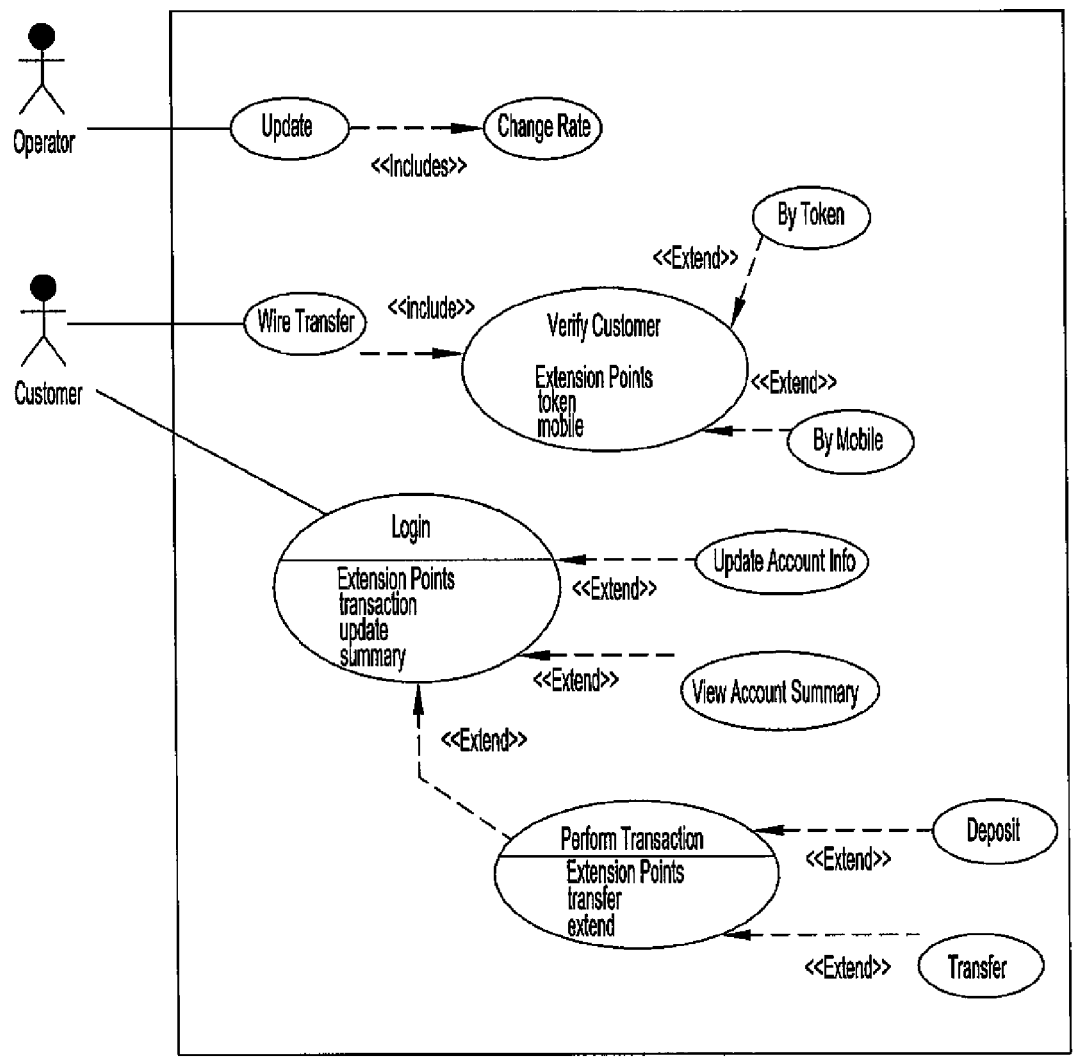
FIG. 27 is a block diagram showing Use Case Diagram of the Running Case Study.

The services provided by the system are summarized in Table 30 below and all functional requirements of the NBS system 2700 modeled through a use case diagram are shown in FIG. 27.

TABLE 30

Banking System Services

1. Open a new account: New customers and existing customers can open a new account.
2. Bill Payment: Customers can use one of their accounts for bill payment. Popular agencies that can receive bill payments are already stored in the system. A customer can either enter the amount to be paid or pay the full retrieved amount based on the vendor account information provided. Regular auto-pay service for recurring monthly payments can also be setup. Bills can be marked as Favorite to avoid entering information each time a payment is made to the same agency.
3. Transfer Funds: A customer can transfer money between his accounts. Transfers to other accounts require a Beneficiary setup prior to the transaction. If a transfer is made to an existing beneficiary, the setup process is by-passed.
4. Account Summary: A customer can get an account summary for all his accounts.
5. Transaction History: A customer can get transaction history for all his accounts. This includes all transactions performed between a selected duration of time.
6 Admin Services: The system allows bank operators and system administrators to perform system updates, conflict resolution, account management and update through the NBS.

With respect to integrated model smells, one type of smell is referred to as Creeping Featurism. Functional decomposition is a design methodology in which functionality provided by the system is modularized for fine-grain control over implementation and ease of understanding. Although useful in understanding the modular nature of a larger-scale application, functional decomposition is considered an anti-pattern when applied to object-oriented domain. Functional Decomposition in use cases is caused by separating analytical use cases into functions that yield a set of smaller use cases that are naturally easier to implement. This structuring, if not controlled, will result in many small use cases that offer little or no value to the system's users if executed individually. Hence, the use case structure creeps directly into the design of the system making it look like use cases completely obscuring the concepts of objects and their relationships. This is referred to as Creeping Featurism Model Smell.

Use cases in UML are structured using pair of relationships between them: include and extend. Functional decomposition most commonly occurs due to the misuse of the include relationship. The effects of functional decomposition do not simply stop at the functional level; it disperses into the structural and behavioral level as well. A high degree of functional decomposition will result in behaviorally rich classes manipulating a number of dumb data classes. This indicates that responsibility is improperly distributed among classes. Data classes are classes that have only attributes, getter operations and setter operation. Since getter and setter operations may be omitted by convention, a data class is just a collection of attributes which defeats the purpose of Object-Oriented design methodology.

The anti-pattern of functional decomposition has been addressed recently in the literature in the context of UML model refactoring. Three out of four detection approaches propose the use of class diagrams to detect functional decompositions. One major side effect in these propositions is the use of lexical analysis of class names to classify them as Functional classes. It has been previously known to describe the functional decomposition pattern over use case diagrams by simply merging the functionally decomposed use case into the base use case without further analysis. The Creeping Featurism Model smell detects the occurrence of functional decomposition over use case, sequence and class diagrams.

When working with use case diagrams, it can sometimes be the case that a number of use cases delegate smaller tasks to other use cases by making use of the include relationship. Although this helps in managing the complexity of the use case, it renders the whole use case model difficult to comprehend. Another drawback is when this logic results in the creation of smaller, less useful classes in the class model just to handle to the small task initially created in the use case model. These small classes will also increase the complexity of the sequence model by allowing behaviorally rich classes to use them as data placeholders and increasing the message communication traffic for simple get and set operations. Identification and removal of this model smell is beneficial to the user in order to manage the modularity and complexity of the class, sequence and use case models and to ensure proper usage of object oriented design methodology.

Initially, we define a use case that performs small tasks and provides little or no value to other use cases or actors. We refer to this use case as a Lazy Use Case (based on the naming of a class that does nothing in a class model. Table 31 defines the Lazy Use Case.

TABLE 31

Lazy Use Case

| | |
|---|---|
| Definition 5.1: | Lazy Use Case: A use case is termed as a lazy use case if; |
| 1. | It is an inclusion use case. |
| 2. | It has no actors associated with it. |
| 3. | Included only once by another use case. |

To identify the availability of this model smell in an integrated model, a lazy use case needs to be identified. The interaction part of this use case is then examined to look for data classes. A class is termed as a data classes if it has only attributes and getter/setter methods. The pseudo code given in Table 32 below describes the steps required for automated detection of the creeping featurism model smell.

TABLE 32

Creeping Featurism Algorithm
/* automated detection of the creeping featurism model smell */

```
1    start;
2    read Model
3    for (each use-case in the Model)
4        read UC
5        if (UC inclusion count is 1) and (UC has no actor)
6            parent = Including use-case of UC
7                diff = (lifelines in parent) ∩ (lifelines in UC)
8                if (diff is a data class)
9                    return diff
10               end if
11           end if
12       end for
13   stop
```

Regarding model refactoring mechanics, the refactoring name for the CF algorithm is remove functional decomposition. The parameters are Usecase uc, Usecase inc, Class c and Class d where uc is the lazy use case, inc is the use case that includes the lazy use case, c is the data class, d is the behaviorally rich class that manipulates the data class c. The preconditions include the assumptions that Class c is not abstract, Class c and d have no common attributes, there is an inclusion relationship between use cases inc and uc. The use case inc includes the use case uc.

The mechanics are listed in Table 33.

TABLE 33

Model Refactoring Mechanics

1. Remove Data Class (Part of the inclusion use case). This is done by identifying the class that has maximum interactions with the data class. Then use Inline Class refactoring to merge the data class into the identified class.
2. Substitute Lifeline refactoring is then used to remove all references to the old data class from all interaction diagrams and replace it with its merged class.
3. Collapse Fragment refactoring is then used to insert the interaction fragment of the inclusion use case into the interaction diagram of the including/base use case at the point of inclusion (ref fragment).
4. Finally, Merge UC Inclusion refactoring is used to merge the inclusion use case into the including use case.

Figure 28:
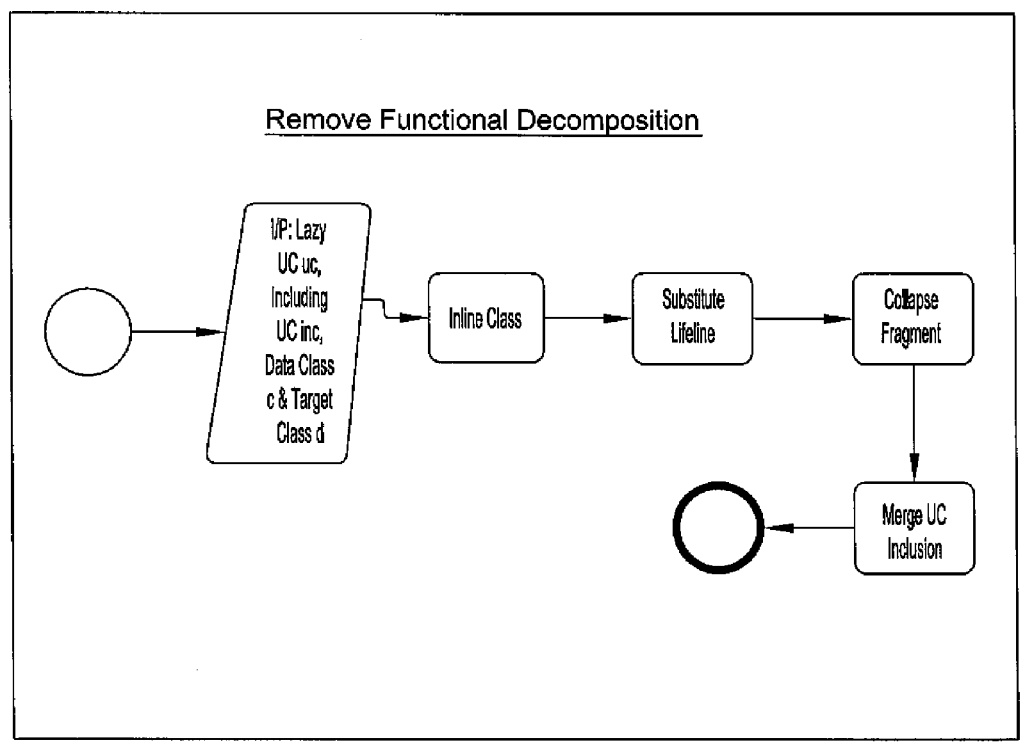
FIG. 28 is a block diagram showing Remove Functional Decomposition Refactoring according to the present invention.

The post conditions are listed in Table 34, while FIG. 28 shows the ordering 2800 of the composite refactoring Remove Functional Decomposition.

TABLE 34

Post Conditions

Figure 29:
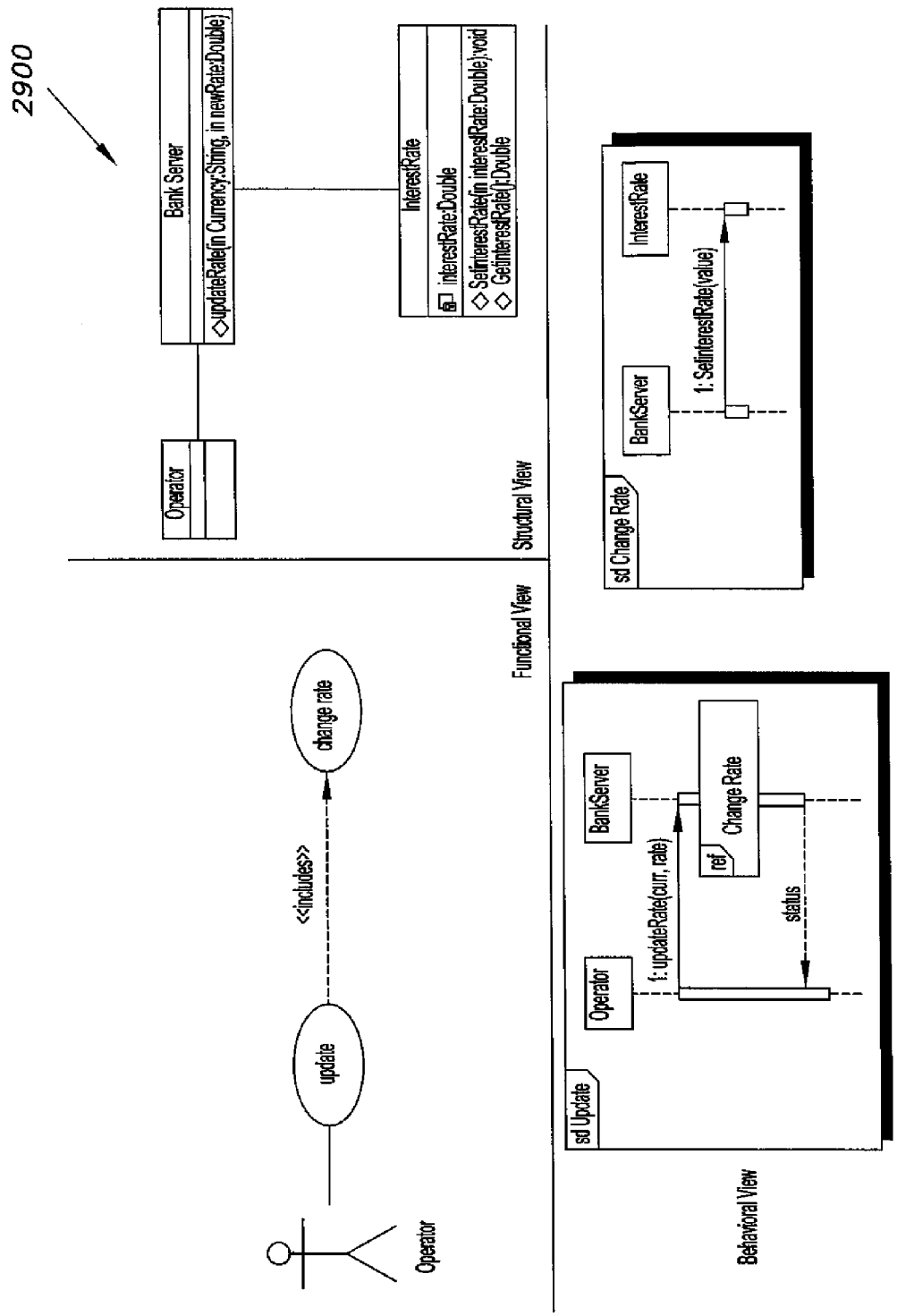
FIG. 29 is a block diagram showing an excerpt of the NBS model views depicting Creeping Featurism Smell.

1. All association ends with class c in the previous model are replaced with class d in the refactored model.
2. Class c is removed from the model
3. The interaction fragments for use case uc is collapsed and merged into the interaction diagram of use case inc by inserting it at the point of inclusion.
4. Lifelines with reference to class c are replaced with reference to class d.
5. The inclusion relationship between use cases inc and uc is deleted FIG. 29 shows subset 2900 of the model views from the NBS system that depicts the creeping featurism model smell. The Change Rate use case is included only by the Update use case and is not associated with any actor. On further examination of the sequence diagram for the Change Rate use case and Update use case, we identified a behaviorally rich class BankServer using a data class InterestRate (based on information from the class diagram).

Figure 30:
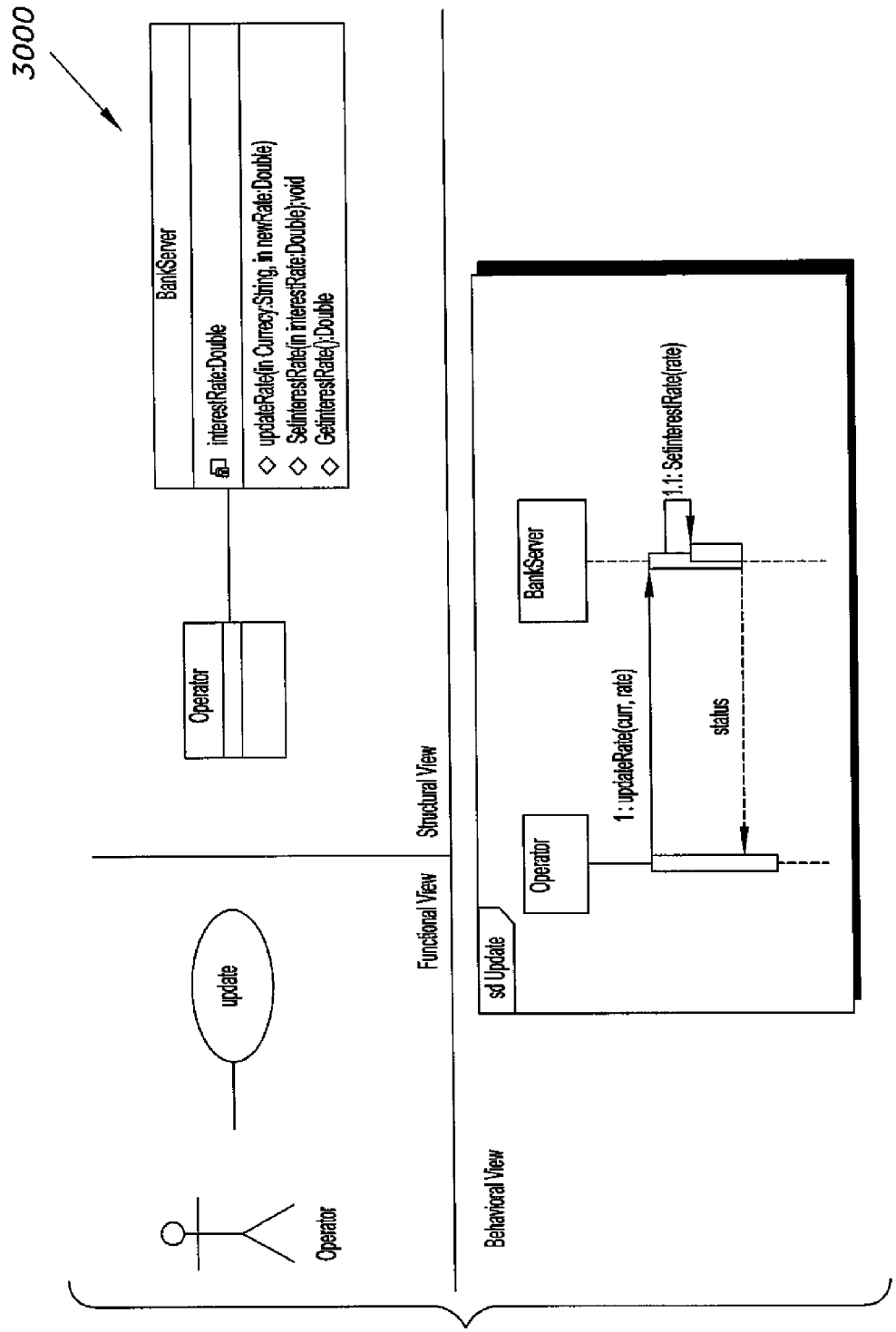
FIG. 30 is a block diagram showing an excerpt of the NBS model views after refactoring according to the present invention.

The InlineClass (BankServer, InterestRate) refactoring is first applied to inline and remove the class InterestRate. The SubstituteLifeline (BankServer, InterestRate) refactoring is then applied to substitute and redirect all messages that were initially communicated to/from InterestRate to BankServer. The CollapseInteraction (Update, changeRate) refactoring is then applied to merge the changeRate interaction into the Update interaction at the point of fragment reference. The interaction for changeRate is hence deleted as part of the CollapseInteraction refactoring. Finally, the MergeUCInteraction (Update, ChangeRate) refactoring is applied to merge the functionally decomposed use case ChangeRate into its base use case Update. The refactored model views 3000 are shown in FIG. 30.

The Functional View of the refactored model will not have unnecessary inclusion relationships and hence will reduce the complexity of the use case model view. The Behavioral View of the refactored model is improved a lot as a result of the refactoring operation. Some notable improvements are Reduction in the number of get and set messages exchanged between behaviorally rich classes and dumb data classes, removal of simple interaction fragments that result in referring to multiple sequence models for comprehension and enhanced behavior distribution by moving data to lifelines where it is used mostly. The Structural View of the refactored model will show improved modularity by the removal of data classes that increase coupling.

Functional Decomposition when done due to lack of object-oriented knowledge is surely considered a smell and needs to be refactored. However, sometimes smaller use cases are extracted from a larger use case for future use by either associating an actor or making it reusable for other use cases. Using the Remove Functional Decomposition refactoring discussed in this section will result in deletion of this use case.

In object-oriented programming, a god object is an object that knows too much or does too much. The god object is an example of an anti-pattern. The basic idea behind object-oriented programming is that a big problem is broken down into several smaller problems (a divide and conquer strategy) and solutions are created for each of them. Once the small problems have been solved, the big problem as a whole has been solved. Therefore there is only one object about which an object needs to know everything: itself. Likewise, there is only one set of problems an object needs to solve: its own.

God object-based code does not follow this approach. Instead, most of a program's overall functionality is coded into a single "all-knowing" object, which maintains most of the information about the entire program and provides most of the methods for manipulating this data. Because this object holds so much data and requires so many methods, its role in the program becomes god-like (all-encompassing). Instead of program objects communicating amongst themselves directly, the other objects within the program rely on the god object for most of their information and interaction. Since the god object is referenced by so much of the other code, maintenance becomes more difficult than it would in a more evenly divided programming design.

A god object is the object-oriented analogue of failing to use subroutines in procedural programming languages, or of using far too many global variables to store state information.

God objects, and the like lead to the concept of a multiple personality smell which, by definition, is a result of inappropriate requirements allocation. It can be found in use cases that play multiple roles. Ideally, each use case is required to play a single role. Hence, it is required that a use case contains only one, coherent set of responsibilities. Multiple personality can lead to the detection of two different situations: a secondary role superimposed on a single class or multiple classes cutting across a single use case. The former is a well-known anti-pattern known as God Class or Blob. Following the same terminology, we refer to the later in our work as a God Use Case. A God use case is a result of improper partitioning of responsibility during system evolution, so that one module becomes predominant.

Based on the works done to estimate the effort required for use case implementation, use cases are classified into three categories. A use case is considered simple if it has three or fewer transactions and the implementation of which requires five or fewer classes. A use case is considered average if it has four to seven transactions and the implementation of which requires five to ten classes. Finally, a use case is considered complex if it has more than seven transactions and the implementation of which requires more than 10 classes. Redistribution of functionality from a God Use Case becomes easier when we take a closer look into the behavior of the use case. Some of the identified symptoms are listed in Table 35.

TABLE 35

Identified Symptoms of God Use Case

1. A God Use Case includes a number of lazy classes. This will result in increased count of classes participating in the use case. Removing these lazy classes will reduce the complexity of the use case.
2. Existence of middle man lifelines in the interaction of the use case. A middle man is a lifeline that sits between two other lifelines and just forwards method calls. Removing middle man elements will reduce the transaction count and number of classes implemented by the use case.

When working with use case diagrams, it can sometimes be the case that although the overall model is small and compact but each use case may be highly complex. A use case, which covers multiple system goals, handles multiple requirements, whose behavior description cannot be covered in a single page should be termed complex. Although use of complex use cases within the use case model generates a neat and well-organized functional view of the system, its behavioral view is surely complex with wide array of messages exchanged between a number of incoherent classes and extensive concurrent set of operations. Identification and removal of this model smell is beneficial to the user in order to manage the complexity of the sequence models representing the complex use cases. This in turn will also affect the modularity of the class model.

To identify the availability of this model smell in an integrated model, a God use case needs to be identified. The interaction part of this use case is examined to look for number of classes implemented by the use case and the number of transactions. The God use case is defined in Table 36.

TABLE 36

Definition of God Use Case

| Definition 5.2: | A use case is termed as a God Use Case if; |
|---|---|
| 1. | Its implementation contains more than 10 classes |
| 2. | Its behavior has more than 7 transactions |

Figure 31:
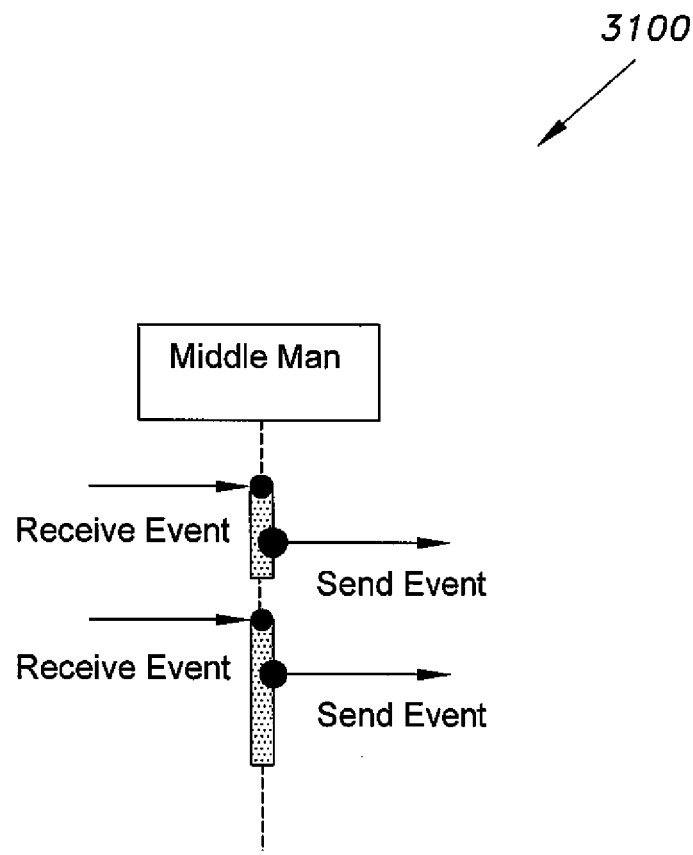
FIG. 31 is a block diagram showing a Middle Man Lifeline Pattern within a Sequence Model according to the present invention.

We define a pattern for detecting whether a lifeline is a middle-man or not. Each lifeline in the integrated model has event ends associated with it. These event ends are ordered and depict the type of the message such as send event, receive event and so on. If for a lifeline, these events are ordered as shown in sequence model 3100 of FIG. 31, then the lifeline is considered as a middle-man as its only job in the diagram is to delegate message from one lifeline to the other.

The pseudo code given in Table 37 describes the steps required for automated detection of the multiple personality model smell. The code returns a value of 0 if the smell does not exist, a value of 1 if the smell exists with inclusion of lazy classes in the God use case and a value of 2 if the smell exists with both inclusion of lazy classes and middle-man lifelines in the interaction.

TABLE 37

Multiple Personality Algorithm
/* automated detection of the multiple personality model smell */

| 1 | start; |
|---|---|
| 2 | read Model |
| 3 | for (each use-case in the Model) |
| 4 | read UC |
| 5 | if (# of classes in UC is > 10) and (# of transactions in UC is > 7) and (# of lazy classes in UC >= 2) |

TABLE 37-continued

Multiple Personality Algorithm
/* automated detection of the multiple personality model smell */

| | |
|---|---|
| 6 | for (each lifeline in the UC) |
| 7 | read Life |
| 8 | end-List = (all ends on Life) |
| 9 | for (each substring ss of end-List of size 2) |
| 10 | if (ss = {receiveEvent, sendEvent}) |
| 11 | return 2 |
| 12 | end if |
| 13 | end for |
| 14 | return 1 |
| 15 | end for |
| 16 | else |
| 17 | return 0 |
| 18 | end if |
| 19 | end for |
| 20 | stop |

Regarding model refactoring mechanics, the refactoring name for the CF algorithm is Decompose God Use Case. The parameters are Usecase uc, List midman, List lazyClass, List base where uc is the God use case, midman is the list of classes within the interaction of the God Use Case which are middle man lifelines, lazyClass is the list of lazy classes, and base is the list of classes that will inline the lazy classes. The preconditions are listed in Table 38.

TABLE 38

Preconditions for Use Case Refactoring

1. Class lazyClass is not abstract.
2. Class lazyClass and Class base have no common attributes.
3. The direct base class of the Class lazyClass is also a base class of the Class base.
4. The Class lazyClass is a sub class of the Class base or the two classes do not share any methods.
5. Midman is a lifeline model element in uc.

The mechanics are listed in Table 39.

TABLE 39

Mechanics for Use Case Refactoring

1. In order to remove the lazy class, Inline Class refactoring is used to remove lazy classes that are not useful independent components. If the lazy class is a sub class, then use Collapse Hierarchy refactoring to merge the class into its super class.
2. Substitute Lifeline refactoring is then used to remove all references to the old lazy classes from all interaction diagrams and replace it with its merged class or super class.
3. Finally, Remove Middle Man refactoring is used to remove the lifelines from the use case interaction.

Figure 32:
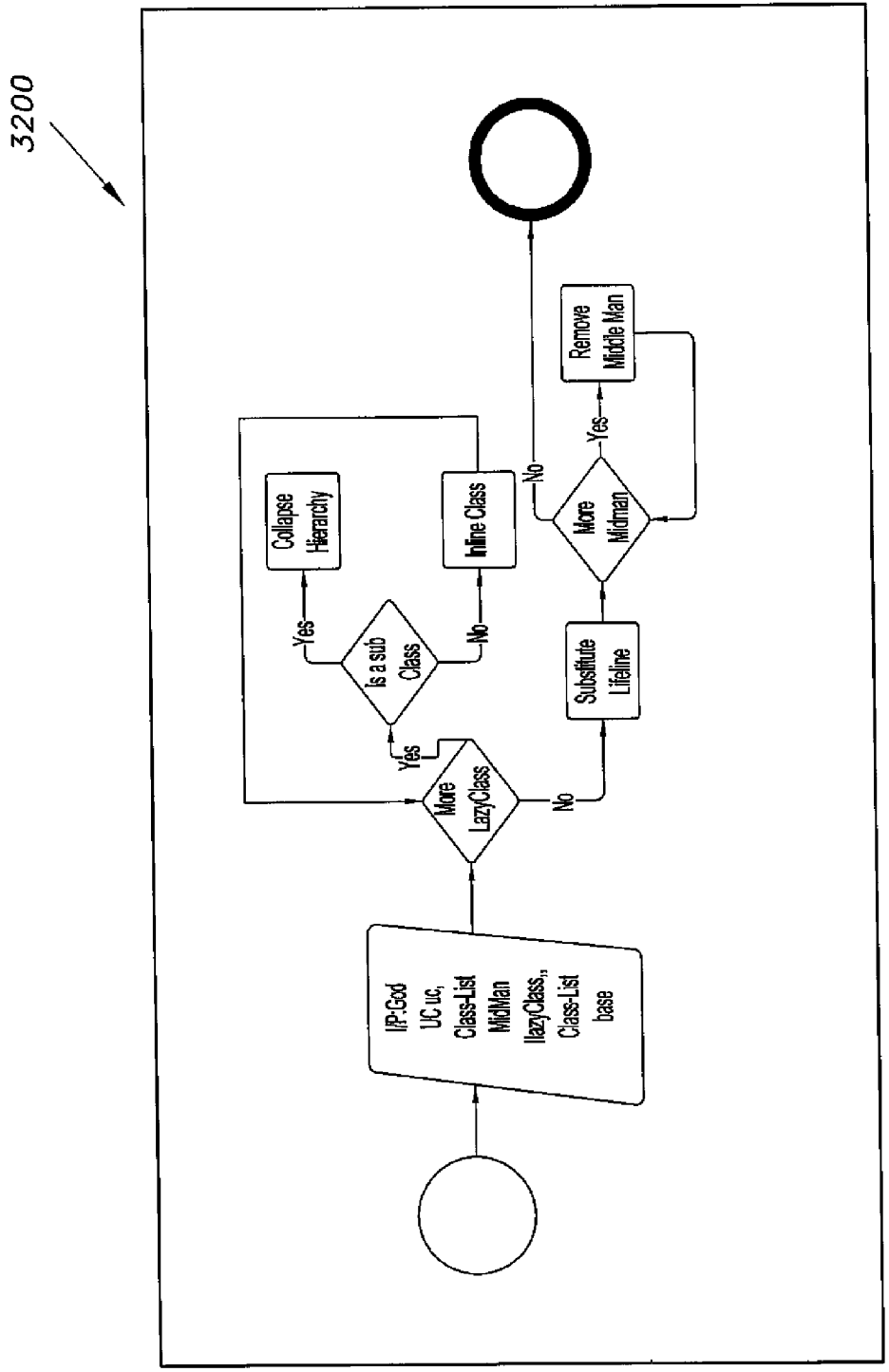
FIG. 32 is a block diagram showing decompose god use case refactoring according to the present invention.

FIG. 32 shows ordering 3200 of the composite refactoring Decompose God Use Case. The post conditions are listed in Table 40.

TABLE 40

Post Conditions for Use Case Refactoring

1. All association ends with Class lazyClass in the previous model are replaced with Class base in the refactored model.
2. Class lazyClass is removed from the model.
3. Lifelines with reference to Class lazyClass are replaced with reference to Class base.
4. Midman lifeline does not exist in the interaction for use case uc.

Figure 33:
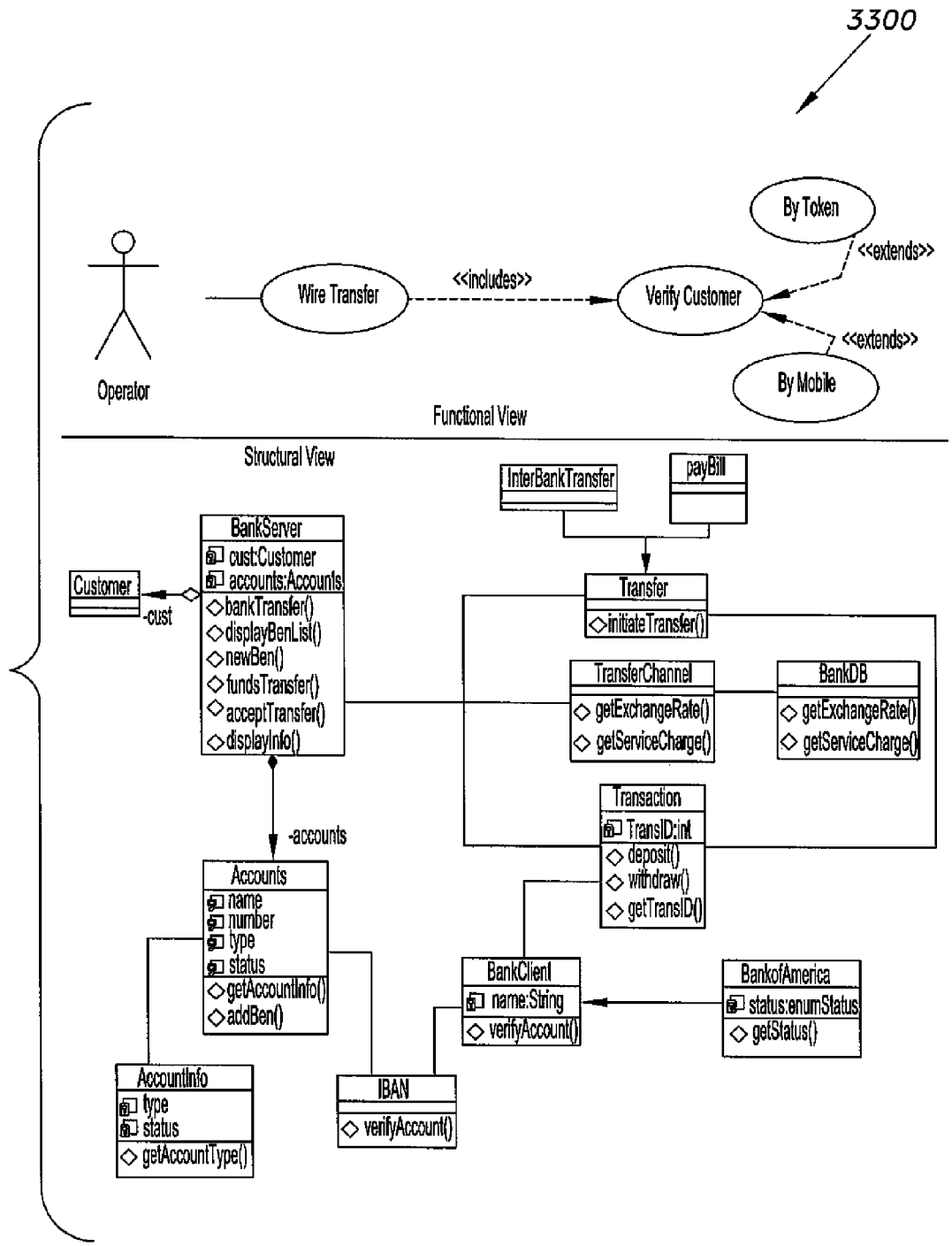
FIG. 33 is a block diagram showing an excerpt of the NBS functional and structural model views depicting Multiple Personality Smell.
Figure 34:
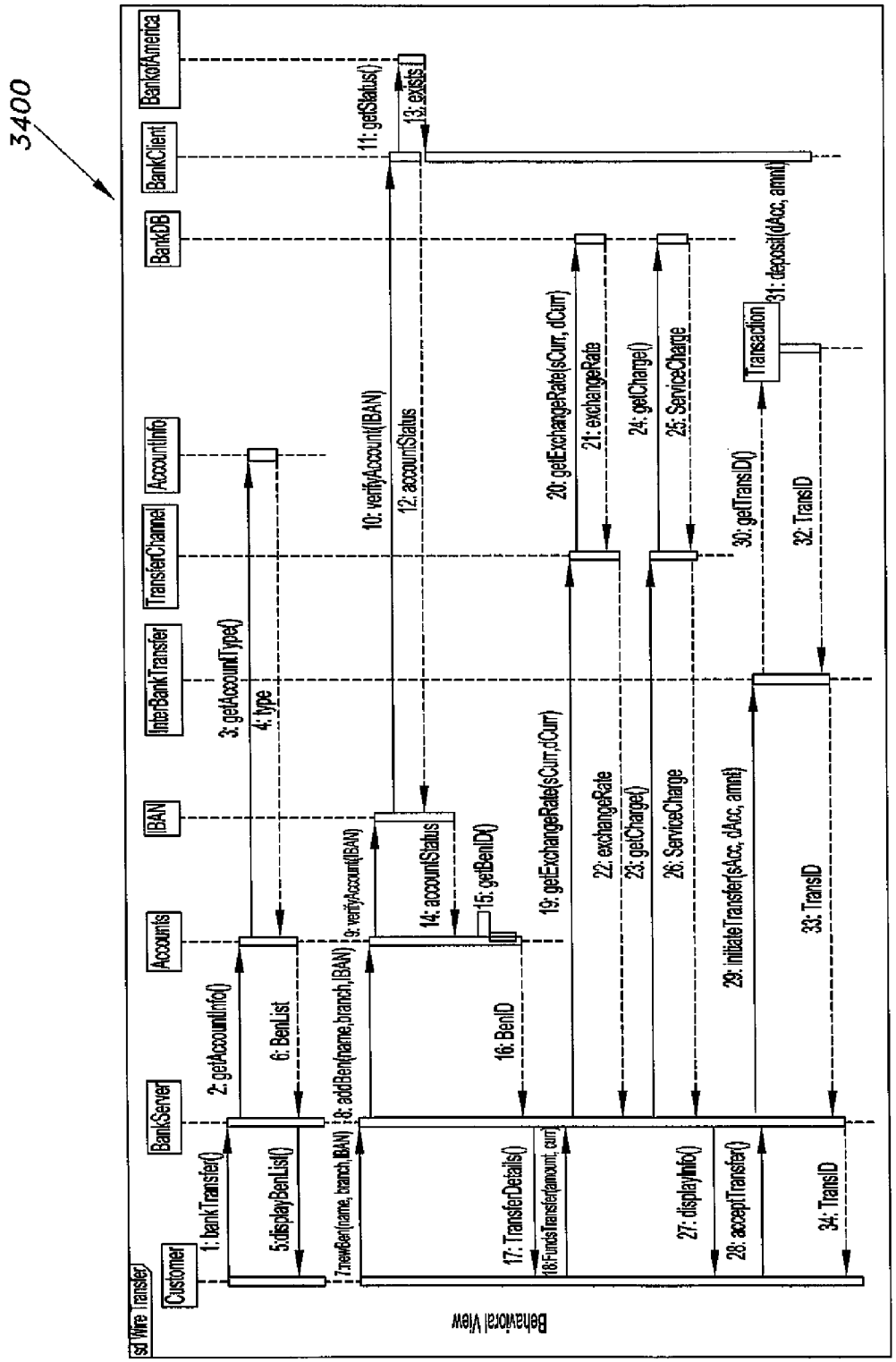
FIG. 34 is a block diagram showing an excerpt of the NBS behavioral model view depicting Multiple Personality Smell.

Excerpts 3300 and 3400 of FIGS. 33 and 34, respectively, show a subset of the model views from the NBS system that depicts the multiple personality model smell. The existence of a God use case wireTransfer (implements eleven classes) is identified on examination of the use case diagram and all the sequence diagrams associated with each use case. Closer examination of the sequence diagram for the wireTransfer use case yielded the existence of two middle man classes TransferChannel and IBAN and lazy classes AccountInfo and InterBankTransfer. The existence of lazy classes was conformed from the class diagram of the system.

The InlineClass refactoring is initially applied to all the lazy classes and middle man classes identified by the model smell. These refactoring operations are listed in Table 41.

TABLE 41

InlineClass Refactoring Operations

| | |
|---|---|
| 1. | InlineClass (BankServer, TransferChannel) |
| 2. | InlineClass (Accounts, AccountInfo) |
| 3. | InlineClass (Accounts, IBAN) |

Since the lazy class InterBankTransfer is a sub class of the Transfer Class, the CollapseHierarchy (Transfer, InterBankTransfer) is used to inline the class with its parent class. The SubstituteLifeline refactoring is then applied to substitute and redirect all messages that were initially communicated to/from the lazy classes. The refactoring operations are listed in Table 42.

TABLE 42

SubstituteLifeline Refactoring Operations

| | |
|---|---|
| 1. | SubstituteLifeline (Transfer, InterBankTransfer) |
| 2. | SubstituteLifeline (Accounts, AccountInfo) |

Figure 35:
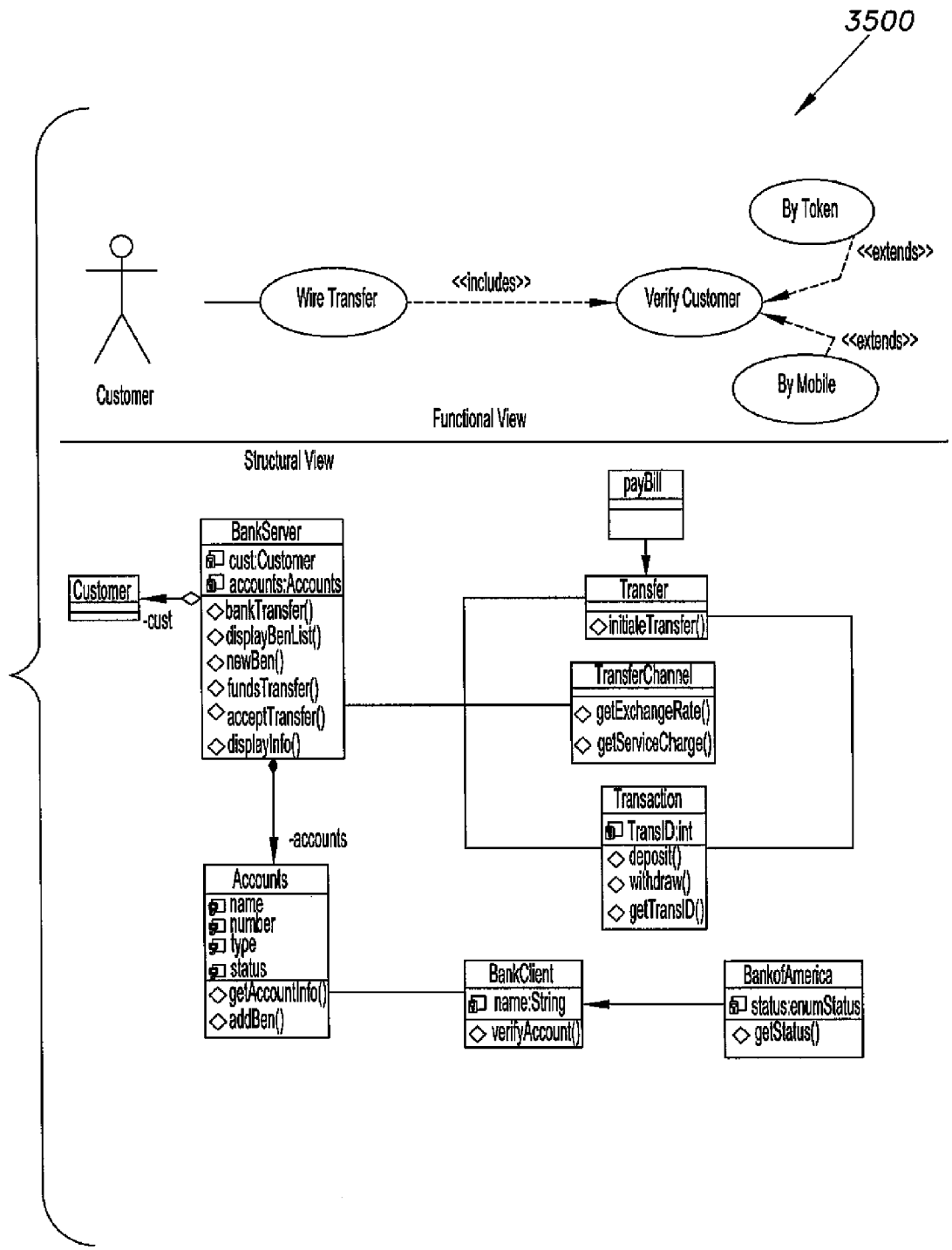
FIG. 35 is a block diagram showing an excerpt of the NBS functional and structural model views after refactoring according to the present invention.
Figure 36:
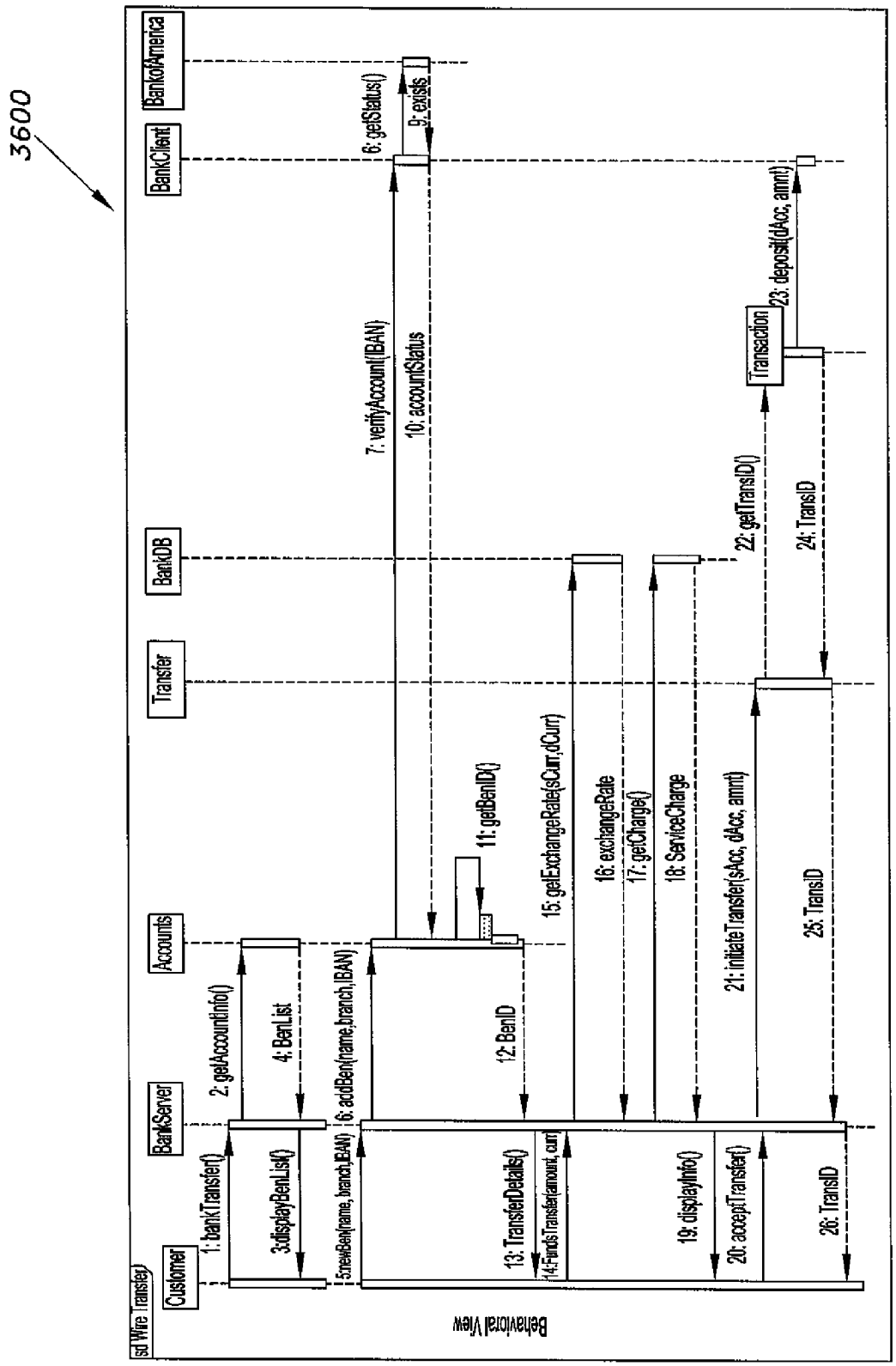
FIG. 36 is a block diagram showing an excerpt of the NBS behavioral model view after refactoring according to the present invention.

Finally, the RemoveMiddleMan (wire Transfer, IRAN) & RemoveMiddleMan (wireTransfer, TransferChannel) refactoring is applied to remove the middle man lifelines and initiate direct communication. The refactored model views are shown in excerpt 3500 of FIG. 35 (structural and functional view) and excerpt 3600 of FIG. 36 (behavioral view).

The Behavioral View of each of the complex use cases from the Functional View is improved a lot in the refactored model because of the refactoring operation. The complexity of the use case and its interaction is reduced by removing additional classes such as lazy classes and middle man classes. Removal of these classes also reduces the number of transactions within the interaction model of the use case. Hence, it is safe to quote that the refactoring operation reduces the complexity and effort required to implement the use case and its behavior. The Structural View of the refactored model will show improved modularity by the removal of lazy classes that increase coupling and results in improved cohesion among the inlined classes.

Since this refactoring targets lazy classes and delegating lifelines in order to reduce the complexity of the God Use case, it does not have any negative effect on the model. But some patterns make use of Delegating Classes to provide multiple views of information such as Model-View-Controller (MVC) pattern. It is difficult to detect and differentiate whether delegation in behavior is done to provide multiple views of model to a view or using lazy middle man classes to forward messages. Hence, one important side effect of the Decompose God Use Case model refactoring is its inability to differentiate between the above-mentioned functionalities provided by middle man classes in the integrated model.

Excessive Alternation smell occurs when the extend relationship between use cases is misused by the designers. The use case "extend" relationship allows additional behavior to be inserted into the base use case at a specific point known as extension point. One potential problem with use case modeling is to identify when to stop identifying alternative cases. Failure to identify this may lead to designers abusing the use case relationships like include and extend for functional decomposition. Building a non-trivial application, armed with the latest GUIs and event driven systems, there is a possibility to have a number of use cases that can produce essentially infinite number of usage scenarios. Too few use cases result in an inadequate specification, while too many use cases lead to functional decomposition. Limiting the analysis to the most obvious or important scenarios that generalizes to all use cases is a good approach. As is known in the art, use cases may be classified into system use cases and user use cases. System use cases are generic use cases that do not delve into many user-specifics. System use cases are more appropriate while modeling use cases, as they are useful in iteration planning and system testing. However, with every system use case, there are a number of user use cases hiding behind it waiting to be extended.

Another potential problem with use case modeling is the comprehension of the semantics of the extend relationship. In many cases the extend relationship is used in place of include or generalization relationship and even worse in place of pre and post conditions. This misuse can lead to a form of anti-pattern seen in Program Code known as the Switch Pattern. In this pattern, the base use case performs a few transactions in the beginning and then keeps switching to other extension use cases conditionally. This scenario is similar to the switch construct used in some programming languages.

Although the existence of excessive alternation model smell can be identified by examining the functional view, in order to conform and to ensure automatic mitigation of this model smell requires the examination of other model views. Excessive alternation may lead to a complex use case model difficult to understand and maintain. In order to mitigate excessive alternation, common behavior from the base use case is extracted and inserted into all the extension use cases replacing the extension with an inclusion relationship.

Prior art has included the abuse of the extend relationship for functional decomposition in its suite of use case anti-patterns. However the prior art did not provide an implementable detection and mitigation strategy. The present method solves the problem by providing an implantable detection and mitigation strategy. The use of multiple views for detection of excessive alternation not only provides means to identify misuse of extend relationship but also provides detail information to remove the identified smell in an automated manner.

Excessive alternation may lead to a complex use case model difficult to understand and maintain. A number of authors agree that the use of include and generalization relationship is much easier for most people to understand and use than the extend relationship. The misuse of extend relationship in place of utilizing the pre and post conditions of a use case could overwhelm and obscure other content in the diagram due to the presence of a number of extend arrows. "Encapsulatable" behavior at the beginning of a use case can be separated and this can be replaced as a precondition of the use case. The availability of excessive alternation in a use case diagram not only complicates the functional view but also adds redundant behavior in the use case behavior and ignores a number of object-oriented advantages such as inclusion, polymorphism and inheritance in its structural view.

To ensure the applicability of this model smell in the integrated model, a use case with multiple extension points is selected. In order to quantify the number of extension points required in order to select the use case as a candidate for further examination, we use the "Number of Extension Point (NOEP) metric and its maximum acceptable value of 3 as provided by the prior art. Based on this suggestion, any use case with three or more extension points is used for further examination for applicability of this model smell.

Figure 37:
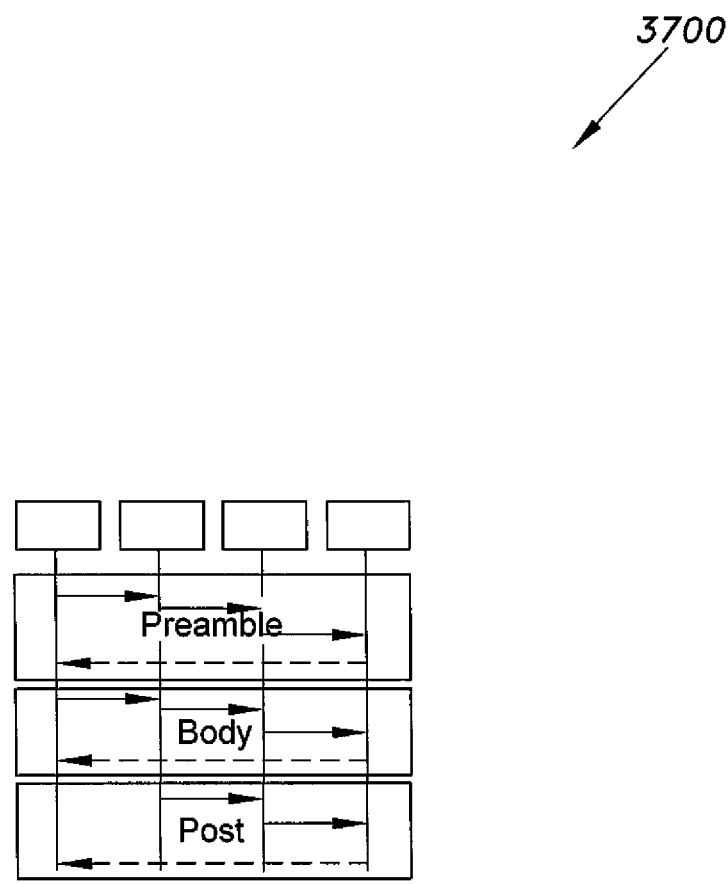
FIG. 37 is a block diagram showing the Use Case Behavior (Sequence Model) divided into three sections according to the present invention.

The behavior of the selected use case is then examined to identify whether a "switch pattern" exists. In order to explain this, we first divide the behavior of a use case model into three sections 3700 as shown in the block diagram of FIG. 37. These sections are the preamble, body and post. Hence, a base use case with a preamble length of greater than two, a body with only an "alt" fragment and post length equal to zero is considered to depict excessive alternation model smell. The pseudo code given in Table 43 describes the steps required for automated detection of the excessive alternation model smell.

TABLE 43

Excessive Alternation Algorithm
/* automated detection of the excessive alternation model smell */

| | |
|---|---|
| 1 | start; |
| 2 | read Model |
| 3 | for (each use-case in the Model) |
| 4 | read UC |
| 5 | if (# of extension-points in UC is >= 3) |
| 6 | if (# of preamble steps in UC > 2) and (switch-pattern(body) is true) and (# of post steps is = 0) |
| 7 | return UC |
| 8 | stop |

Regarding model refactoring mechanics, the refactoring name is Substitute Excessive Extensions. The parameters are Usecase uc, String newUC, where uc is the Base Use Case and newUC is the temporary name for a new use case. The precondition is that the name of the new use case (newUC) does not conflict with the name of an existing use case within the model. The mechanics are listed in Table 44.

TABLE 44

Refactoring Mechanics for Substitute Excessive Extensions

1. In order to use the same name as the base use case, we first need to rename the base use case. Rename UseCase refactoring is initially used to rename the use case to any other name.
2. Create UseCase refactoring is used to create a new use case with the same name as the base use case.
3. Extract Fragment refactoring is then used on the base use case sequence diagram to extract the preamble transactions into the newly created use case.
4. If the operand of "alt" fragment in the body of the use case behavior is not an Interaction Use Fragment, then first use Extract Fragment refactoring to extract the steps in the operand into a new use case.
5. Insert Fragment refactoring is then used to add the common behavior in the beginning of all the extension use case sequence diagrams and the one created in step 4 (if applicable).
6. Add Inclusion refactoring is used to add inclusion between the base use case and newly created use cases in step 4 and the extension use cases of the previous base use case.
7. Move Actor Reference refactoring is used to add uses relationship from the actor to all the previous extension use cases. The actor's relationship to the base use case still remains in the model.
8. Isolate UseCase refactoring is used to remove all relationships and actor references from the previous base use case.
9. Finally, Delete UseCase refactoring is used to the remove the old base use case renamed in step 1.

Figure 38:
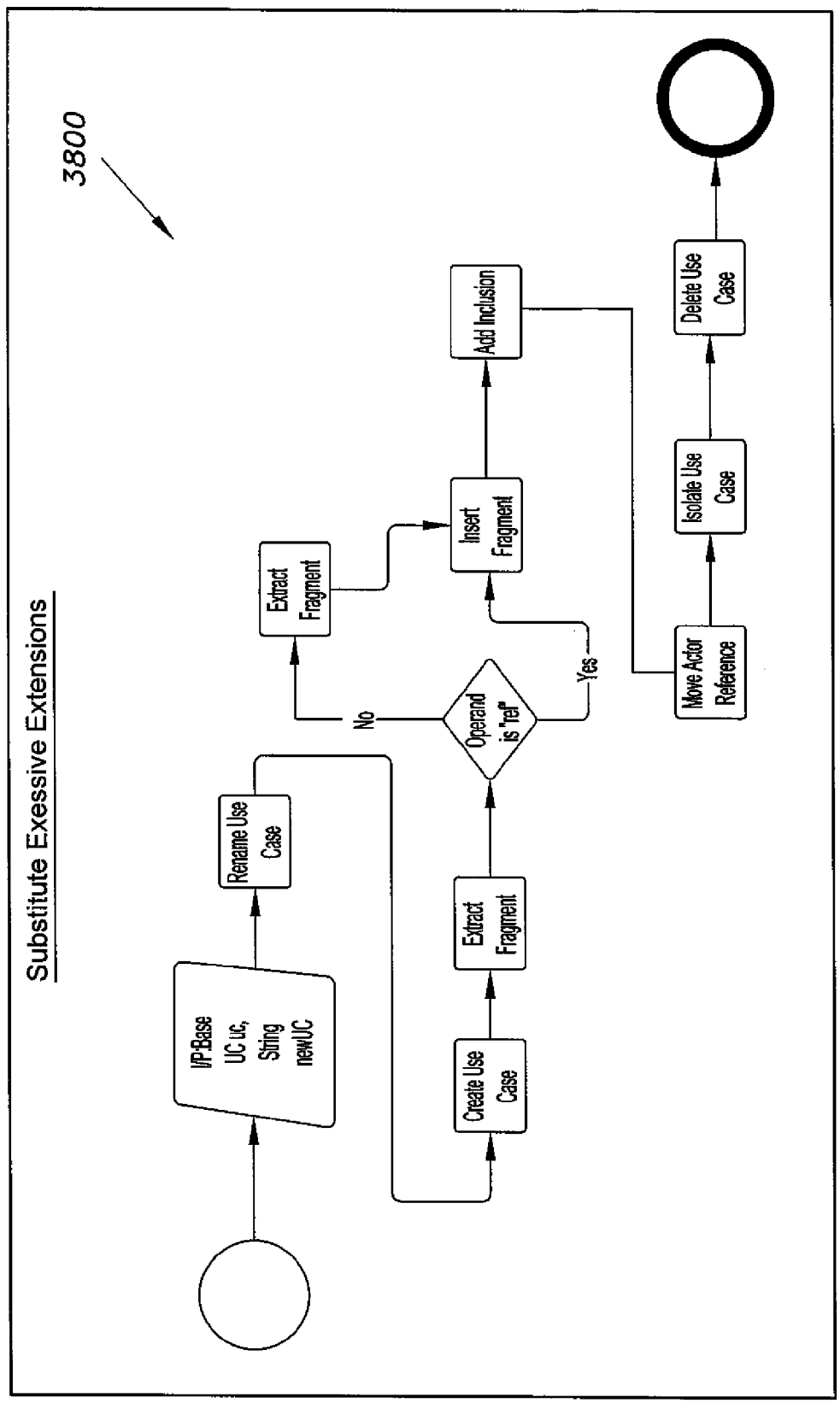
FIG. 38 is a block diagram showing Substitute Excessive Extensions Refactoring according to the present invention.

FIG. 38 shows the ordering 3800 of the composite refactoring Substitute Excessive Extensions. The post conditions are listed in Table 45.

TABLE 45

Post Conditions for Substitute Excessive Extensions Refactoring

1. A use case with name newUC does not exist in the model.
2. All extension Points within the use case uc are removed.
3. There are no extend relationship between uc and other use cases in the model.

Figure 39:
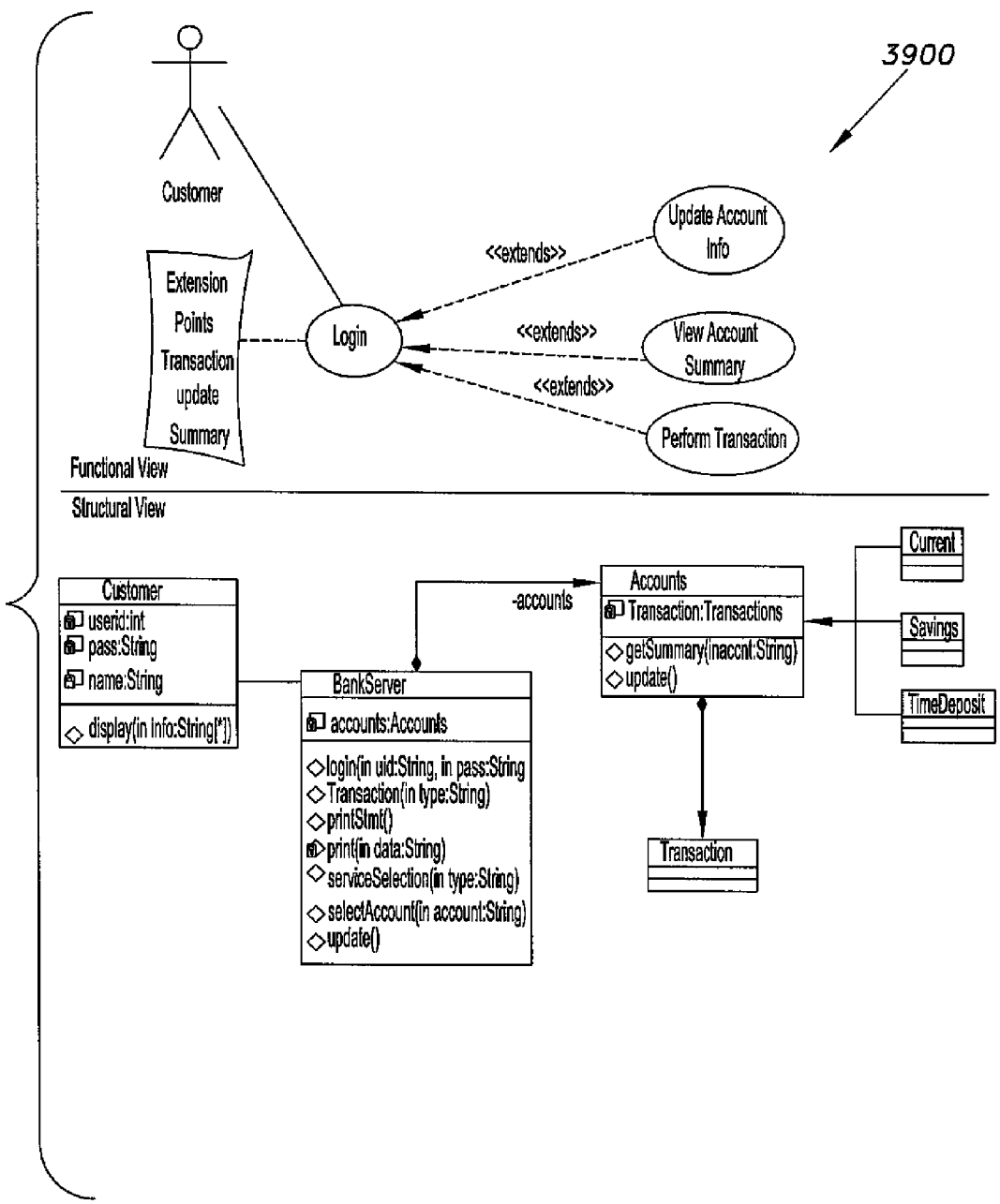
FIG. 39 is a block diagram showing an excerpt of the NBS functional and structural model views depicting Excessive Alternation Smell.
Figure 40:
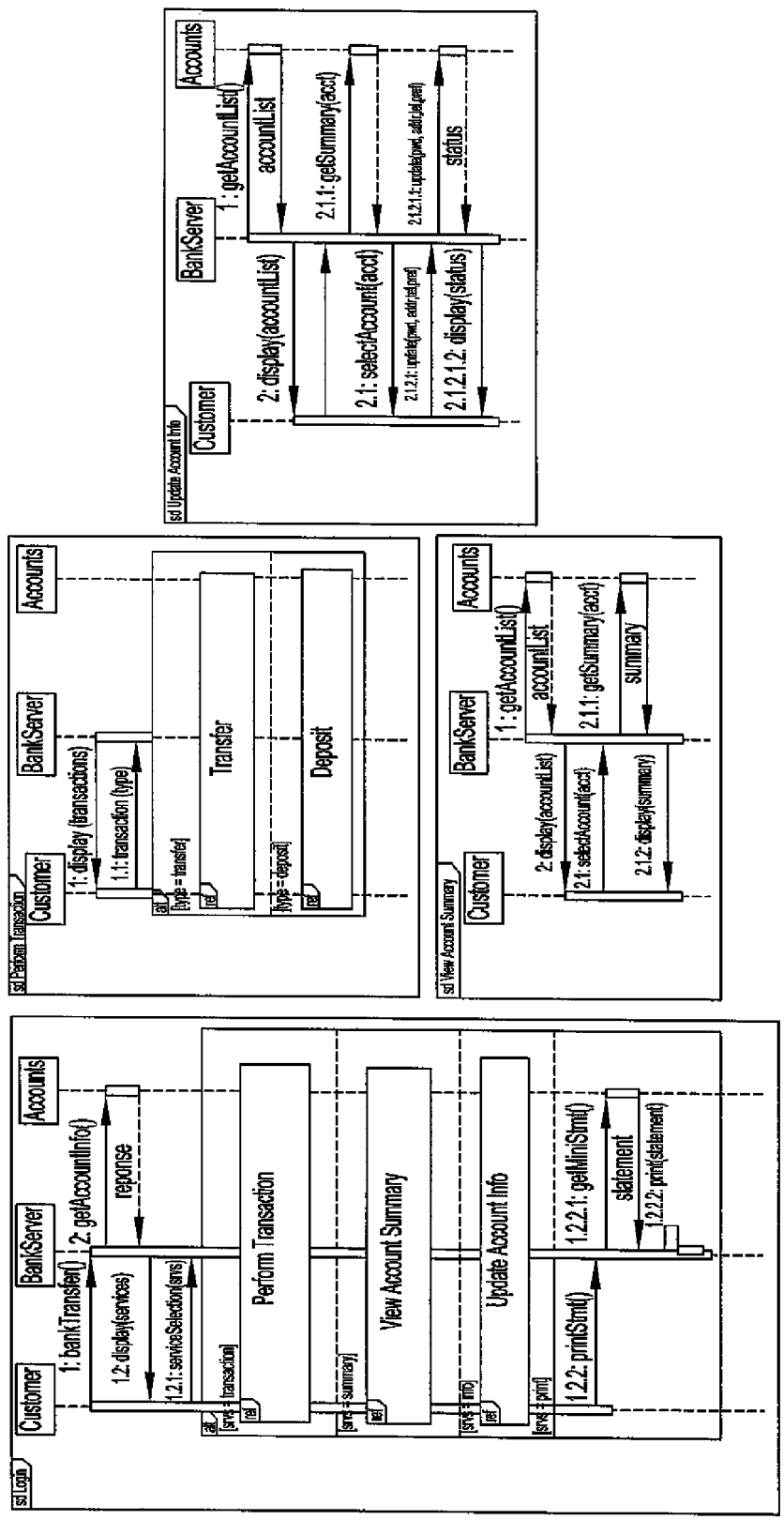
FIG. 40 is a block diagram showing an excerpt of the NBS behavioral model view depicting Excessive Alternation Smell.

Functional/Structural view 3900 of FIG. 39 and Behavioral view 4000 of FIG. 40 show a subset of the model views from the NBS system that depicts the excessive alternation model smell. On examination of the use case diagram, the existence of the use case Login was identified having more than two extension points. Closer examination of the sequence diagram for the Login use case revealed the existence of a switch pattern (more delegations than transactions). Since all the lifelines in the Login sequence diagram were subsets of the lifelines in the sequence diagram for the extension use case, the login sequence diagram was added using a "ref" combined fragment in all its extension sequence diagrams.

The RenameUseCase (Login, newUC) refactoring and CreateUseCase (Login) is initially applied to rename the Login use case with a temporary name newUC and create a new one with the same name to preserve its name. ExtractFragment (newUC, startPoint, endpoint, Login) refactoring is then used to extract the preamble part of the use case into the newly created Login use case.

For the operand without the "alt" operand, ExtractFragment (newUC, startPoint2, endPoint2, Print Statement) refactoring is performed. The common behavior extracted earlier into the Login use case is then added to all the extension use cases using the Insert Fragment refactoring. The refactoring operations are listed in Table 46.

TABLE 46

InsertFragment Refactoring Operations

1. InsertFragment (Perform Transaction, Login)
2. InsertFragment (View Account Summary, Login)
3. InsertFragment (Update Account Info, Login)
4. InsertFragment (Print Statement, Login)

AddInclusion refactoring is then performed to add inclusion relationship between Login and the newly extracted use case and other "ref" fragment use cases. The AddInclusion refactoring operations are listed in Table 47.

TABLE 47

AddInclusion Refactoring Operations

1. AddInclusion (Login, Print Statement)
2. AddInclusion (Login, Perform Transaction)
3. AddInclusion (Login, View Account Summary)
4. AddInclusion (Login, Update Account Info)

Then the MoveActorReference refactoring is applied to move all the actor references from the newUC use case to the newly created base use cases. The MoveActorReference refactoring operations are listed in Table 48.

TABLE 48

MoveActorReference RefactoringOperations

1. MoveActorReference (newUC, Perform Transaction)
2. MoveActorReference (newUC, View Account Summary)
3. MoveActorReference (newUC, Update Account Info)
4. MoveActorReference (newUC, Print Statement)
5. MoveActorReference (newUC, Login)

Figure 41:
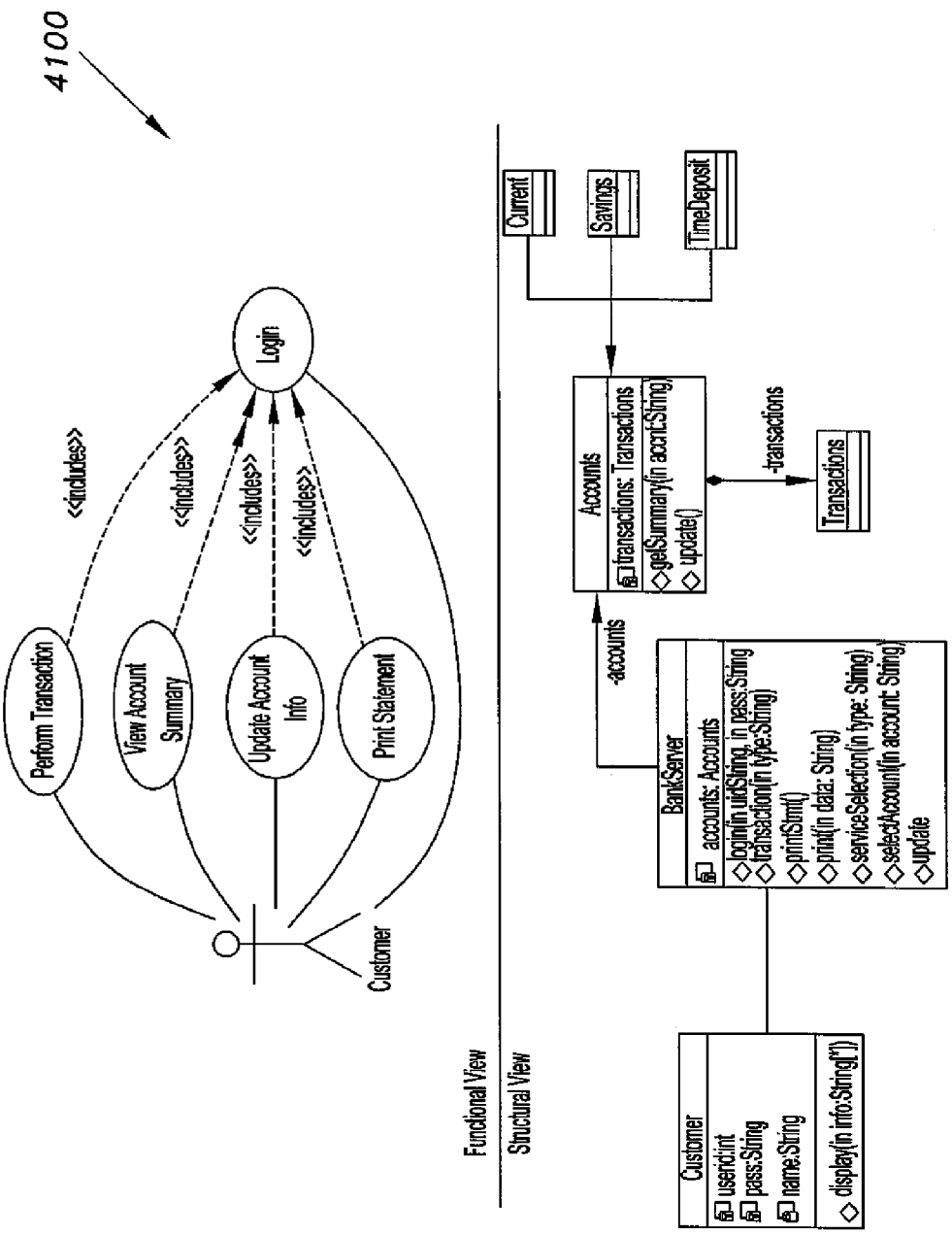
FIG. 41 is a block diagram showing an excerpt of the NBS functional and structural model views after refactoring according to the present invention.
Figure 42:
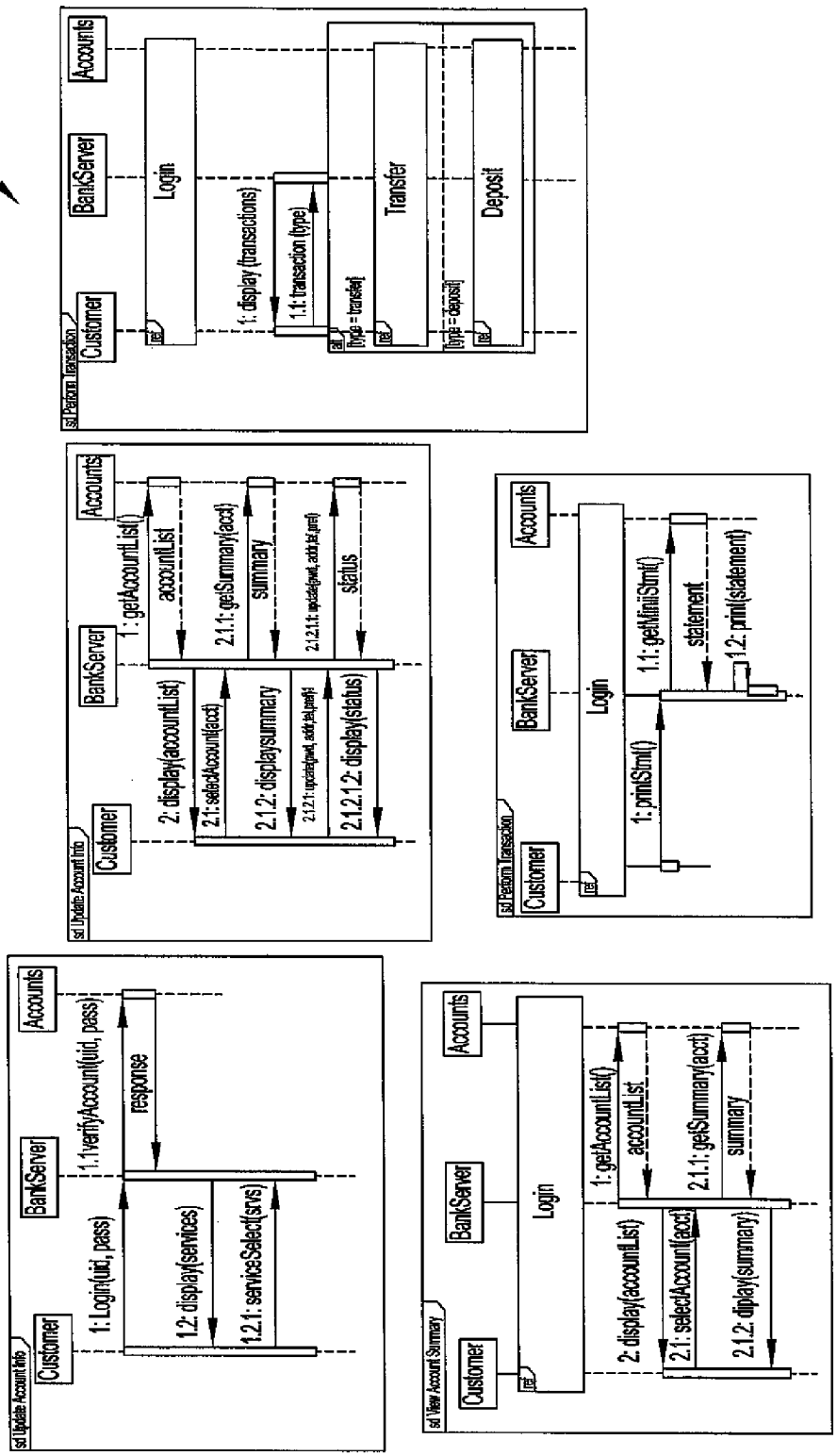
FIG. 42 is a block diagram showing an excerpt of the NBS behavioral model view after refactoring according to the present invention.

Finally, the IsolateUseCase (newUC) refactoring is used to remove all relationships from the newUC and DeleteUseCase (newUC) refactoring is performed to remove the use case from the model. The refactored model views are shown in FIG. 41 (functional/structural view 4100) and FIG. 42 (behavioral view 4200).

A use case that spends less time performing its own tasks and switches from one use case to the other throughout its lifetime is considered a bad form of behavior distribution. Not only it complicates the functional view with a number of extension points and extends relationships, it also increases the complexity of the behavior by magnifying its Cyclomatic Complexity (result of increase in the number of branch points). Identifying and substituting these cases with simpler relationships like "include" enhances comprehension and maintenance of the functional view of the system and alleviates the complexity of the behavioral view of the model. These in turn opens commonality features to be considered for enhancing the modularity of the structural view of the model.

Excessive Alternation done because of identifying as many alternate scenarios as possible for a system under design can be considered a good quality practice. However, overdoing can complicate the model and affect other aspects of the system. Although extensions are problematic, they do provide the ability for a base use case to begin execution of the extension use case from a specified step within the extension use case as opposed to inclusion where execution must start at the first step. Removing this relationship and substituting with the include relationship will not allow designers to benefit from this attribute of the extend relationship. Another side effect of this refactoring is the increase in the number of use cases associated with an actor. But since the new associations fully describe what the actor can do with the system, it can be justified. If the actor association with the use cases is due to improper depiction of actor role in the system, the Spider's Web model smell and its associated refactoring can be applied.

One of the main principles of Object Oriented Design is Encapsulation. This means that the implementation details are hidden behind the definition of the object. When objects violate encapsulation, the model smells of Undue Familiarity. Undue Familiarity is a model smell that occurs when one object knows more about another object than it is required to. This model smell is mostly similar to the Inappropriate Intimacy Smell found in Source Code.

Classes in UML class diagram are related to each other by three major relationships: Generalization, Aggregation and Association. Out of these, association is the only relationship that can be bi-directional. Although a bi-directional association between classes in a class diagram does not indicate the existence of the Undue Familiarity model smell, it can be considered as the point of origin for further investigation. Studying the mode of interaction between these classes will provide more information as to whether objects of one class know more about the objects of the other class. This in turn results in a complex use case with more than required messages and classes implemented by the use case and a use case model with inappropriate behavior distribution.

Undue Familiarity model smell results in a system design that is unstable and less reusable. Because of this model smell, the design is more likely to have changes in one part of the system impact another part of the system. For instance, if the user interface has the knowledge that its data access layer makes use of a particular form of data storage, then the data access layer cannot change without potentially making changes throughout the user interface. Hence, the user interface cannot run or be tested without a connection to the database to populate the used form of data storage. Therefore, this inappropriate knowledge makes the system more fragile. Simple changes create breaking changes. Reusability of objects is reduced as they assume that the intimate information in the other familiar objects remain the same.

The existence of inappropriately familiar classes within a class diagram not only obscures the structural view but also increases the message communication frequency in the behavioral view and ignores a number of model design primitives such as behavior distribution and use case complexity in its functional view.

To ensure the applicability of this model smell in the integrated model, pairs of bi-directionally associated classes are identified. An association with both its ends as owner-ends is referred to as a bidirectional association. For each of these pairs, examine the interaction parts of all the use cases they are part of and their mode of interaction within those interaction model elements. Message interactions between two classes can be termed inappropriate if they access data and methods from each other frequently. In order to identify if message passing between two sets of lifelines is inappropriate, we define two types of messages: Access and Update. An access message is a "getter" method requesting data from the other class. A return statement in the interaction diagram usually follows this message. An update message is a "setter" method updating data in the other class. Update messages are parameterized messages. Hence, message passing between two classes is termed inappropriate if both classes involved perform update and access message exchanges. If message-passing frequency between these two classes is inappropriate and these pairs occur in interaction parts of more than one use case, then undue familiarity model smell exists in the integrated model. The pseudo code listed in Table 49 describes the steps required for automated detection of the Undue Familiarity model smell.

TABLE 49

Undue Familiarity Algorithm
/* automated detection of the undue familiarity model smell */

```
1   start;
2   read Model
3   for (each association in the Model)
4       read Assoc
5       if (ends of Assoc are both owned)
6           c1 = one end of the Assoc
7           c2 = other end of the Assoc
8           for (each use case in the Model)
9               read UC
10              diff = (lifelines in UC) ∩ (set{c1,c2})
11              if (diff != empty)& (mesg freq between c1 &
    c2 is inappropriate)
12                      counter++;
13              end if
14          end for
15          if (counter > 1)
16              return Assoc
17          end if
```

TABLE 49-continued

Undue Familiarity Algorithm
/* automated detection of the undue familiarity model smell */

```
18      end if
19  end for
20  stop
```

Regarding model refactoring mechanics, the refactoring name is Break Intimate Elements. The parameters are Association assoc, Class src, Class tar, String newCase where assoc is the intimate association relationship, src is one end of the association relationship assoc, tar is the other end of the association relationship assoc, and newCase is the name of a new use case if similar fragments are extracted. The preconditions are that the association relationship assoc is bi-directional, and that the name newCase does not conflict with the name of an existing use case within the model. The mechanics of this refactoring is based on the nature of the intimate elements. Hence, the solution is divided into two parts, as listed in Table 50.

TABLE 50

Break Intimate Elements Refactoring Mechanics

1. If the nature of the association is breakable i.e. if the messages and data items involved between the associated classes is exclusive to these classes and not invoked by other associations to the tar class.
   a. For each message access and update message from the src class to the tar class, Move Attribute and Move Operation refactoring is applied. This is repeated across all interactions involving communication between the src and tar classes. If Move Operation is successful, Remove Message refactoring removes the message call between the classes involving the moved operations
   b. If the tar class is empty after the previous refactoring application and has no relationship with other classes in the class model, Remove Empty Class refactoring is applied.
   c. Since all message incident to the removed class are included in the src class, Remove Lifeline refactoring is applied to the tar lifeline across all interactions.
2. If the nature of the association is unbreakable, i.e. if the messages and data items involved between the associated classes is not exclusive and are invoked by other associations.
   a. Extract Fragment refactoring is then used on the frequent message exchange fragment of the interaction if the same message exchange pattern appears in other interactions of the system. This extracted fragment is added into a new use case newCase.
   b. Add Inclusion refactoring is used to add inclusion between the base use cases and the newly created use case newCase in step 2a.

Figure 43:
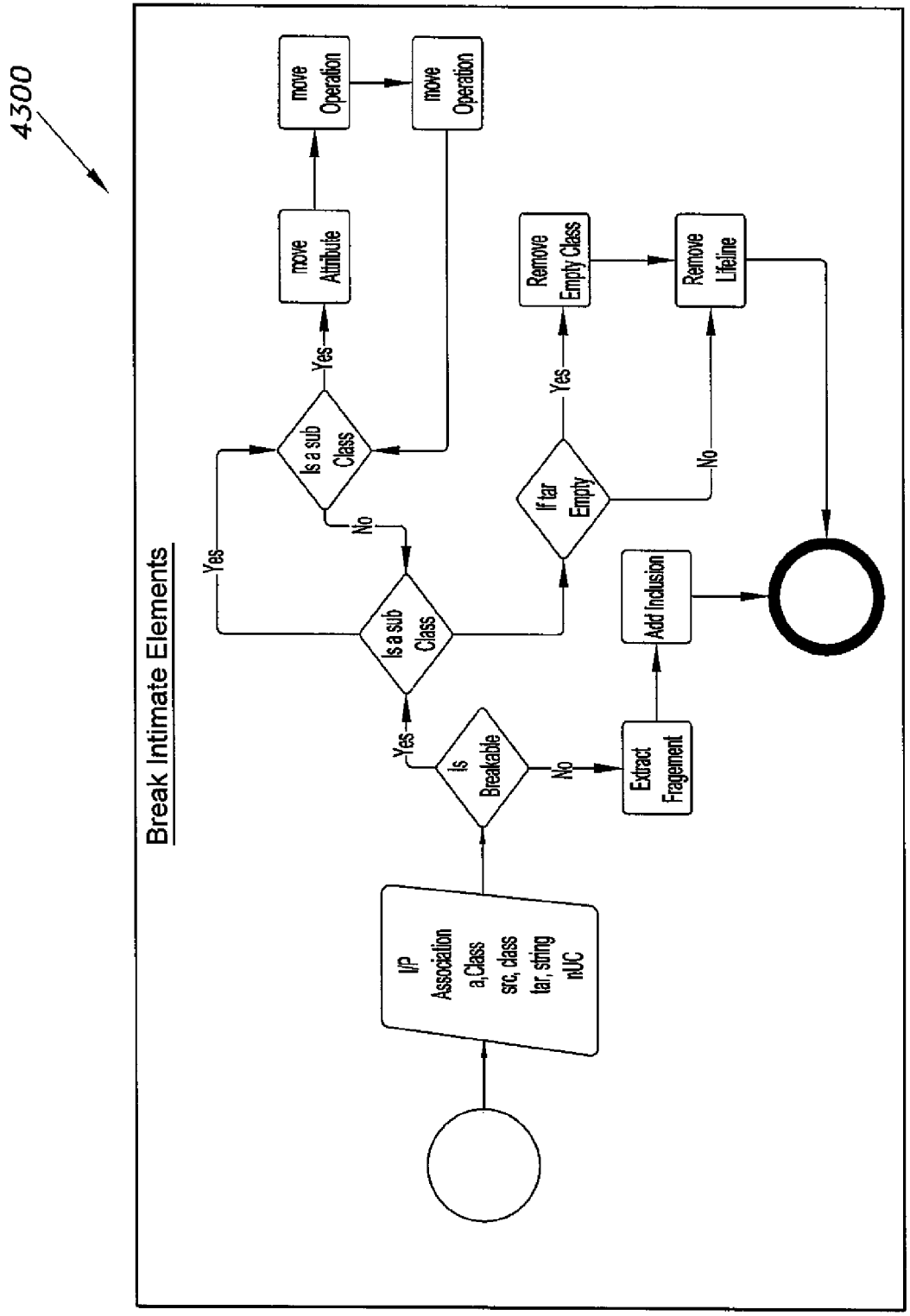
FIG. 43 is a block diagram showing Break Intimate Elements Refactoring according to the present invention.

FIG. 43 shows the ordering 4300 of the composite refactoring Break Intimate Elements. Due to the alternative nature of the refactoring operation, no post-conditions are specified. In case the first path is traversed, Class tar may not be part of the refactored model. In case the second path is traversed, Use Case newCase exists within the refactored model.

Figure 44:
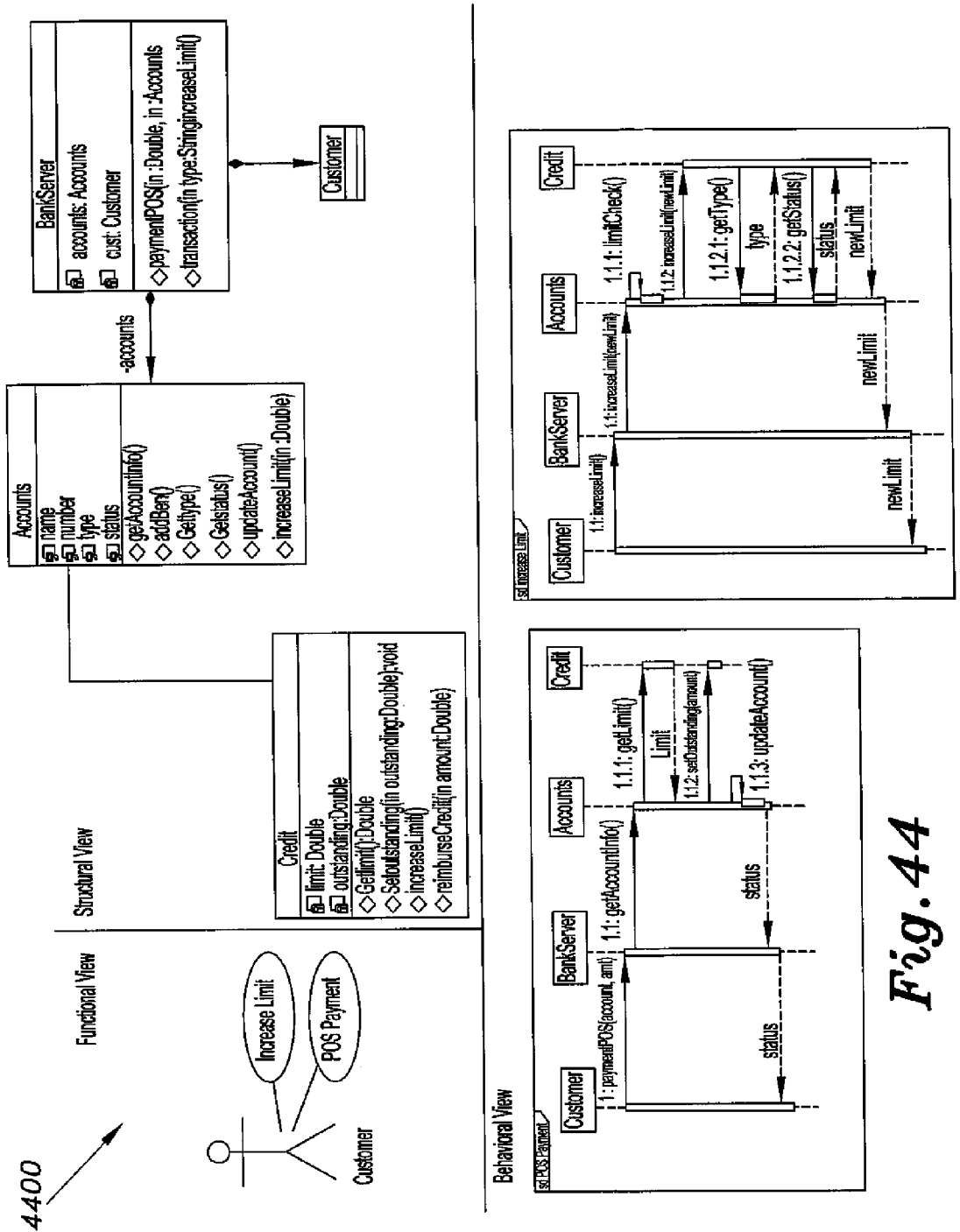
FIG. 44 is a block diagram showing an excerpt of the NBS model views depicting Undue Familiarity Smell.

FIG. 44 shows a subset 4400 of the model views from the NBS system that depicts the undue familiarity model smell. The association pair between the Accounts and Credit class was found to be bi-directional and further investigated for inappropriate interactions within the sequence model. These pairs appeared within two interactions POS Payment and Increase Limit. Closer examination of the identified interactions revealed that message passing between these two classes was inappropriate as both classes performed update and access message exchanges between each other.

The MoveAttribute and MoveOperation refactorings listed in Table 51 were applied to move the familiar attributes and operations to the source class.

TABLE 51

MoveAttribute and MoveOperation Refactorings

1. MoveAttribute (Accounts, Credit, limit)
2. MoveAttribute (Accounts, Credit, outstanding)
3. MoveOperation (Accounts, Credit, increaseLimit)
4. MoveOperation (Accounts, Credit, reimburseLimit)

For each operation moved into the Accounts class, the Remove Message refactoring was applied to remove the message interaction between the two classes. The set of refactorings listed in Table 52 was applied to the interactions of POS Payment and Increase Limit.

TABLE 52

Refactorings for POS Payment and Increase Limit

1. RemoveMessage (Accounts, Credit, getLimit)
2. RemoveMessage (Credit, Accounts, limit)
3. RemoveMessage (Accounts, Credit, setOutstandingAmount)
4. RemoveMessage (Accounts, Credit, IncreaseLimit)
5. RemoveMessage (Credit, Accounts, getType)
6. RemoveMessage (Accounts, Credit, type)
7. RemoveMessage (Credit, Accounts, getStatus)
8. RemoveMessage (Accounts, Credit, status)
9. RemoveMessage (Accounts, Credit, newLimit)

Figure 45:
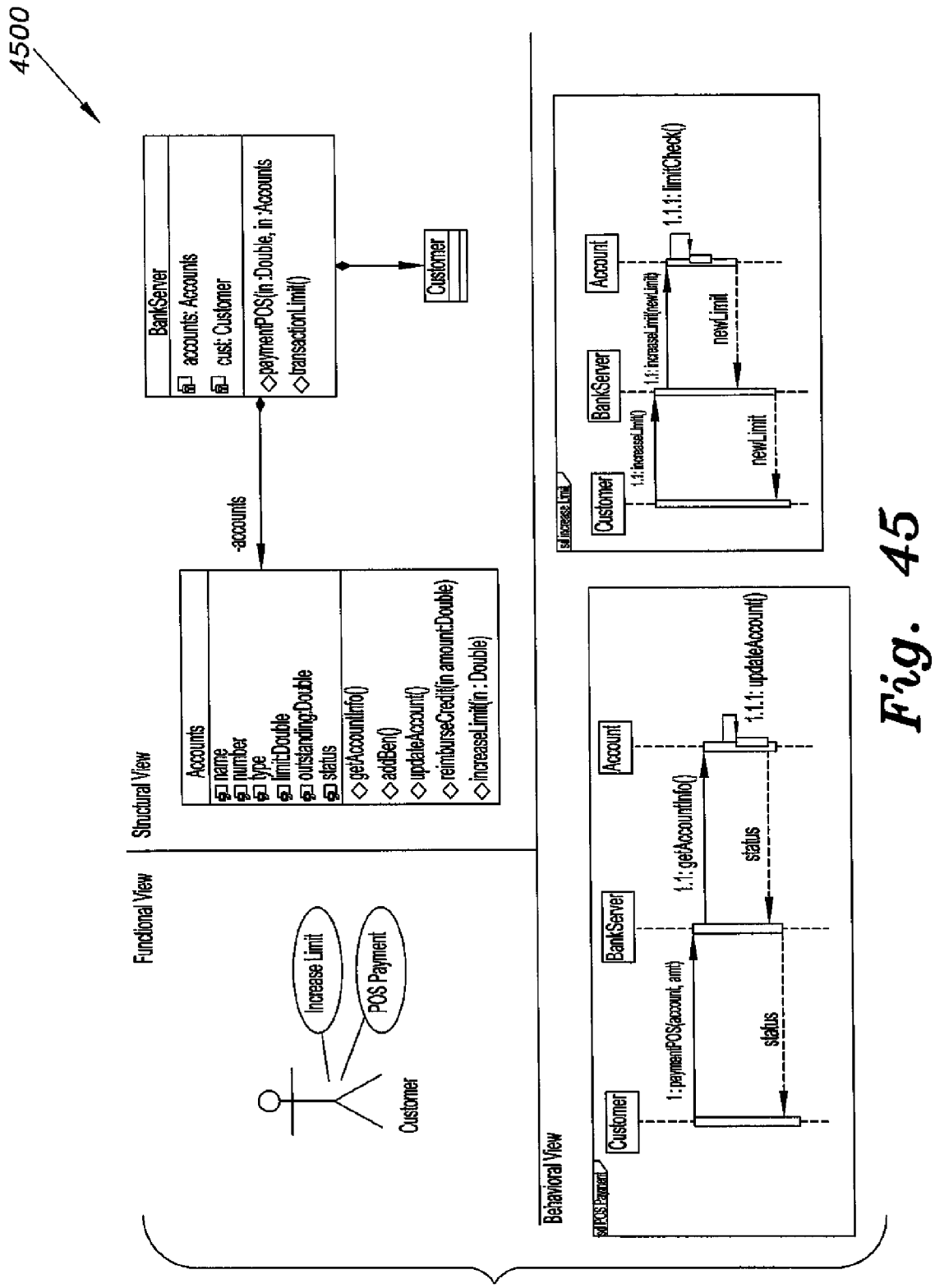
FIG. 45 is a block diagram showing an excerpt of the NBS model views after refactoring according to the present invention.

The Remove Lifeline (Credit) is then applied to the isolated Credit lifeline in both the POS Payment and Increase Limit interaction. Since the class Credit became empty as a result of the move operations, the Remove Empty Class (Credit) is applied to remove it from the structural view. The refactored model views are shown in excerpts 4500 of FIG. 45. The example presented here for Undue Familiarity is one instance of the model smell. Hence, the functional view was not modified.

When objects are properly encapsulated, the model as a whole is more pliant to change. But when objects go against encapsulation, the model becomes more difficult to change. Problems in one object propagate to other objects throughout the system and changes in one object require changes in other objects.

Application of this refactoring reduces intimacy between overly intimate classes by either combining them or moving features where they are used most often. This ensures encapsulation principle of Object Oriented Programming and hence reduces coupling between classes and makes the model more reusable, maintainable and easier to update. The complexity of the use case and its interaction is also reduced by removing additional transactions within the interaction model of the use case. Behavior and functionality is properly distributed in the functional view of the model. Hence, it is safe to quote that the refactoring operation reduces the complexity and organization of the use cases within the model.

Inappropriate Intimacy is a result of improper behavior distribution within the software model beginning from its functional view in high-level design phase and propagating to its structural view in low-level design phase. Reduction of this intimacy will not cause any side effects within the design model, as it was a result of improper behavior distribution.

Figure 46:
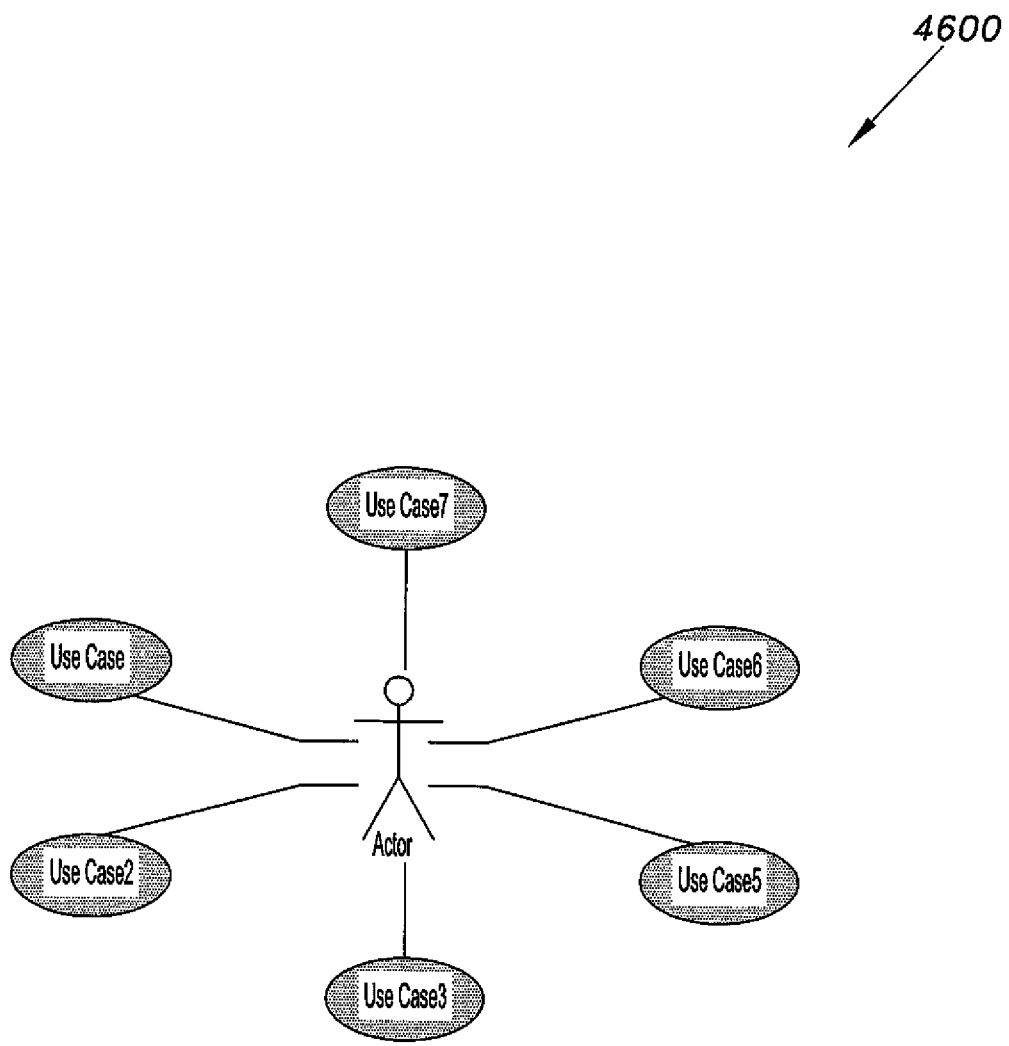
FIG. 46 is a block diagram showing a use case model depicting Spider's Web Model Smell.

As known by artisans having ordinary skill, the actor-to-use-case relationship suggests the name Spider's Web. This model smell is derived from the same concept. This model smell occurs when an actor in the use case model has multiple responsibilities (i.e. associated with a number of use cases) so that the view looks like a spider's web. Pictorial diagram of the spider's web model smell in the form of exemplary use case model 4600 is illustrated in FIG. 46.

An actor initiating multiple use cases is either an indication that the actor is defined too broadly or inappropriate granularity of use cases. In case of improper actor identification, the behavior of actor participation in the sequence diagram and its association with other entity classes (since actors are realized as entity classes in the detailed design phase) must be examined. For instance, a User actor is very general and is usually associated with a large number of use cases. In case of inappropriate granularity of use case composition, use case behavioral view must be examined to ensure the fragmented use case is non-trivial, does not describe an internal system process and provides a usable output value to the system's user. For instance, highly fragmented use cases usually describe interactions between the system and the actor rather than the actual goal.

Although the existence of the spider's web smell can be visually identified through the use case diagram, it cannot be classified as a model smell unless all views are examined to detect the existence of improper actor classification and use case decomposition.

Spider's Web model smell may lead to a complex use case model that is difficult to understand and maintain. The existence of spider's web model smell in the use case model is also an indication of God Class existence in the structural view. Since one of the effects of spider's web model smell is the improper fragmentation of use cases, the total number of sequence diagrams described by the system increase causing duplication and unnecessary implementation. Hence, the availability of spider's web in a use case diagram not only complicates the functional view but also adds unnecessary redundant behavior in sequence diagrams and may result in behaviorally rich entity classes that realize the actors involved in the model smell.

To ensure the applicability of this model smell in the integrated model, an actor associated with multiple use cases is selected. In order to quantify the number of use cases required in order to select an actor as a candidate for further examination, we use the "Number of Use Cases per Actor (NUCA)" metric and its maximum threshold $UP_{NUCA}$. Since this upper limit threshold value is not available in the literature, we consider actors that are associated with more than 30% of the total use cases implemented by the system.

The behavior of the selected actor is then examined to identify whether the actor represents a user type or a role. Using actors to represent types rather than roles results in compromising usability and stability of the use case model. In order to identify whether an actor is representing multiple roles within the system, a behavior signature is associated with each use case associated with an actor. A behavior signature is a set of lifelines interacting with the actor to realize the use case functionality in the sequence diagram. Use cases associated with the actor are then classified based on behavior signature similarity. Two signatures are also considered similar if the exclusion lifelines are child classes of the same parent class. If an actor is associated with multiple signatures, the existence of the Spider's web model smell is confirmed and is need of refactoring. The pseudo code listed in Table 49 describes the steps required for automated detection of the spider's web model smell.

TABLE 53

Spider's Web Algorithm
/* automated detection of the spider's web model smell */

1 start;
2 read Model
3 for (each actor in the Model)
4    read A
5    if (# of use-cases for A is >= $UP_{NUCA}$)
6       for (each use-case associated with A)
7          read UC
8          for (each lifeline associated with UC)

TABLE 53-continued

Spider's Web Algorithm
/* automated detection of the spider's web model smell */

```
9            read Life
10           if (Life is a child class)
11               sig = sig U {parent(Life)}
12           else
13               sig = sig U {Life}
14           end if
15         end for
16         if (first use-case)
17             base-sig = sig
18         end if
19         if (sig != base-sig)
20             diff = diff +1
21         end if
22       end for
23     end if
24     if (diff >= 2)
25         return A
26     end if
27   end for
28 stop
```

Regarding model refactoring mechanics, the refactoring name is Redistribute Responsibility. The parameters are Actor a, List actorNames, List ucNames, where a is the Actor with multiple roles, actorNames is the list of new actors to distribute the use cases, ucNames is the list of the use cases to be associated with each new actor in the actorNames list. The preconditions are that the name of the new actors (actor-Names) does not conflict with the name of existing actors within the model, and that the list ucNames includes all use cases assigned to Actor a. The mechanics of this refactoring is listed in Table 54.

TABLE 54

Refactoring Mechanics for Redistribute Responsibility

1. Split Actor refactoring is used to split actor a into the number of actors mentioned in the actorNames list.
2. Each new actor is associated with a subset of use cases assigned to the main actor a. Since Split Actor refactoring in the previous steps associates all use cases associated with the main actor to the newly created actor, unwanted associations are removed using the Remove Actor Reference refactoring based on the list provided by ucNames.
3. Isolate Actor refactoring is applied to main actor a to isolate it from the use case model.
4. Delete Actor refactoring is used remove the actor from the system.
5. If the lifeline for actor a has an incoming call event in the interaction, Create Sub Class refactoring is performed to create a new class based on the new actor to which the use case is assigned.
6. Push Down Operation refactoring is performed to move the incoming message to the newly created specialized class for the actor a.
7. Finally, Substitute Lifeline refactoring is then used to remove all references to the old actor from respective interaction diagrams and replace it with the new actor based on the new actor-use case relationship.

Figure 47:
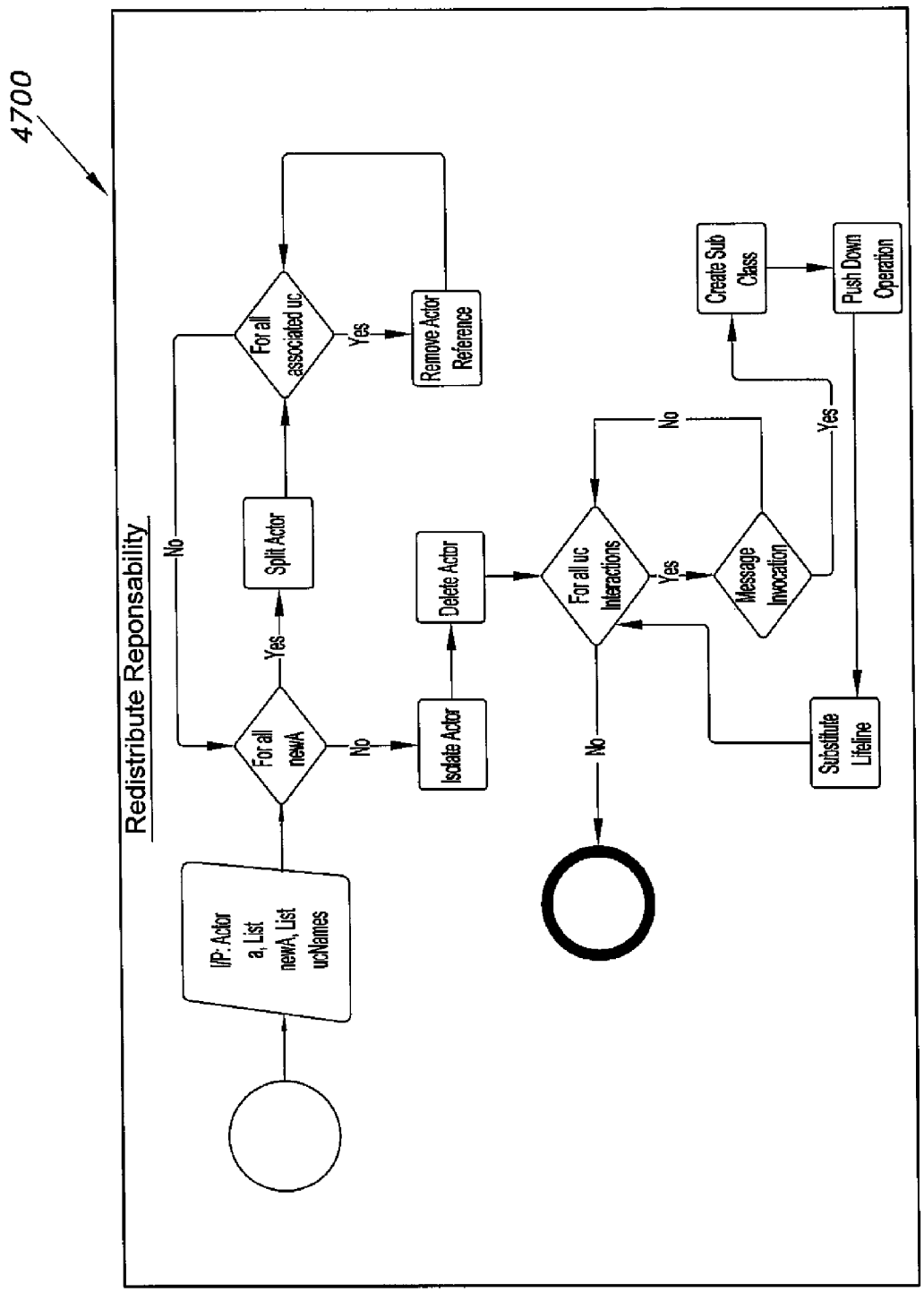
FIG. 47 is a block diagram showing Redistribute Responsibility Refactoring according to the present invention.
Figure 48:
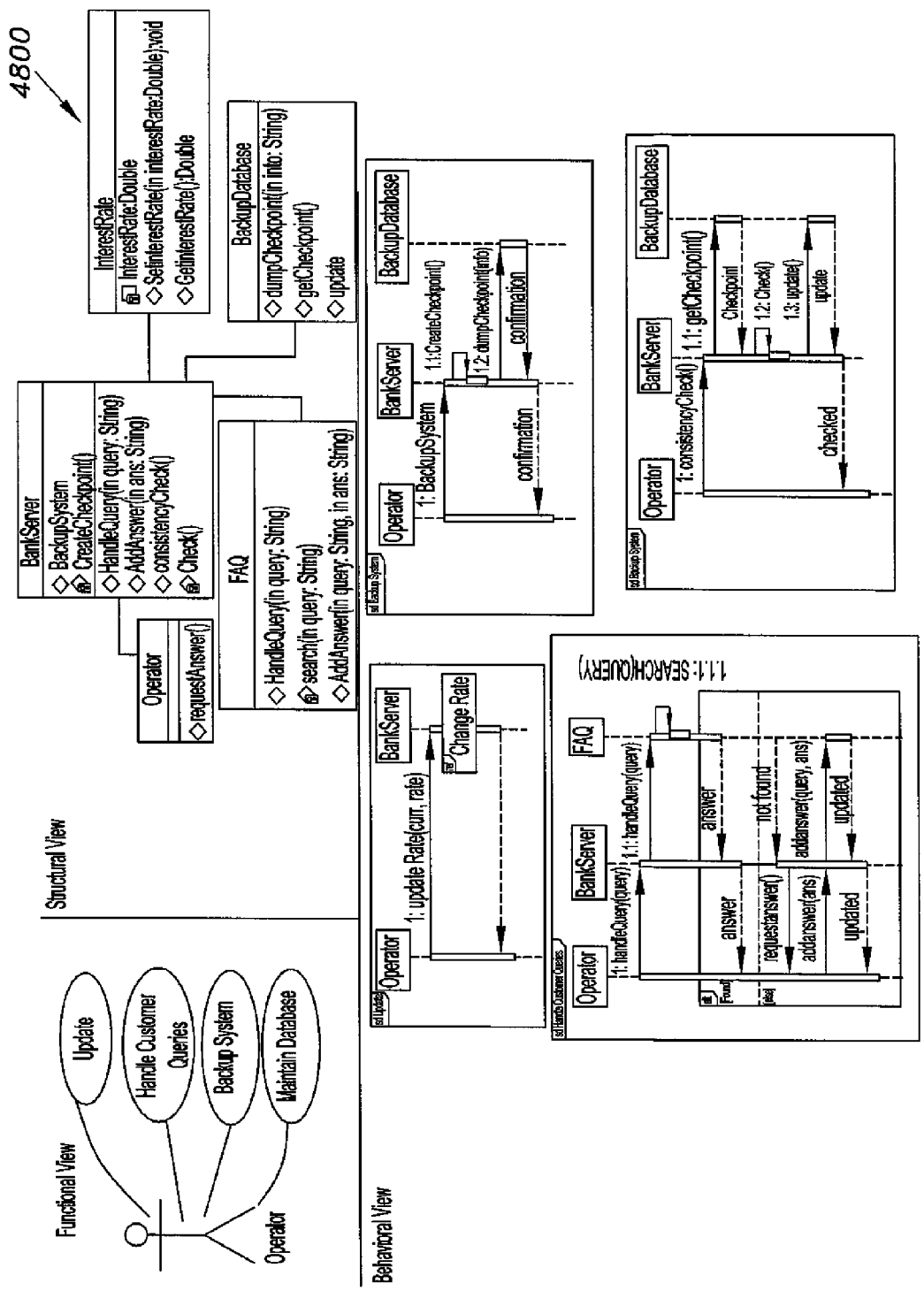
FIG. 48 is a block diagram showing an excerpt of the NBS model views depicting Spider's Web Smell.

FIG. 47 shows ordering 4700 of the composite refactoring Redistribute Responsibility. The post conditions are that Actor with name a does not exist in the model, and that Lifelines with reference to Actor a are replaced with reference to actors in actorNames. FIG. 48 shows a subset 4800 of the model views from the NBS system that depicts the spider's web model smell. On examination of the use case diagram, the existence of the actor Operator was identified having a number of use case associations.

In order to identify whether the actor is representing multiple roles within the system, its behavior signature is created for each use case it is associated to based on the information from the behavioral view. Table 55 lists the four signatures in line with the four use cases Operator is associated to in the use case diagram.

TABLE 55

Four Behavior Signatures

1. Update: {BankServer}
2. Backup System: {BankServer, BackupDatabase}
3. Customer Queries: {BankServer, FAQ}
4. Maintain Database: {BankServer, BackupDatabase}

Based on the signatures, it was identified that Operator was involved with more than one role in the system. Hence, the availability of the Spider's Web model smell is confirmed. In order to remove this smell, initially the Split Actor refactoring is applied based on the number of different signatures found. The refactoring operations listed in Table 56 are hence applied to the model.

TABLE 56

SplitActor Refactorings

1. SplitActor (Operator, Admin)
2. SplitActor (Operator, Tech Support)
3. SplitActor (Operator, Database Admin)

Since the Split Actor refactoring associated all new actors with the associations of the base actor, the Remove Actor Reference refactoring is applied to assign the new actors to their specific use cases. This is based on the information available from the behavioral view. The behavioral view refactoring operations listed in Table 57 are, hence, applied to the model.

TABLE 57

Behavioral View Refactoring Operations

1. RemoveActorReference (Admin, Handle Customer Queries)
2. RemoveActorReference (Admin, Backup System)
3. RemoveActorReference (Admin, Maintain Database)
4. RemoveActorReference (Tech Support, Update)
5. RemoveActorReference (Tech Support, Backup System)
6. RemoveActorReference (Tech Support, Maintain Database)
7. RemoveActorReference (Database Admin, Update)
8. RemoveActorReference (Database Admin, Handle Customer Queries)

Since the use cases are appropriately and completely partitioned among the new actors, the IsolateActor (Operator) and eventually DeleteActor (Operator) is applied to remove the actor Operator from the model.

Figure 49:
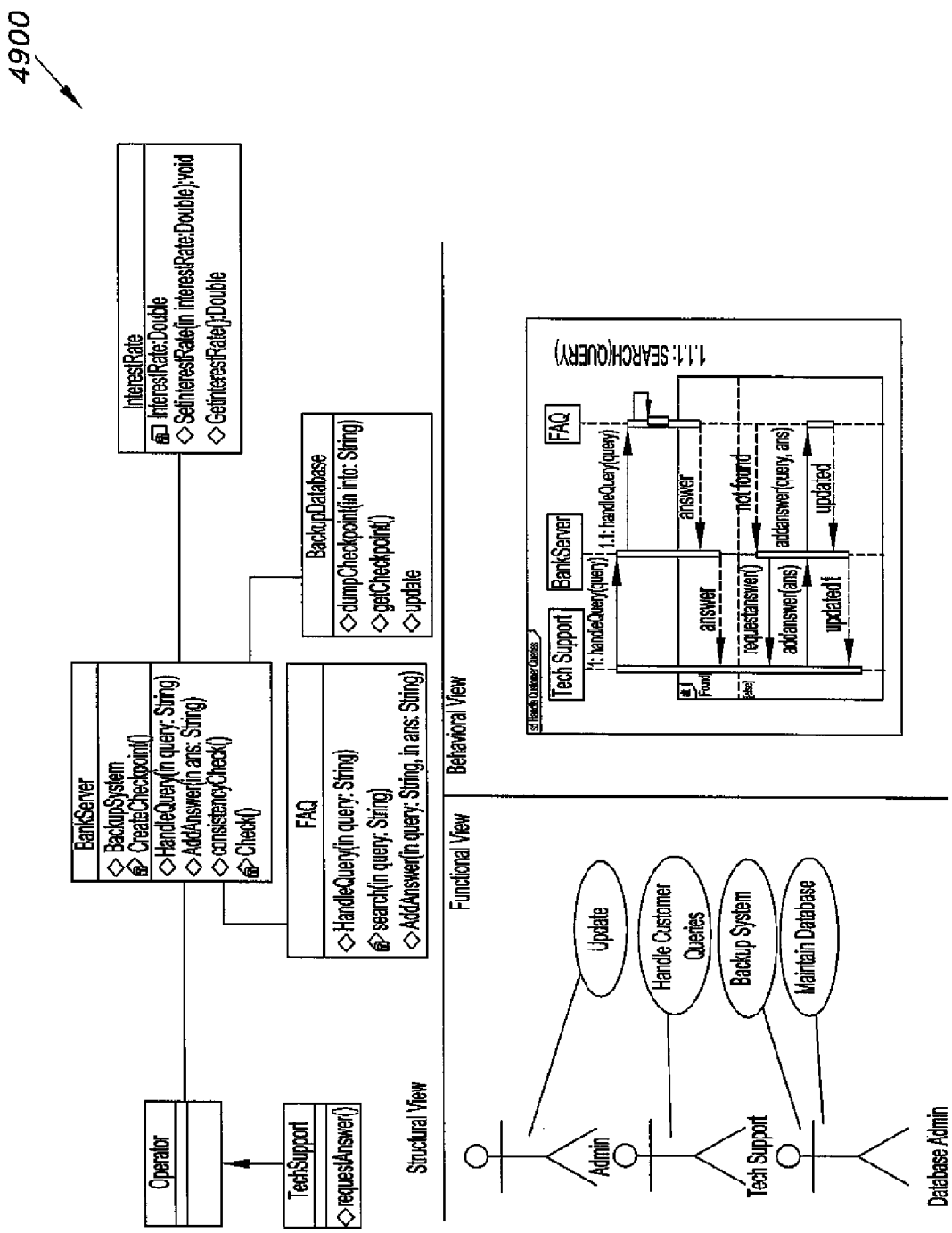
FIG. 49 is a block diagram showing an excerpt of the NBS model views after refactoring according to the present invention.
Figure 49:
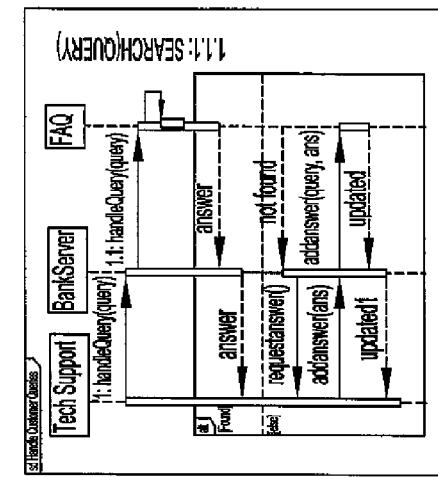
Figure 49:

All interactions of the use cases involved in the refactoring process are examined to identify if the lifeline for the actor Operator has an incoming call event in the interaction. Since the BankServer lifeline invokes the message requestAnswer( ) from the Operator lifeline in the Handle Customer Queries interaction, CreateSubClass (Operator, Tech Support) refactoring is performed to create a new class based on the new actor Tech Support to which the use case is assigned. The PushDownOperation (Operator, requestAnswer) is performed to move the operation to the Tech Support Class and finally SubstituteLifeline (Operator, Tech Support) is applied to redirect messages to the newly created sub class. The refactored model views 4900 are shown in FIG. 49.

System actors trigger use cases and an actor can start more than one use case within the system. This is depicted by an association relationship between the actor and the use case in the use case diagram. The more use cases associated with an actor, the more complex is the relationship between actors and the system.

Application of this refactoring reduces the number of use cases associated with an actor by splitting them among actors. This ensures that actors within the system are not user types but roles. From the viewpoint of an actor, the complexity of the system is reduced, as it has to deal with fewer use cases. Apart from improving the complexity of the actors and their interaction, behavior is properly distributed and associated to appropriate triggers. This restructuring also affects the structural view by introducing the concept of modularity through generalization and functionality distribution.

The Spider's web model smell exists within a system due to improper actor identification and functionality association. Although reducing the number of use cases associated per actor comes at the cost of having more actors in the system. This increase in the number of actors affects the size of the system and hence increasing its overall use case point value used popularly for use case effort estimation.

Specters' model smell occurs in cases where designers new to object-oriented design define system architectures. In this model smell, one or more ghostlike apparition classes exist in the system that appear only briefly to initiate some action in another more permanent class. We refer to these classes as Specter classes as they have a very brief lifecycle and are classes with limited responsibilities and roles to play in the system.

Although the name of this smell suggests a smell related to the class diagram, the existence of this smell requires information from all UML views for the key reasons enumerated in Table 58.

TABLE 58

Reasons for Requiring Information From All Views for Specter Smell

1. A specter class is a stateless class or in other terms, a class with no attributes. This can be identified from the system's structural view. This class is also referred to as an Irrelevant Class.
2. All associations of the specter class are transient. A temporary, short-duration class pops into existence only to invoke other classes through temporary associations. This can be confirmed by taking into consideration all the sequence diagrams (behavioral view) associated with the system. Specter classes within the sequence diagram usually send messages to other classes but never receive any messages back.
3. It is part of a single-operation use case that exist only to invoke other use cases through an include relationship. Single-operation use cases are usually in the center of a nested "include" path for delegating control to an essential use case.

The specters' model smell is a variation of a well-known anti-pattern known as Poltergeist. The specters' model smell is usually intentional on the part of some architects who do not really understand the object-oriented concept. Availability of these classes results in a chaotic software designs, inclusion of unnecessary abstractions; and hence make the system design excessively complex, hard to understand, and hard to maintain.

To ensure the applicability of this model smell in the integrated model, classes with no attributes and associated with a number of other classes are selected. The behavior of these classes within the sequence diagram is then studied. If these classes are invoked by other classes only to act as a delegate or simply invoke other classes without receiving any reply, the existence of the specters' smell is confirmed. In order to reduce the search space, information from the functional view plays a vital role. Specter' classes are usually part of inclusion use cases or highly complex use cases (such as the God Use Case). Since the Multiple Personality smell handles existence of transient classes that act as agent classes or middle-men classes, the specter's smell identifies transient classes that simply invoke other classes. The pseudo code listed in Table 59 describes the steps required for automated detection of the specters' model smell.

TABLE 59

Specters' Algorithm
/* automated detection of the specters' model smell */

| | |
|---|---|
| 1 | start; |
| 2 | read Model |
| 3 | for (each class in the Model) |
| 4 | read C |
| 5 | if (# of attributes for C is = 0) |
| 6 | for (each inclusion use-case in the model) |
| 7 | read UC |
| 8 | for (each lifeline associated with UC) |
| 9 | read Life |
| 10 | if (Life = C) and (# of receive Events for Life = 0) |
| 11 | false = 0 |
| 12 | else |
| 13 | false = 1 |
| 14 | end if |
| 15 | end for |
| 15 | end for |
| 15 | end if |
| 16 | if (false = 0) |
| 17 | {specters} = {specters} U (C) |
| 18 | end if |
| 19 | end for |
| 20 | end if |
| 21 | return specters |
| 22 | stop |

Regarding model refactoring mechanics, the refactoring name is Redistribute Responsibility. The parameters include List classNames where, classNames is a list of classes suspected of being specter's. The precondition is that the list of classes in (classNames) does not have any attributes (objects excluded). The mechanics of this refactoring is listed in Table 60.

TABLE 60

Refactoring Mechanics for Redistribute Responsibility

1. Search all classes that invoke the specters class and use the Move Operation refactoring to move the method to the classes that use it.
2. Since the specter classes invoke other permanent classes based on its initial invocation of the start method, these corresponding invocations are required to be moved to the invoking lifeline in all interactions that include the specters class. This is simply done by applying the Remove Middle Man refactoring.
3. Since all operations are moved to the classes that invoke the specters class, the Remove Empty Class refactoring is applied to remove the class from the structural view of the system.
4. If interaction belongs to an inclusion use case and removal of the specters class result in a no message occurrences except for other inclusions and extensions through the "ref" fragment, the Collapse Fragment refactoring is then used. This refactoring inserts the interaction fragment of the inclusion use case into the interaction diagram of the including/base use case at the point of inclusion (ref fragment).
5. Finally, Merge UC Inclusion refactoring is used to merge the inclusion use case into the including use case.

Figure 50:
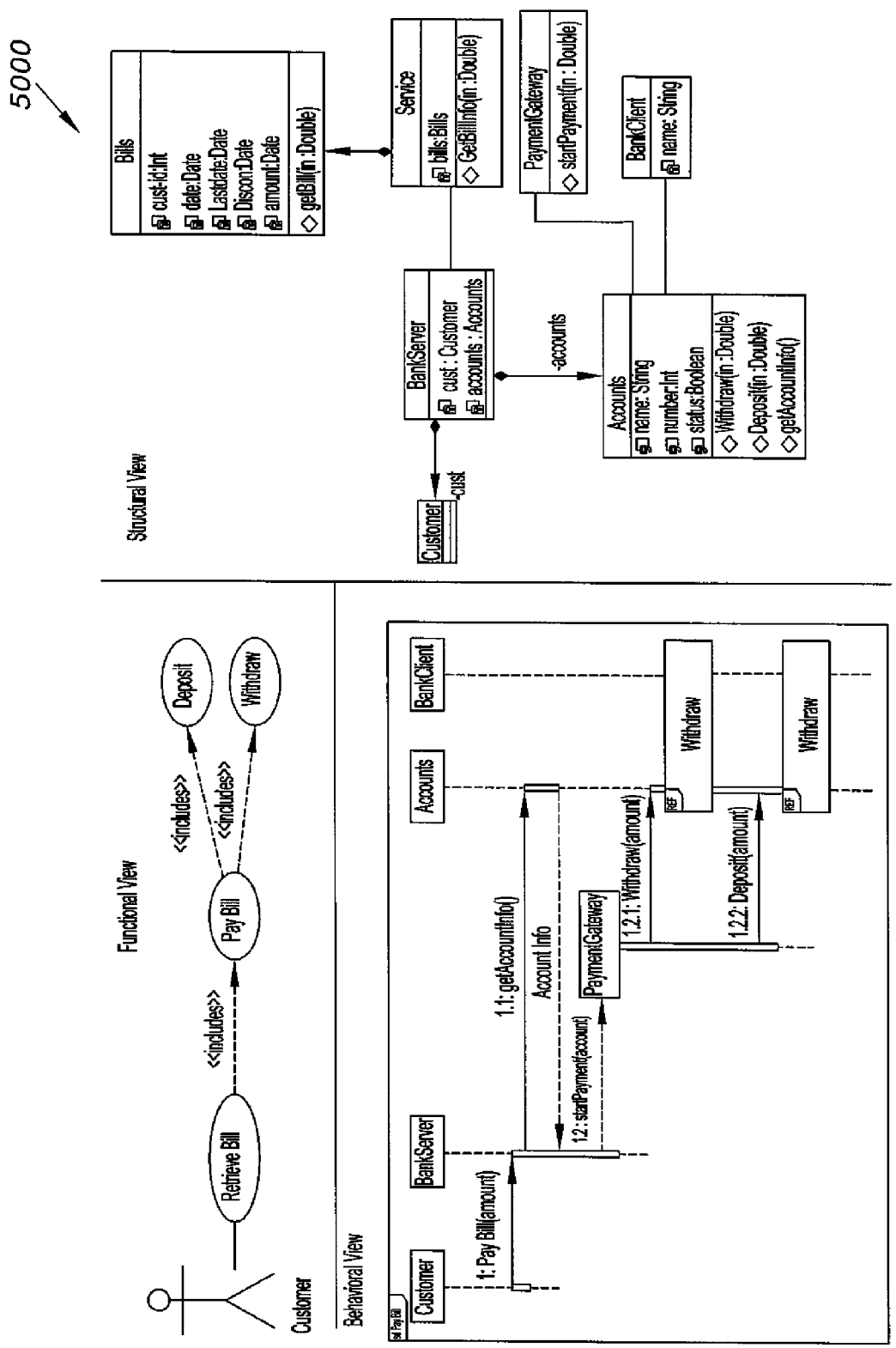
FIG. 50 is a block diagram showing an excerpt of the NBS model views depicting Specters' Smell.
Figure 51:
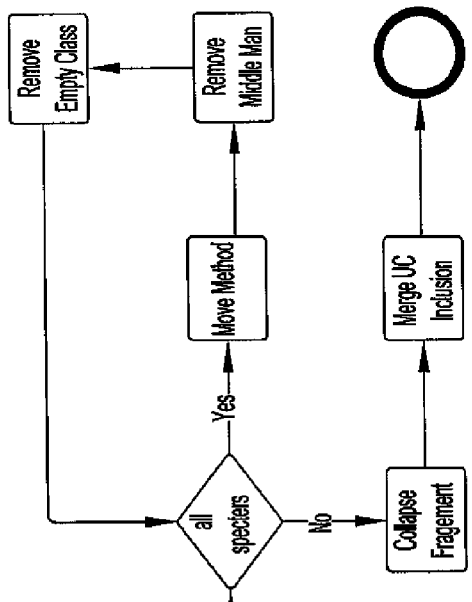
FIG. 51 is a block diagram showing Remove Specters' Refactoring according to the present invention.

FIG. 50 shows a subset 5000 of the model views from the NBS system that depicts the specters' model smell. FIG. 51 shows the ordering 5100 of the composite refactoring Remove Specters'.

On examination of the class diagram, the existence of an Irrelevant class instance PaymentGateway was identified.

Based on a list of all inclusion use cases (possibly those in the middle of a Include or Extend chain) obtained from the functional view, the interactions of all these were examined. The Pay Bill interaction made use of the PaymentGateway and the interaction had no receive events (except the invoking operation, which is ignored). Based on this information, the existence of specters' model smell is confirmed in the model.

Figure 52:
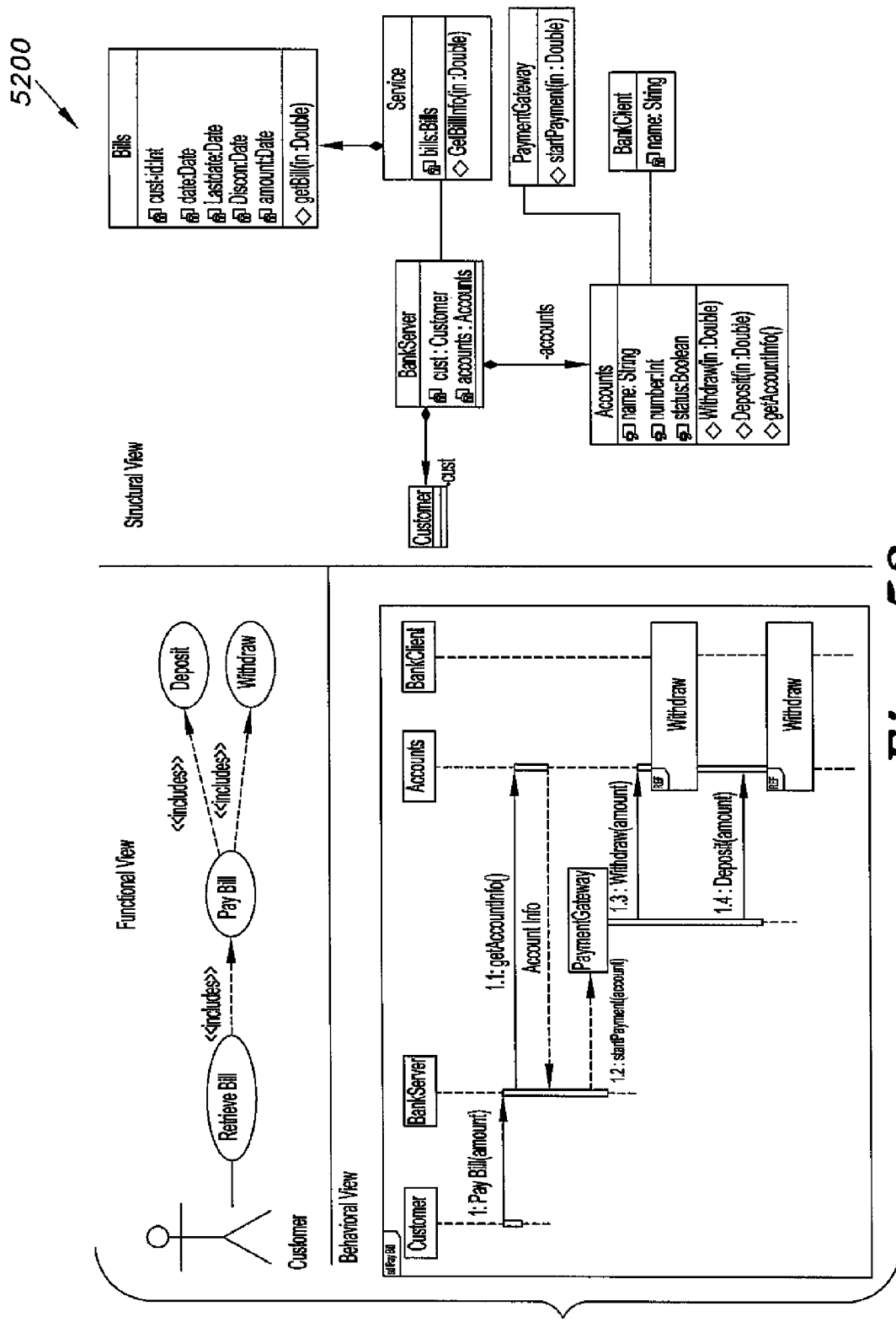
FIG. 52 is a block diagram showing an excerpt of the NBS model views after refactoring according to the present invention.

Initially, the invoking operation is moved into all the associated classes. Hence, the Move Operation (PaymentGateway, Accounts, startPayment) refactoring is performed for the given example. The RemoveMiddleMan (BankServer, PaymentGateway) refactoring is applied to remove the middle man lifeline and initiate direct communication. Since the invoking operation startPayment is moved to the invoking class, the empty class PaymentGateway is removed by applying the RemoveEmptyClass (PaymentGateway) refactoring. Since the PayBill interaction had other message occurrences even after the removal of the specter class, the CollapseFragment refactoring and MergeUCInclusion refactoring are not invoked resulting in no change made to the functional view of the system. The refactored model views 5200 are shown in FIG. 52.

Specter classes have limited responsibility in the system. They are stateless classes with a short lifecycle. Removal of these classes from the system reduces behavioral complexity by removing unnecessary interactions and lifelines from the interactions and as a result improves modularity between classes in the structural view by reducing coupling and increasing cohesion. As a result, an overall improvement is seen in the functional view wherein the seeding use-case behavior realized by includes and extends is reduced to reusability rather than adding to use case sequencing and scheduling. The depth of includes and extends relationship in the functional view is also reduced to enhance maintainability.

When correcting anti-patterns such as specters' (or poltergeists), the local and structural refactorings applied to the design can produce side effects that may introduce other anti-patterns. The most common side-effect anti-pattern that may result because of removing specters' from the model is the God Class. This is because the removal of an irrelevant class merges its functionality into the associated class that earlier held methods whose data may have been located in a rich God class.

This side effect can be easily circumvented by allowing the application of refactorings that handle God class before this refactoring such as Multiple Personality, Creeping Featurism and Undue Familiarity. Hence, this could move attributes from the invoking God class and the specters' class would no longer be considered as an irrelevant class.

Model duplication is one of the most common bad smells when it comes to code based refactoring. Although usually not defined over models, the use of an integrated model allows for the identification of common model fragments throughout the system description. Therefore, model duplication considering multiple views can be defined as information objects described separately within the system specification even when processed in the same manner. Duplicated model fragments are more difficult to identify than duplicate code fragments mainly because they are not exact replicas of each other.

In order to detect duplication, an initial point has to be established from one of the views. In this smell description, the Actor-Use Case relationship is selected as the point of origin for duplication detection and analysis. This selection is based on use case duplication observed in the prior art. The detection strategy described herein starts from this point; that is identifying near similar patterns and confirming them through information from the behavioral and the structural view as it traverses the functional view.

Duplication, be it code or model, is considered one of the most abhorrent smell evident from the literature. Not only does it reduce reusability, changes made to one portion of the duplicated fragment will remain unchanged in other similar fragments. Detection of duplication was not handled in previous studies on model refactoring mainly due to the lack of complete information in one single view of the system specification. The integration of model views allows exploitation of inter-view relationships and aids in the detection of duplication across models view.

Figure 53:
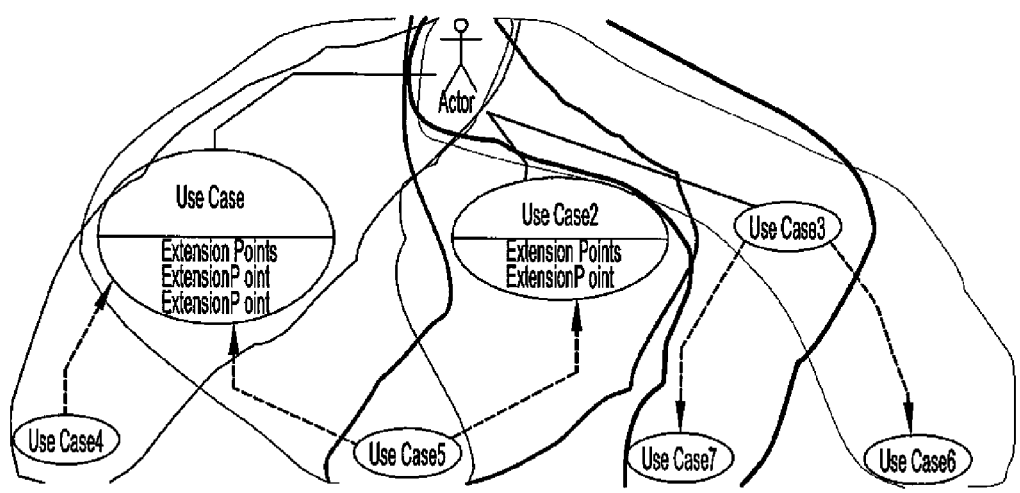
FIG. 53 is a block diagram showing concepts of paths in the detection strategy for Duplication Model Smell according to the present invention.

To ensure the applicability of this model smell in the integrated model, all actor-use case relationships are considered. To demonstrate this, we use the concept of trees. For each actor in the system, a tree is constructed (hypothetically) with the actor as the root node. Each of these trees is composed of multiple paths from the root node to the leaf node. An illustration of the detection paths 5300 is shown in FIG. 53.

The maximum depth of paths traversed is equivalent the maximum value among the maximum Depth of Inclusion Relationship (DOIR) and the maximum Depth of Extension Relationship (DOER). Two paths are investigated for similarity if the root node (i.e. the Actor) and the leaf node (an extension or inclusion use case) are same. For instance, Paths 2 and 3 are similar and are investigated to identify the availability of Model Duplication Smell. For the sake of simplicity, the use cases between the root and the leaf node are referred to as Middle Use Cases. Behavior of all middle use cases are examined and compared to establish similarity. Two behaviors are structurally similar if the conditions listed in Table 61 are present.

TABLE 61

Conditions for Structurally Similar Behavior

1. The lifelines involved in both the interactions are same. If not, at least the different ones are sub classes of the same super class.
2. The sequence of message interactions among lifelines is the same. Each message interaction is represented by a tuple {source lifeline, message-type, destination lifeline}.
3. Message names may or may not be similar but the size of the arguments are same for messages between the same sequence.
4. Extension and inclusion use cases (through "ref" fragments in the behavior) are invoked at the same sequence.

If structural similarity between two similar use cases is established, the existence of Model Duplication is confirmed. The pseudo code listed in Table 62 describes the steps required for automated detection of the model duplication smell.

TABLE 62

Model Duplication Algorithm
/* automated detection of the model duplication smell */

```
1   start;
2   read Model
3   for (each actor in the Model)
4       read A
6           for (each use-case associated with A)
7               read UC
8   sig = A + UC
9   if (# of extends for UC > 0) or (# of includes for UC >0)
10                  for (each extension or inclusion of UC)
11                      sig = sig + CLOSURE (UC)
12          end for
13  end if
14      {sig-set} = {sig-set} U (sig)
15  end for
```

TABLE 62-continued

Model Duplication Algorithm
/* automated detection of the model duplication smell */

```
16        for (each pair from {sig-set})
17            read sig1, sig2
18            if (size of sig1 = size of sig2) and (last two
    elements of sig1 and sig 2 are same)
19                status = SIMILARITY (sig1, sig2)
20            end if
21            if (status = 1)
22                dup = dup U {sig1, sig2}
23            end if
24        end for
25     end for
26     return dup
27  stop
```

The pseudo-code for model duplication uses two sub-functions: CLOSURE and SIMILARITY. Since the functionality of CLOSURE is trivial, we do not provide the algorithm for it here. The pseudo code for SIMILARITY that checks for structural similarity of two interactions is listed in Table 63.

TABLE 63

Similarity Algorithm
/* SIMILARITY detection */

```
1   start;
2   read sig1 and sig2
3   for (each i from 2 to size-2 of sig1)
4       read UC1 = sig1(i) and UC2 = sig2(i)
6       diff = (lifelines in UC1) ∩ (lifelines in UC2)
7       if (diff is a super-sub relation)
8           for (each message occurrence in UC1 and
                UC2)
9               read msg1 in UC1 and msg2 in UC2
10              msg1-set = (source, type, destination
                    of msg1)
11              msg2-set = (source, type, destination
                    of msg2)
12              if (msg1-set = msg2-set)
13                  similar = 1
14              else
15                  similar = 0
16                  break
17              end if
18          end for
19      end if
20  end for
21  return similar
22  stop
```

Regarding model refactoring mechanics, the refactoring name is Remove Duplication. The parameters are Actor a, Use Case uc1, Use Case uc2, String newName, where a is the Actor, uc1 is one of the duplicate use cases, uc2 is the other duplicate use case, and newName is the name of a new use case that results from merging the two duplicate use cases. The preconditions are that the name of the new use case (newName) does not conflict with the name of an existing use case within the model, and that the use cases uc1 and uc2 are assigned to Actor a. The mechanics of this refactoring is listed in Table 64.

TABLE 64

Refactoring Mechanics for Remove Duplication

1. Create UseCase refactoring is used to create a new use case.
2. Extract Fragment refactoring is then used on either use case sequence diagram (uc1 or uc2) to extract the complete interaction into the newly created use case.

TABLE 64-continued

Refactoring Mechanics for Remove Duplication

3. Since the structurally similar behavior of the two use cases may have different messages, the Replace Message refactoring is used to rename the message. An argument "type" is also added to the message that determines the type of action performed by the structurally similar use cases. Merge Operation refactoring is also applied to merge the lexically different operations in the class and renamed it to the new message name used in the interaction.
4. If different lifelines exists in the two interactions (they are sub-classes based on the constraint included in the smell description), Substitute Lifeline refactoring is performed to add the super class to the interaction.
5. Add Actor Reference refactoring is performed to add an association between the actor triggering the use cases uc1 and uc2 and the new use case.
6. Isolate UseCase refactoring is applied to the use cases uc1 and uc2 to isolate them from the use case model.
7. Delete UseCase refactoring is used to remove the use cases uc1 and uc2 from the system.

Figure 54:
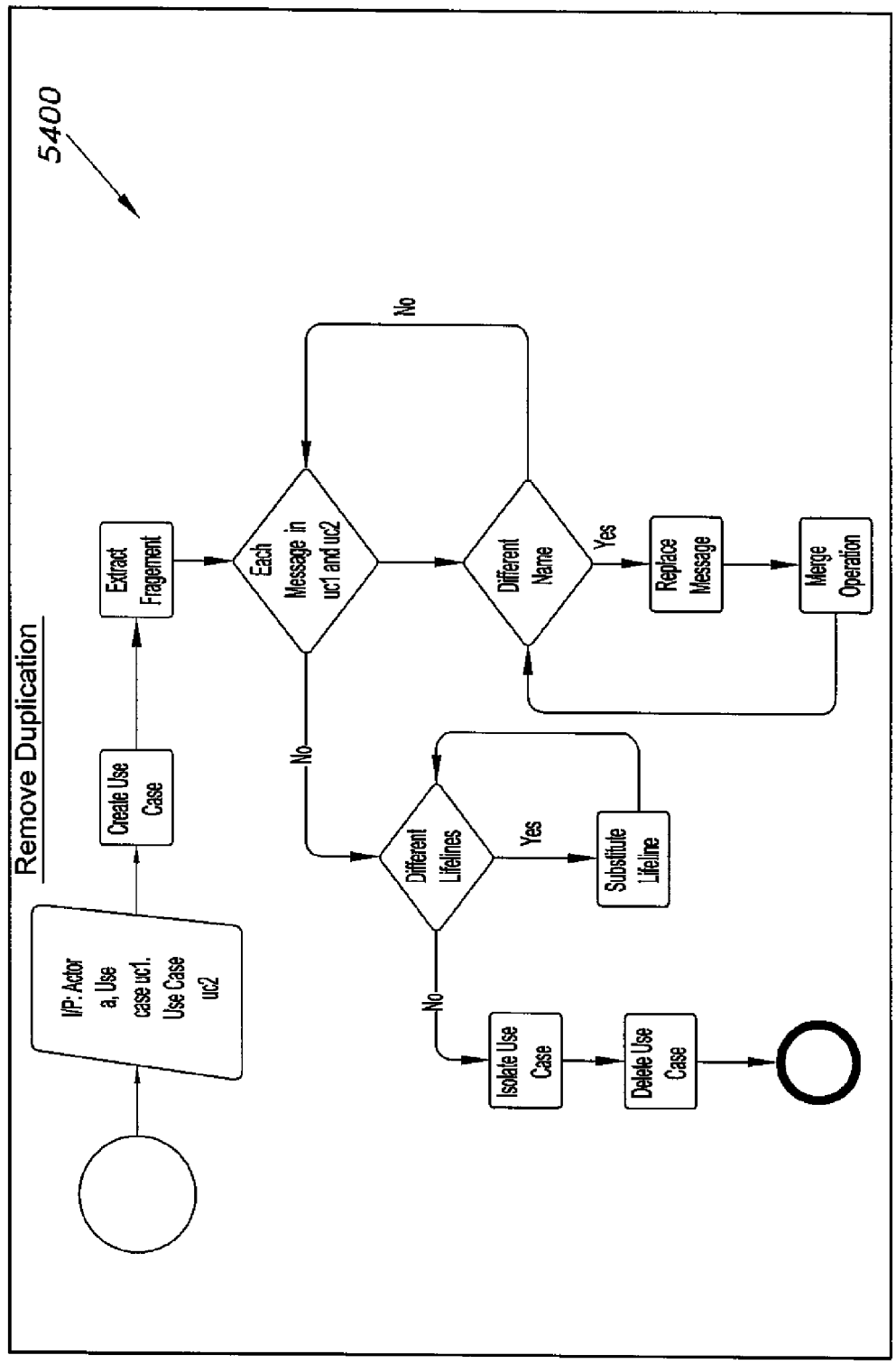
FIG. 54 is a block diagram showing Remove Duplication Refactoring according to the present invention.
Figure 55:
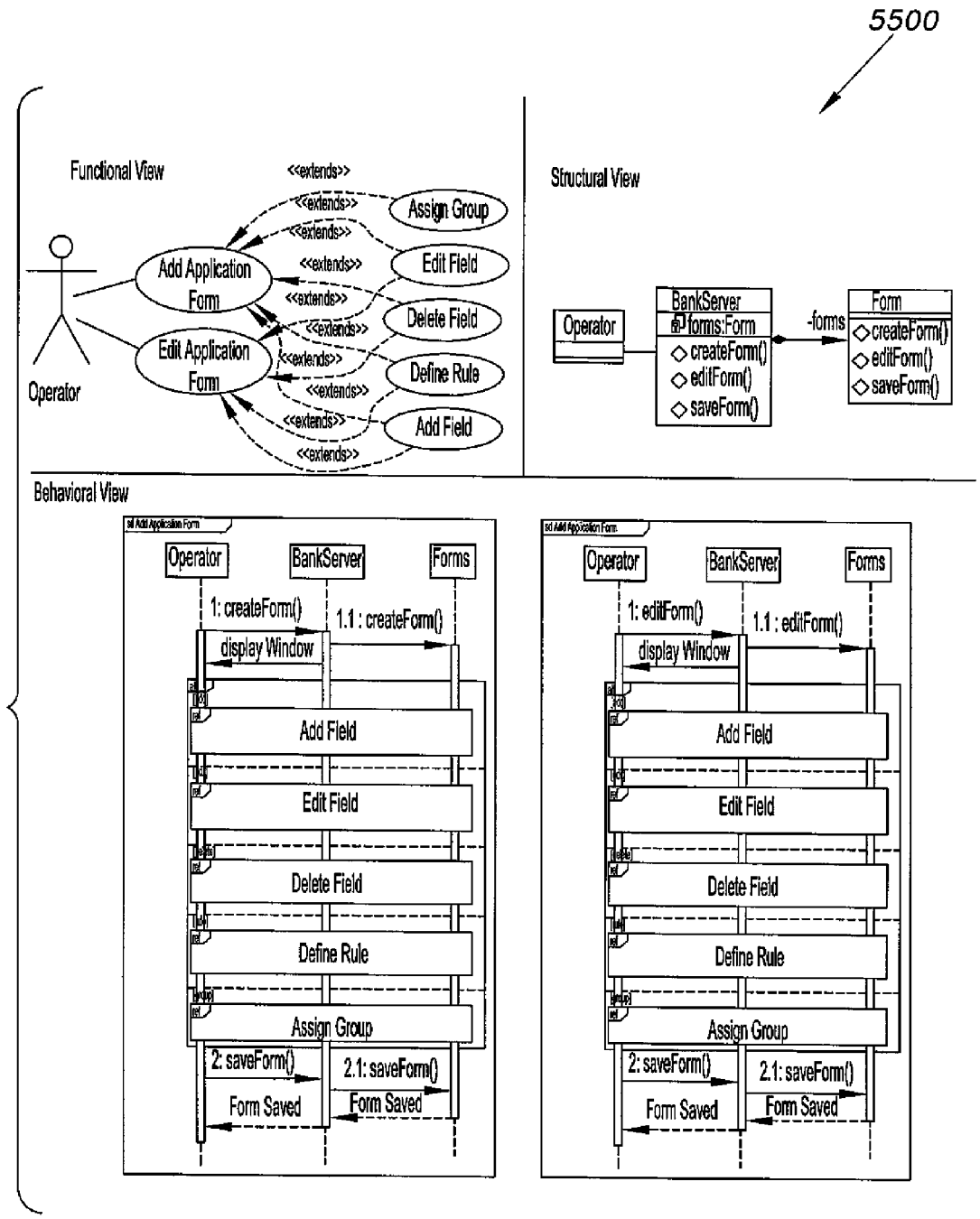
FIG. 55 is a block diagram showing an excerpt of the NBS model views depicting Duplication Smell.

FIG. 54 shows the ordering 5400 of the composite refactoring Remove Duplication. The post conditions are that Use cases with names uc1 and uc2 does not exist in the model, and that Use case with name newCase is added to the model. FIG. 55 shows a subset 5500 of the model views from the NBS system that depicts the duplication model smell. On examination of the use case diagram, two paths associated with the actor Operator were identified. In order to ensure the existence of the model smell, the behavior of the middle use cases involved Add Application Form and Edit Application Form were observed. The sequence of message occurrence between the two interactions was found to be structurally similar. Hence, the existence of the duplication model smell was confirmed.

Figure 56:
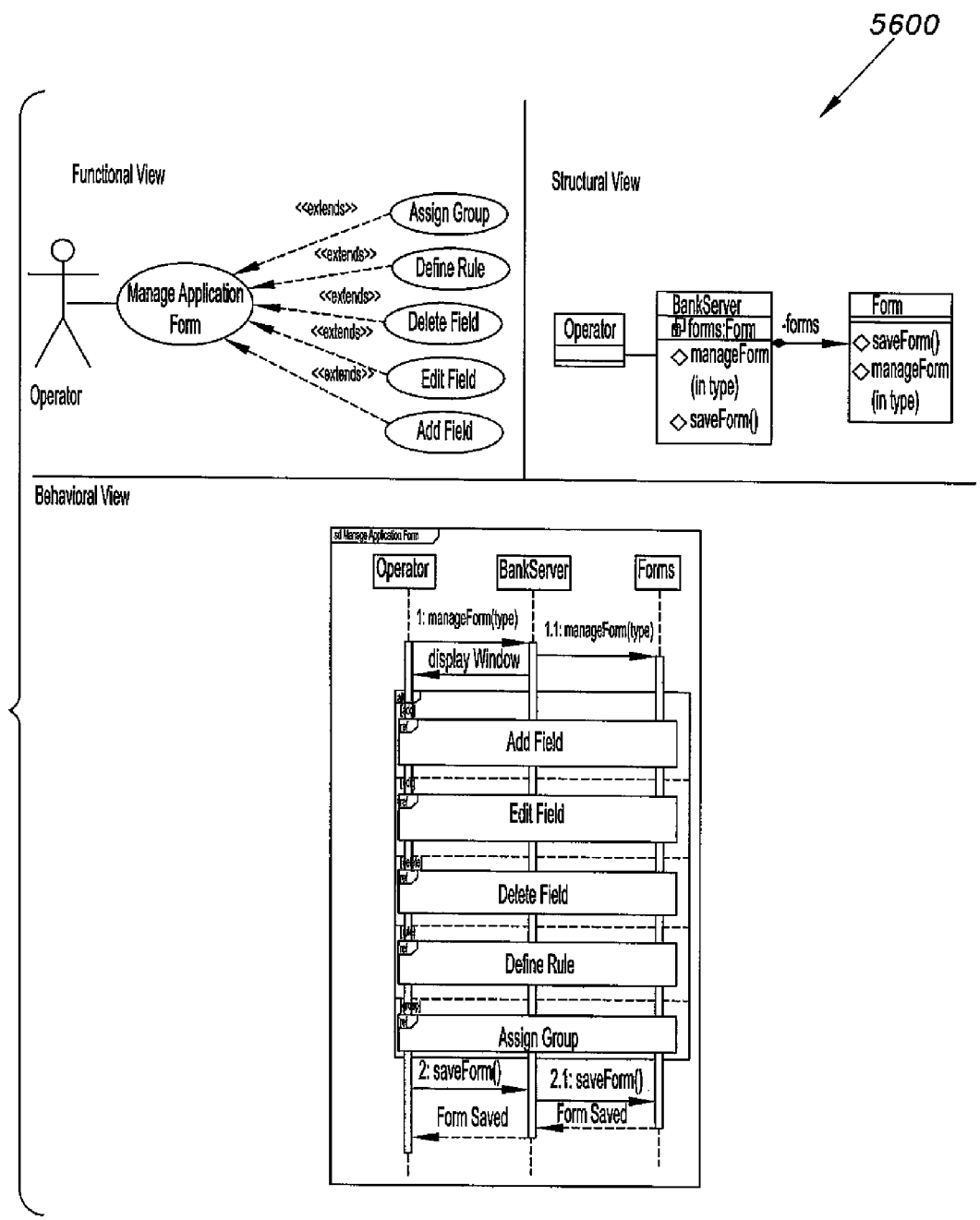
FIG. 56 is a block diagram showing an excerpt of the NBS model views after refactoring according to the present invention.

Initially, the CreateUseCase (Manage Application Form) refactoring is applied to create an empty isolated use case. Then the ExtractFragment (Add Application Form, Manage Application Form) refactoring is performed to copy the complete interaction fragment from one of the similar use cases (either can be used) into the new use case. In order to identify lexically different message interaction between the use cases, each message in the interaction of Add Application Form and Edit Application Form is compared. A message with a different name is replaced in the interaction of the new use case Manage Application Form with a new message. The following refactoring operation is hence applied ReplaceMessage (createForm, manageForm(type)). If both the messages are not used in any other interactions, they are replaced in the class diagram. The MergeOperation (createForm, EditForm, manageForm) refactoring is applied to the structural view to apply the change. Since the use of super-sub class relationship was not utilized (as lifelines in both the use cases were same), the AddActorReference (Operator, Manage Application Form) is applied. The duplicate use cases are initially isolated by applying the IsolateUseCase (Add Application Form) and IsolateUseCase (Edit Application Form) and finally deleted by applying the DeleteUseCase (Add Application Form) and DeleteUseCase (Add Application Form). The refactored model views 5600 are shown in FIG. 56.

Duplication is one of the most common defects that can be observed in models. The most common form of this duplication is through the use of similar or different information objects and describing the processes that manipulate them as separate use cases.

Merging use cases that handle similar information objects through a structurally similar sequence of message interactions reduces the redundancy in describing their behavior in the sequence diagram. It also reduces the number of use cases in the use case model and the number of use cases associated with an actor, which in turns reduces complexity of the use case model. Merging use cases that manipulate different information objects through a similar process helps in identifying and applying object-oriented principles such as reusability through inheritance and polymorphism to the structural view of the model.

Although the removal of duplication from the integrated model does not introduce side effects into the model, it does require a change in the operation arguments in the class and sequence diagrams. Ensuring behavior preservation can get complicated with the model size and hence the complexity of this refactoring is directly proportional to the size of the integrated model considered for refactoring.

Regarding an effect known as the ripple effect, a change in one design artifact can cause cascading changes to all related artifacts. This propagation is based on the degree of dependency that exists between the related artifacts. In case of a multi-view modeling environment such as UML, artifacts usually belong to different views. Functional requirements specify the intended behavior of the system and use cases have become a widely accepted modeling notation for capturing them. Software requirements are volatile and their change can occur at multiple points during the development process and is inevitable. The ripple effect model smell identifies the strength of dependency between use cases and classes which are connected through an intermediate artifact; the sequence diagram. The strength of dependency is an indicator that a change in the use case specification will eventually effect the structural organization of objects within the system. A high degree of change can therefore question the stability of the system and severely affects its efficiency and maintainability.

The ripple effect model smell is a variation of the shotgun surgery and divergent change bad smells proposed in previous related art literature. However, unlike them, the ripple effect makes use of the additional information from functional view and tries to identify the change impact caused to the structural and behavior view because of changes to the functional requirements of the system under design.

Dependency between different artifacts is mainly due to the use of multi-phase development by most of the software development paradigms. Use of information from one artifact for the development of others ensures consistency. Although dependency is certain, the degree of dependency depends on the design of the system. If modeled incorrectly, severely affects the design maintainability and reusability. When the number of classes implementing a use case is high, this indicates that changes in a use case can have impact on a large number of classes. This change propagates to all other related classes and since classes are shared between use cases results in a cycle of change propagation. More specifically, an indicator that related functionality is spread over the system design. Hence, this adversely affects design stability and maintainability.

Based on the inter-view relationship, the number of classes per use case can be identified by information from use case diagrams, sequence diagrams and class diagram. Use cases describe the functional requirements of a system. Classes implement these requirements and their participation within use cases is depicted in the sequence diagrams. In order to detect the existence of the Ripple Effect smell, we developed a basic metric called Impact Factor (IF), which is calculated for each use case.

Each class in the integrated model is associated with a number of other classes through association, aggregation and composition relationship. The metric Number of Associations Linked to a Class (NASC) provides this value for each class. The behavior of each use case is represented through a sequence diagram, which is composed of a number of classes. For a given class (lifeline) in a particular use case, we calculate the number of classes it is interacting within the interaction of the use case. We refer to this as the Number of Internal Connections (NOIC). Based on this information, we calculate the Number of External Connections (NOEC) for each class in a use case behavior as follows:

$$NOEC_{class} = NASC_{class} - NOIC_{class} \quad (1)$$

Hence, NOEC is the measure of the number of classes that might be affected because of any change occurring to the description of the class. Hence, the Impact Factor metric is a summation of all classes external to the use case that may be affected because of a change made to the requirement specification modeled by the respective use case. The Impact Factor is thus calculated as follows:

$$IF_{use\ case} = \sum_{class} NOEC_{class} \quad (2)$$

The Ripple Effect model smell identifies classes most affected by a change in the functional requirement of the system and tries to solve this by localizing changes through model refactoring operations over all participating views. In order to quantify an acceptable Impact Factor metric for a use case we use a maximum threshold value $UP_{IF}$. Since this upper limit threshold value is not available in the literature, we consider the 70/30 principle. Hence, the upper limit is equal to:

$$UP_{IF} = 0.3 * NCM, \quad (3)$$

where NCM is the number of classes in the system. This ensures that 30% of change is allowed (i.e., 70% should be stable and not affected). The pseudo code listed in Table 65 describes the steps required for automated detection of the ripple effect model smell.

TABLE 65

| Ripple Effect Algorithm /* ripple effect */ |  |
| --- | --- |
| 1 | start; |
| 2 | read Model |
| 3 | for (each use-case in the Model) |
| 4 | read UC |
| 7 | if (IF(UC) >= $UP_{IF}$) |
| 8 | {uc-list} = {uc-list} U UC |
| 9 | end if |
| 10 | end for |
| 11 | return uc-list |
| 12 | stop |

Regarding model refactoring mechanics, the refactoring name is Class Responsibility Assignment. The parameter is List ucNames, where ucNames is the list of the use cases that are not stable. The precondition is that the name of the new class (newClass) does not conflict with the name of an existing class within the model.

For each use case in the ucNames list, the class (lifeline) contributing most the value of IF is selected. The resolution of this smell requires identifying applicability of Single Responsibility principle, part of the design principles proposed in literature of the prior art. The Single Responsibility principle targets cohesion. There should never be more than one reason for a class to change. If a class has more than one responsibility, then they become coupled. Changes to one responsibility may impair or inhibit the class' ability to meet the others. The refactoring operations listed in Table 66 are applied to divide responsibility.

TABLE 66

Refactoring Operations for Dividing Responsibility

1. Create Sub Class refactoring is used to create two sub classes from the names provided in the newClass list.
2. Push Down Method refactoring is then used to push the related alternatives behavior to the sub classes. This assigns responsibility of the behavior (method) using polymorphic operations to the classes for which the behavior varies.
3. Finally, Substitute Lifeline refactoring is applied to replace the lifelines with their appropriate child classes from the structural view.

Figure 57:
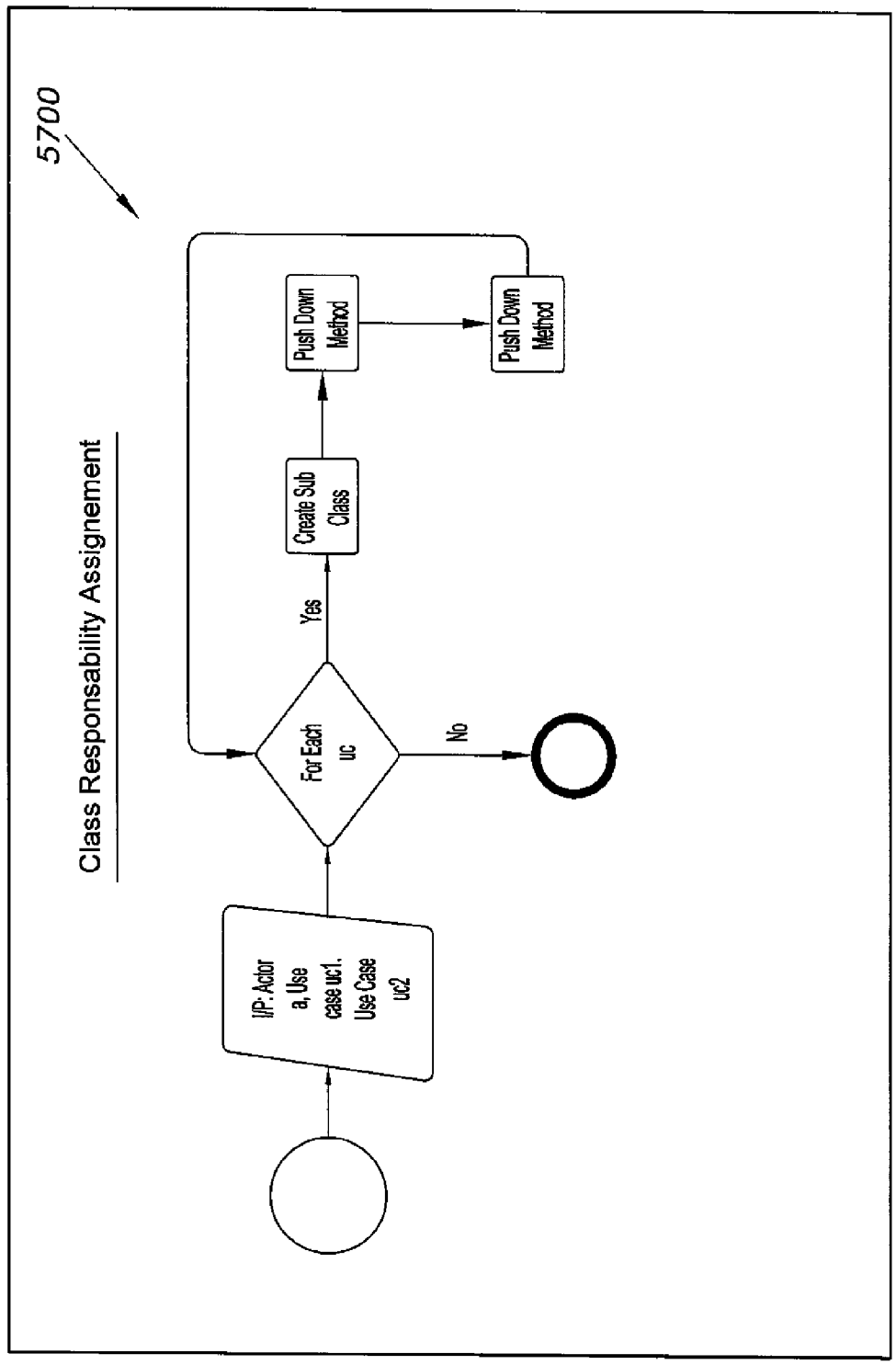
FIG. 57 is a block diagram showing Class Responsibility Assignment Refactoring according to the present invention.

FIG. 57 shows the ordering 5700 of the composite refactoring Class Responsibility Assignment. There are no post conditions.

Figure 58:
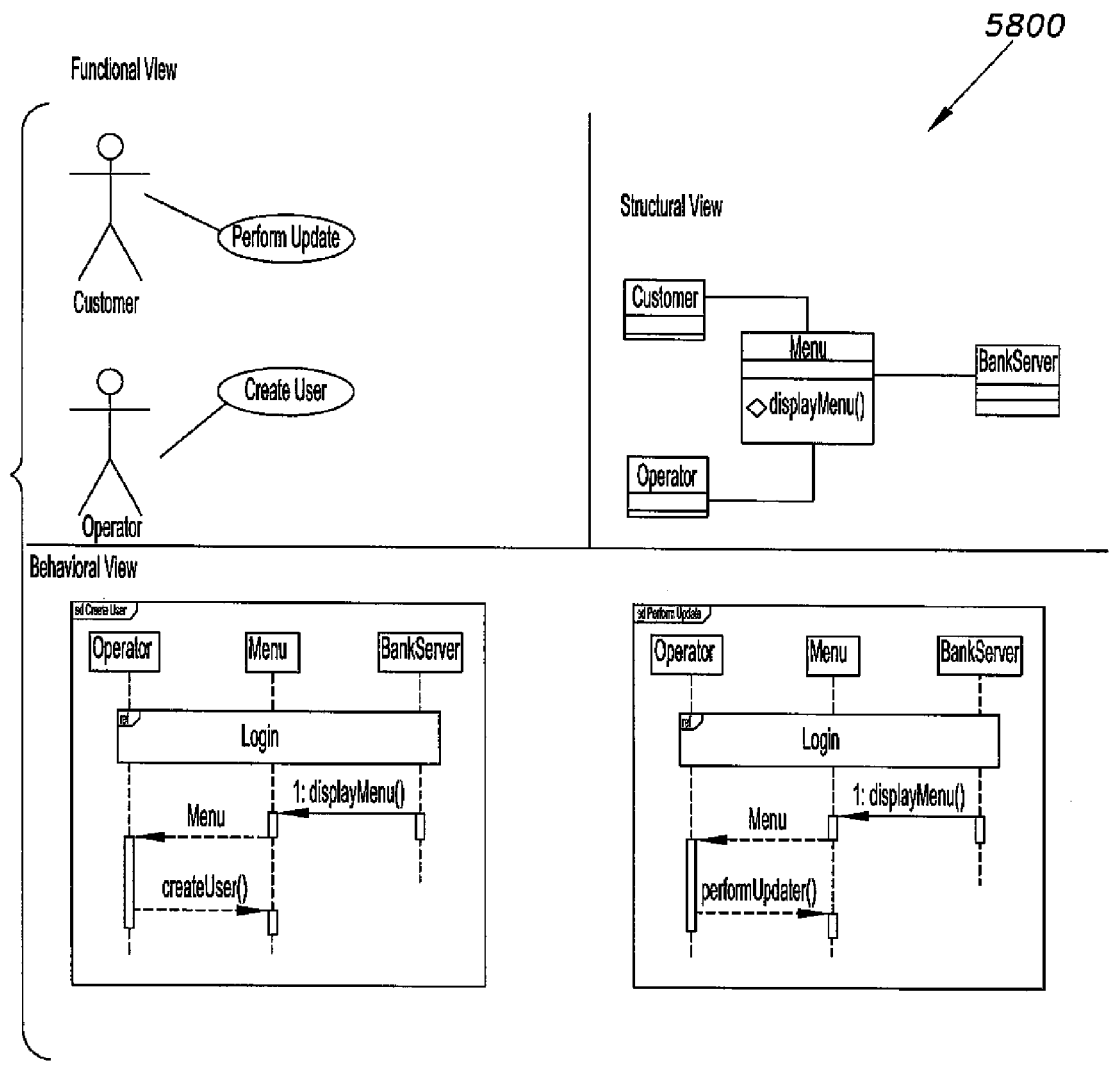
FIG. 58 is a block diagram showing an excerpt of the NBS model views depicting Ripple Effect Smell.
Figure 59:
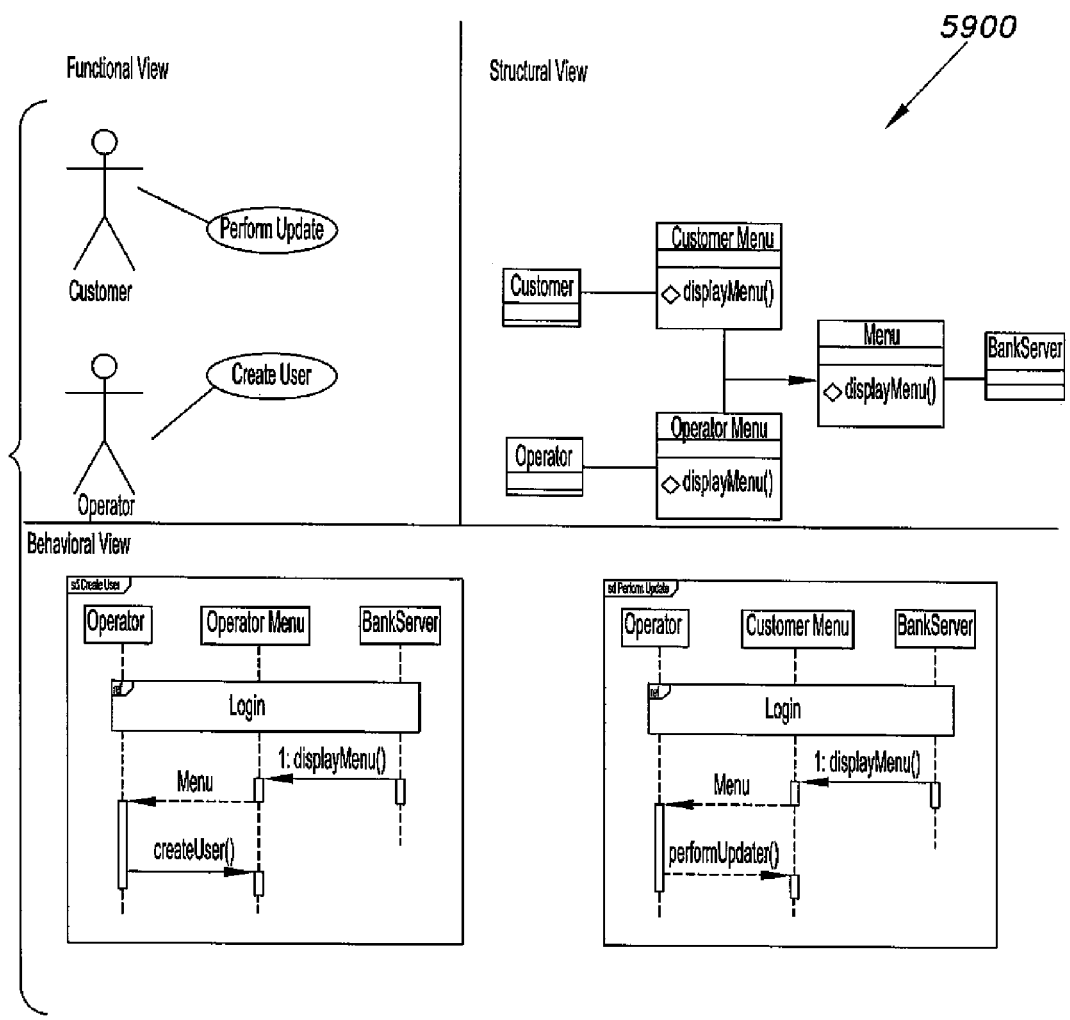
FIG. 59 is a block diagram showing an excerpt of the NBS model views after refactoring according to the present invention.

Since a complete example of this model smell detection and resolution is difficult to portray, we illustrate an abstract example using the same NBS system. The two actors Customer and Operator of the NBS system access their functionality through a menu that is handled by the Menu Class. Two use cases considered for this illustration are Update Information and Create User. FIG. 58 shows a subset 5800 of the model views from the NBS system that depicts the ripple effect model smell. FIG. 59 depicts a refactored version 5900 to solve this problem. In the refactored version, two subclasses are employed OperatorMenu and CustomerMenu of the class Menu. Each of the responsibilities is assigned to the subclass individually. As a result, displayMenu is implemented with these subclasses separately. Thus, the function of displaying operator menu is implemented in the class OperatorMenu without any alternatives of customers and the operator; these conditional branches are realized by means of polymorphism of displayMenu in the subclasses. The refactoring operations listed in Table 67 are used to obtain the refactored version.

TABLE 67

Refactoring of Menu Classes

| | |
|---|---|
| 1. | CreateSubClass (Menu, OperatorMenu. |
| 2. | CreateSubClass (Menu, CustomerMenu). |
| 3. | PushDownOperation (Menu, displayMenu) |
| 4. | SubstituteLifeline (Menu, OperatorMenu) |
| 5. | SubstituteLifeline (Menu, CustomerMenu) |

A class that is coupled to a large number of other classes, and would produce a large number of changes throughout the system in the event of an internal change (due to a change in the use case specification the class is part of), contributes to the Ripple Effect smell. By the definition, a class that presents this smell tends to be coupled to a large number of other classes. Hence, removing this smell reduces the coupling between the classes in its structural view. This in turn localizes the effect on any change made to the behavior of the use case to classes included within the use case only and reduces their impact on other classes.

Ripple Factor is a result of improper responsibility distribution within the software model beginning from its functional view in high-level design phase and propagating to its structural view in low-level design phase. Proper assignment of responsibility of classes based on the information from the functional view will not cause any side effects within the design model. It will in turn make the design more resilient to change by localizing changes and demonstrate effective use of object-oriented design principles.

Figure 60:
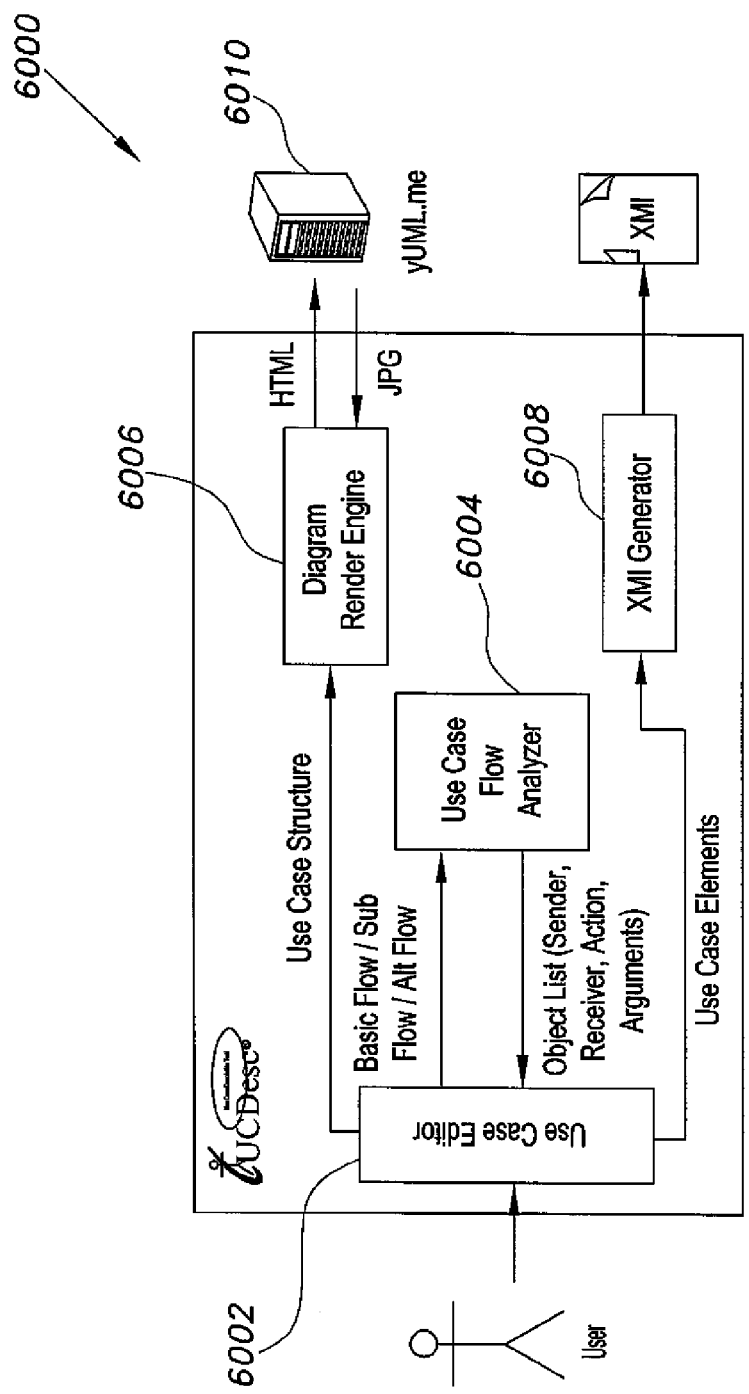
FIG. 60 is a block diagram showing a High-Level Architecture of the UCDesc Tool according to the present invention.

The present refactoring method may include a use case modeling tool that takes advantage of the fact that all the steps in the flow of events of a use case are available as an attribute value. An exemplary tool 6000 shown in FIG. 60 includes UCDesc, comprised of subsystems which include a use case editor 6002 operably connected to a use case flow analyzer 6004, a diagram render engine 6006, and an XMI generator 6008.

One of the most important features offered by UCDesc is the inclusion of use case flow analyzer 6004. This module accepts the steps from the flow of events and identifies for each step, the sender, receiver, action and arguments. The use case flow analyzer 6004 performs a tagging step in which each step from the flow of events is tagged using part-of-speech (POS) tagging to distinguish nouns, verbs and adjectives in the sentences as candidate features that indicate syntactic structure. The Stanford POS tagger is used by UCDesc to accomplish this task. Additionally, the use case flow analyzer 6004 performs a mapping step in which based on the syntactic structure derived from the POS tagger, the mapping table is used to identify the objects of the flow step. Part of this mapping is based on prior art literature. Table 68 lists the mapping of syntactic structure of sentences into use case objects.

TABLE 68

Mapping Syntactic Structure of Sentences into Use Case Objects

| No. | Syntactic Structure | Sender | Receiver | Action | Arguments |
|---|---|---|---|---|---|
| 1 | subject verb object | subject | object | verb | — |
| 2 | subject verb1 object1 verb2(object2) | subject | object1 | verb2 | object2 |
| 3 | subject verb object adjective | subject | object | be + adjective | adjective |
| 4 | subject verb object1 participle (object2) | subject | object1 | verb participle | (object2) |
| 5 | subject verb object1 object2 | subject | object1 | set + object2 | — |
| 6 | subject verb1 object conjunctive to verb1 (object1) | | subject | verb1 | object, verb1 (+object1) |
| 7 | subject verb gerund object | | subject | verb | gerund verb (+object) |
| 8 | subject verb object1 preposition object2 | subject | object2 | verb | object1 |
| 9 | subject verb (for) complement | | subject | verb | complement |
| 10 | subject verb | | subject | verb | |
| 11 | subject be predicative | | subject | be + predicative | |
| 12 | subject verb preposition object | | subject | verb + preposition | object |

Figure 61:
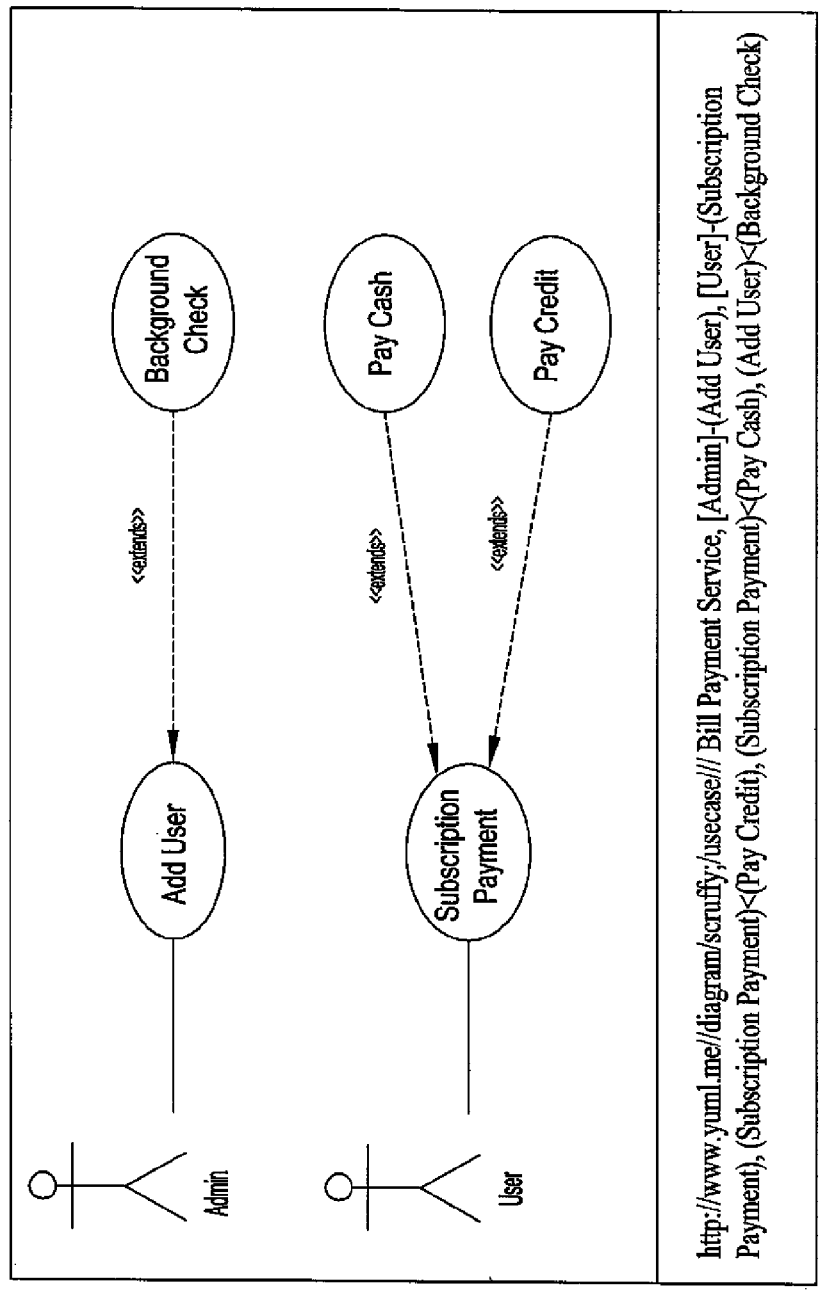
FIG. 61 is a diagram showing a yUML Link and the corresponding Use Case Diagram according to the present invention.

The diagram render engine 6006 renders the use case diagrams. UCDesc does not provide a built-in diagramming utility and hence uses a web-based use case diagramming tool known as yUML. An appropriately constructed link (or URL) is accepted by the yUML server which then produces an image file with the use case diagram. This diagram is displayed in the systems web browser. It is the responsibility of the diagram render engine 6006 to accept use case structural information from the use case editor 6002 and generate an HTML file to be passed on to the yUML server 6010. The structural information includes actor-use case and use case-use case relationships. An example of the hyperlink generated and a sample rendered diagram 6100 is shown in FIG. 61.

The XMI generator module 6008 generates XMI output of the use case diagram. In order to specify the structure of the flow of events in use cases, an extended version of the use case metamodel is provided. This extended use case metamodel is shown in FIG. 17. The XMI is based on an exemplary XML Schema.

Figure 62:
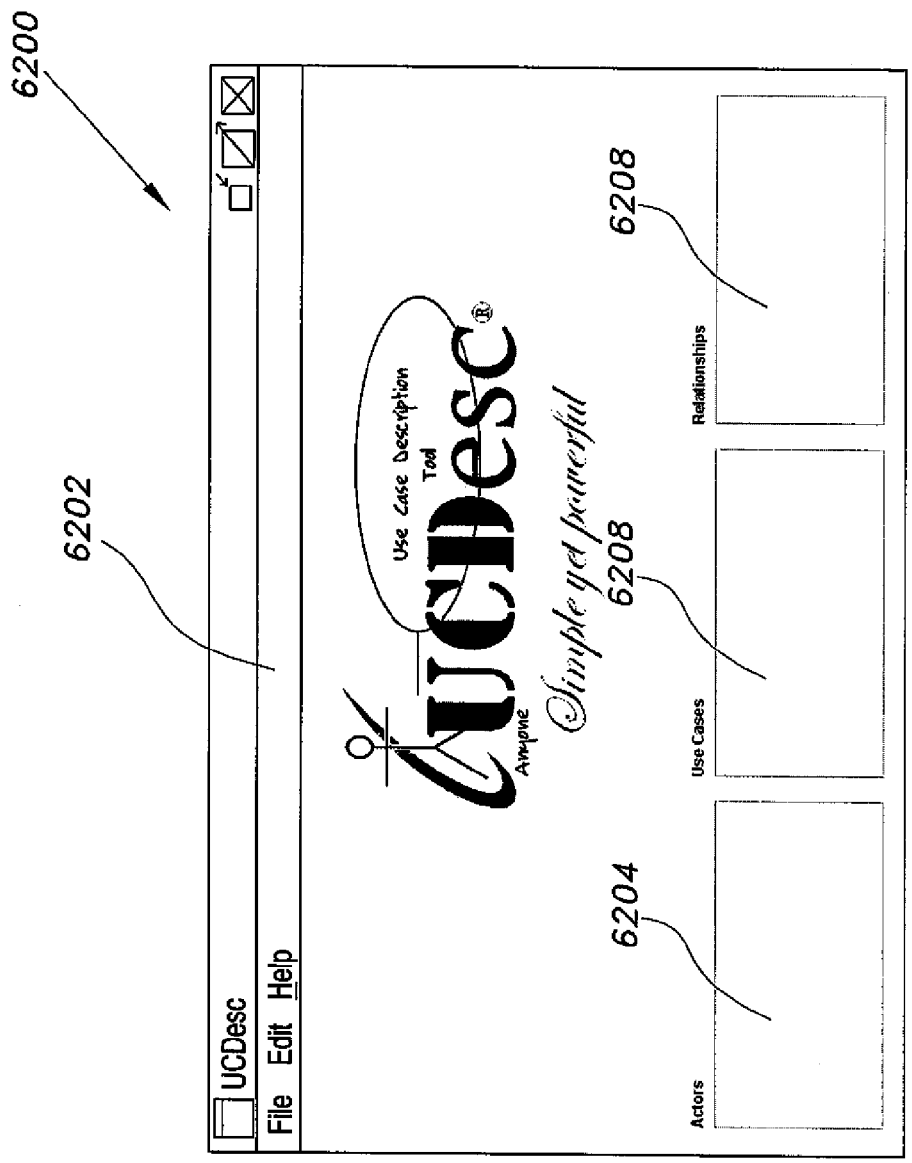
FIG. 62 is a screenshot showing the UCDesc Main Layout according to the present invention.

UCDesc is a simple use case description tool built on Java programming platform. The primary objective of UCDesc is to allow users to compose use case descriptions and provide the capability of exporting it to XMI. The main layout 6200 of UCDesc is shown in FIG. 62.

The main layout consists of a top menu bar 6202 and three panels at the bottom: Actor 6204, Use Cases 6206 and Relationships 6208. The Actors panel 6204 lists all the actors available in a project, the use cases panel 6206 lists all the use cases available in the project and the relationships panel 6208 lists all the use case relationships (include and extends) available in the project. Users can add actors and use cases making use of the options available in the Edit Menu. Relationships are added automatically when the user adds them to a particular use case description.

Figure 63:
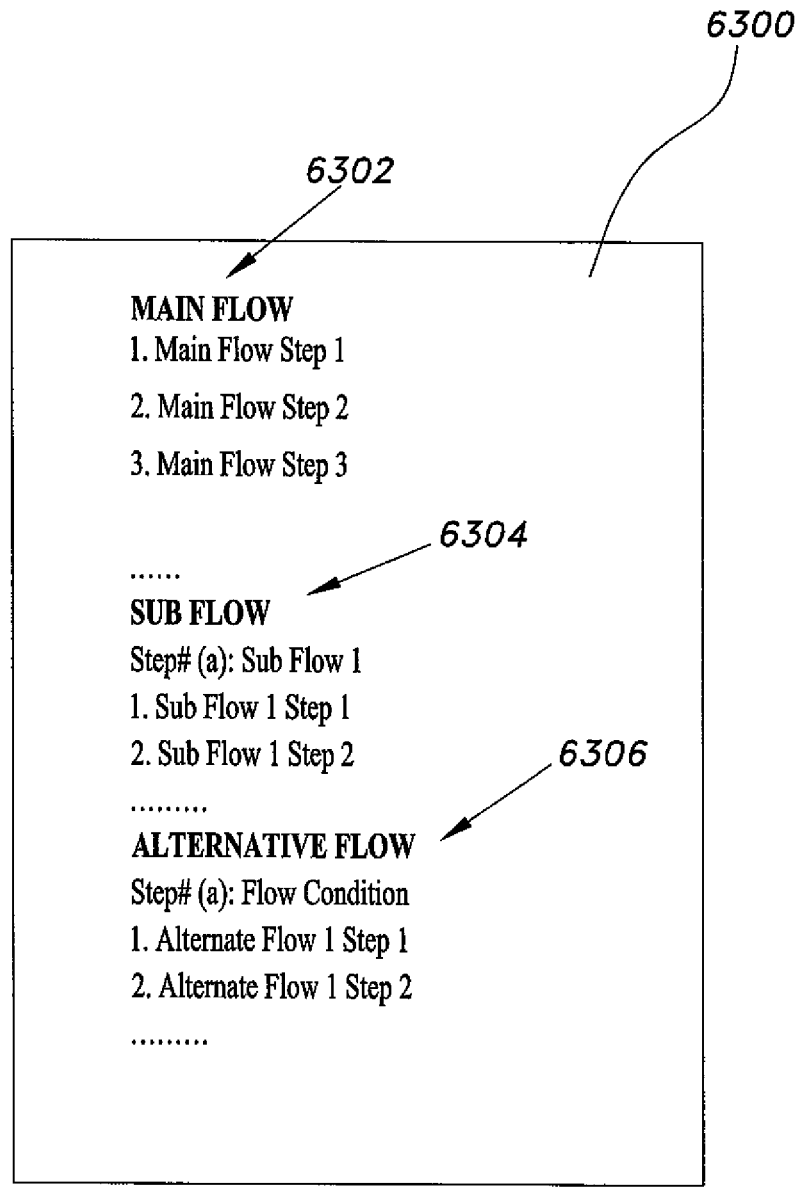
FIG. 63 is a diagram of a listing showing the UCDesc Use Case Description Format according to the present invention.

The format of use case description template followed by UCDesc needs to be defined here for comprehension. Composing use case flows requires the understanding of use case step numbering. In order to follow the different paths through a use case, the use case numbering scheme for the flow of events plays an important factor. Since there is no specific UML specification regarding the numbering scheme, the format 6300 adopted by UCDesc is shown in FIG. 63. The steps numbered 1, 2, 3 and so on make up the main flow 6302. The sub flow 6304 and alternative flow 6306 are specified after the main flow 6302. The numbering of the sub flows and the alternative flows includes the step # where they can be invoked followed by a character (a-z) in case if more than one sub or alternative flow can be invoked at the same step of the main flow 6302. Sub flows 6304 and alternative flows 6306 can themselves have sub and alternatives flows. Where to continue the execution after the end of a sub or an alternative flow is specified by a "Return" statement which indicates the return step. If there is no "Return" statement, the use case ends. Moreover, a use case can be included into another use case by using the anchor Include in the flow step followed by a use case name, e.g., "1. Include Login". At step 1 in the main flow, the use case Login is invoked. Additionally, extending a use case is a more complicated than the inclusion case. Before extending a use case, extension points must be defined in the base use case. A use case can be extended by another use case by including the extension point name within curly braces in the flow step of the base use case. Once defined, an extension can be added as, e.g., "2. {Transfer}", which means that at step 2 in the main flow, the use case mentioned in the Transfer extension point is invoked upon successful evaluation of the extension constraint included in the referred extension point. The extension point is typically defined as "Transfer [transaction=transfer]: Transfer, return: 6".

Figure 64A:
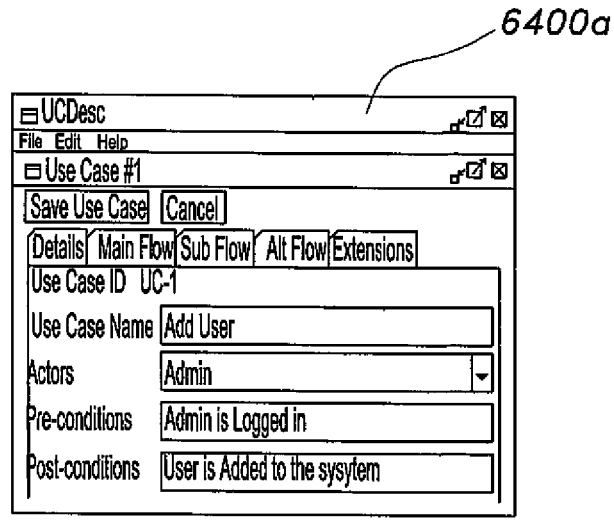
FIG. 64A is a screenshot showing a Use Case Description graphical user interface according to the present invention.
Figure 64B:
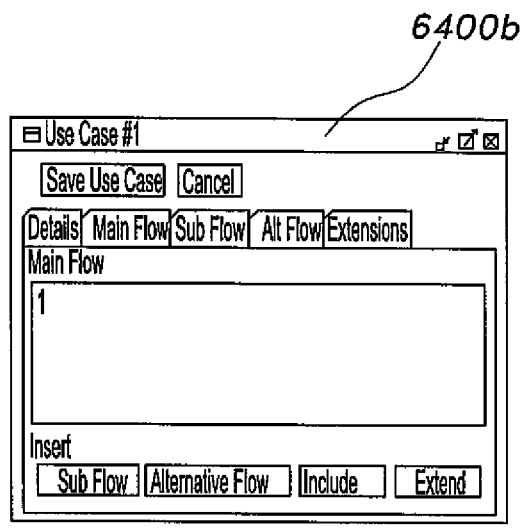
FIG. 64B is a screenshot showing a Flow Authoring graphical user interface according to the present invention.
Figure 65B:
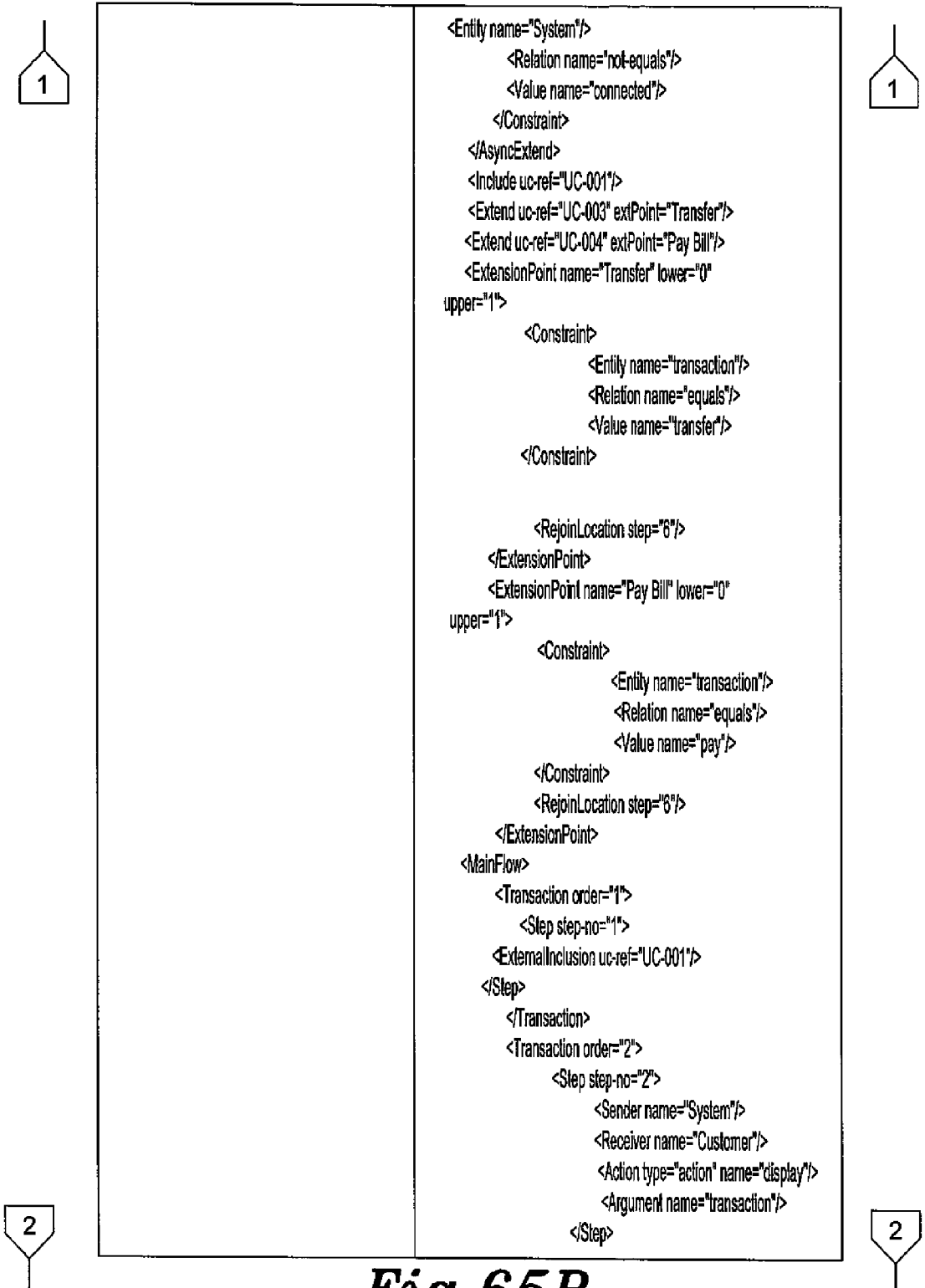

Screenshots 6400a and 6400b of the UCDesc windows that allow users to insert use case description details and author various flows are shown in FIGS. 64A and 64B, respectively. An exemplary use case flow description 6500a and its corresponding XMI Specification 6500b conforming to the extended use case metamodel are shown in FIG. 65.

Although the UCDesc tool fulfills its basic responsibility of allowing users to create and edit use case descriptions and export them to as an XMI file, the tool has some limitations for it to be used as a complete use case description tool. The tool lacks a built-in diagram rendering engine and hence require users to have an active internet connection to view a diagrammatic representation of the structural view of a use case diagram. Another limitation is the lack of a glossary function as provided by other commercial tools in the market. Inclusion of this feature will enhance the use case analysis functionality provided by UCDesc.

Based on the proposed integrated metamodel, we have implemented a prototype tool called IntegraUML (UML Model Integration and Refactoring Tool). IntegraUML is a tool to support model integration and transformation on UML models imported in the form of an XMI file. The UML models accepted by IntegraUML are Class diagrams, Sequence diagrams and Use Case diagrams. XMI models are imported by the tool and integrated into an intermediate format, which then is used for refactoring. IntegraUML is implemented on Java programming platform and makes use of the standard XML Parser to analyze the UML models.

Figure 66:
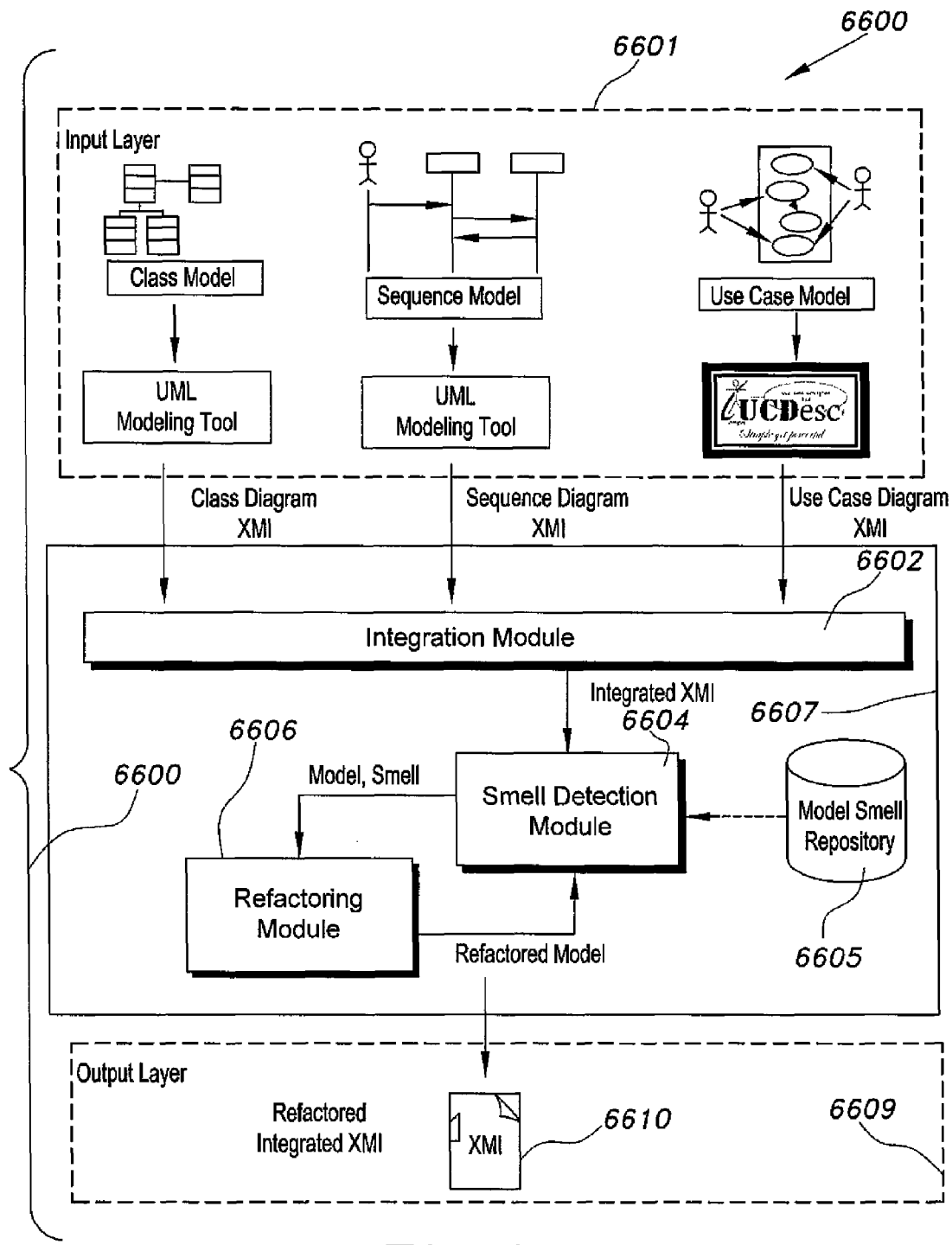
FIG. 66 is a block diagram showing the high-level architecture of the IntegraUML tool according to the present invention.

FIG. 66 illustrates an IntegraUML tool possessing a high-level architecture 6600 comprised of an input layer 6601, a main engine layer 6607, and an output layer 6609. The inputs to the tool are XMI files representing the UML models. The format of the XMI file accepted by IntegraUML is described in the next subsection. The main engine 6607 is composed of several modules that collectively operate to integrate and refactor the input models.

The integration module 6602 makes use of the standard Java XML API to parse the input models and write them to a single integrated XMI file. Particularly, the Document Object Model (DOM) API is used. DOM represents XMI as trees of nodes.

Regarding the Smell Detection Module 6604, Model smells in the IntegraUML tool are defined in XQuery and stored in the Model Smell Repository 6605. XQuery is conceived as a language for querying XML files, in the same way as SQL is used for querying relational databases. The smell detection module 6604 is build using the Saxon Query processor. Each smell, in the form of a query, from the repository is executed over the integrated model. If a smell exists in the integrated model, the model along with the smell is passed on to the Refactoring module 6606. Model smells in the repository are organized in an order to minimize any side-effects and maximize refactoring opportunity detection over the integrated model.

The refactoring module 6606, based on the detected smell, applies a composite refactoring to remove the model smell. A composite refactoring is composed of several primitive refactorings which are applied in an error-free manner. IntegraUML is a semi-automatic refactoring tool. Hence all refactorings before application are confirmed from the user. After executing all the smells present in the repository, the final refactored model is stored and outputted in the form of a refactored integrated XMI file 6610.

Figure 67:
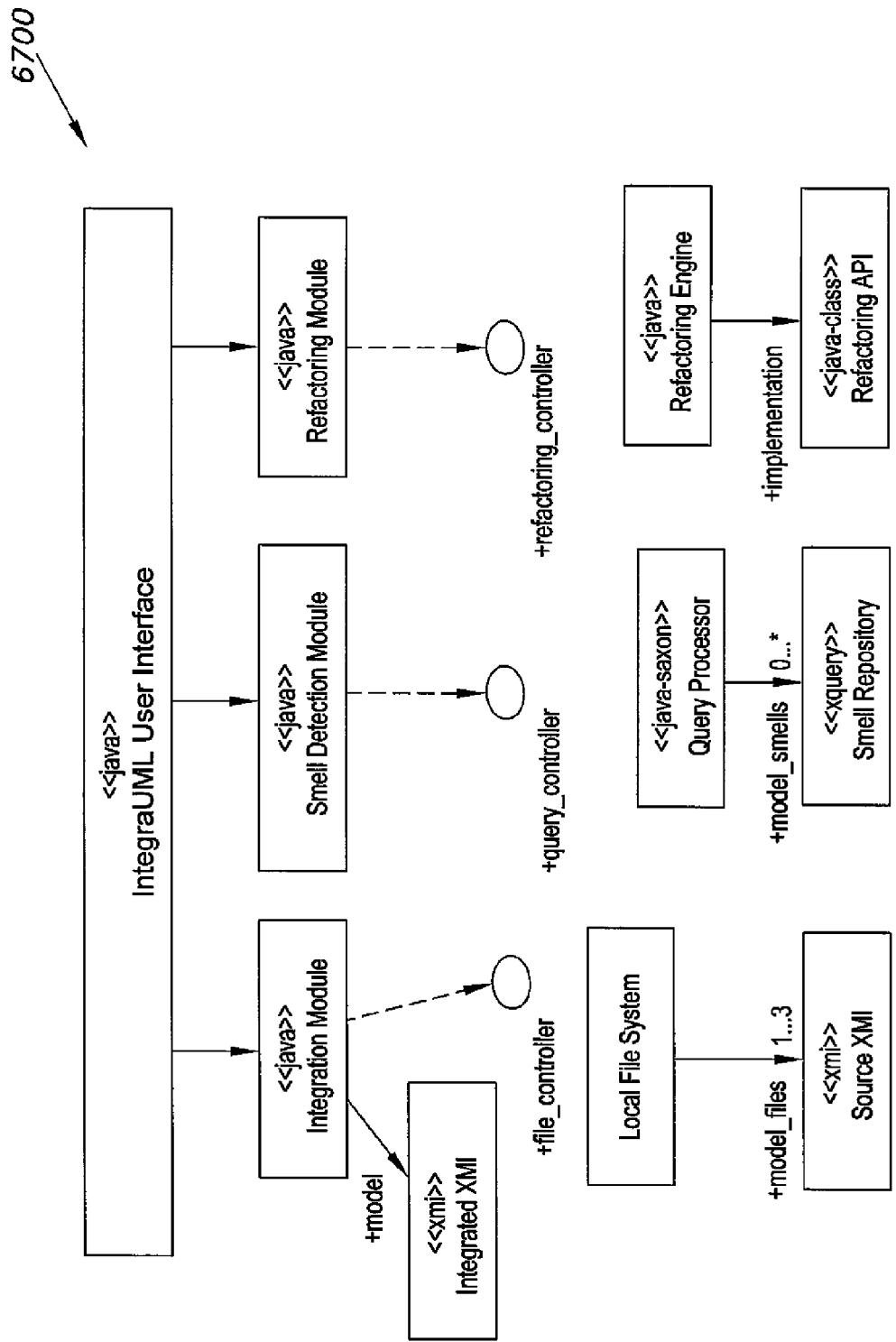
FIG. 67 is a block diagram showing a platform-specific architecture of the IntegraUML tool according to the present invention.

A platform-specific mapping 6700 of the IntegraUML architecture is given in FIG. 67. Different components are represented by a platform-specific view of their realization. The <<java>> stereotype reflects a java implementation; the <<xmi>> stereotype reflects an XMI file; the <<java-saxon>> stereotype reflects a java implementation using the saxon xquery processor; the <<xquery>> stereotype reflects an xquery file; and the <<java-class>> stereotype reflects a compiled java class.

XMI is a standard format for exchanging UML models between tools. Nonetheless, XMI-based model exchange currently has one major shortcoming. An XMI file exported from one tool is different from an XMI file exported from another tool for the same UML model. There are many different reasons for these dissimilarities. Some prominent ones are listed in Table 69.

TABLE 69

Reasons for Dissimilarity When Exporting XMI Files

1. There are a number of versions of the underlying standards. For appropriate usability, the same version of MOF, XMI and UML must be used in both the exporting and importing tools.
2. There are a number of ways in which a model can be serialized for export.
3. The exporting tool may use a proprietary metamodel that is not based on MOF, the effect of which compromises interoperability.
4. Finally, the most important one is the difference of tag names adopted by different tools.

Figure 68:
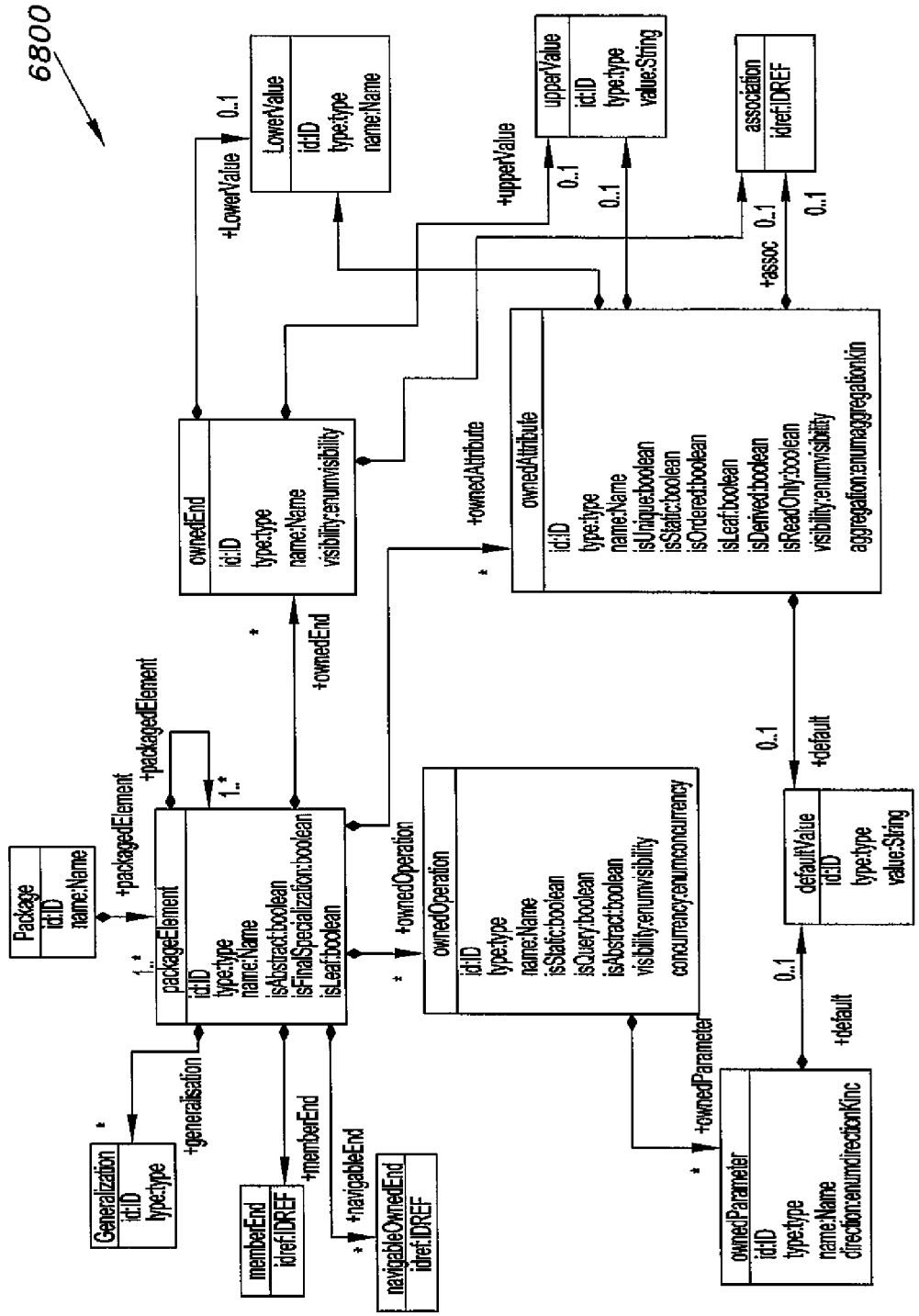
FIG. 68 is a block diagram showing the XML Schema Diagram of the UML Class Diagram, according to the present invention.
Figure 69:
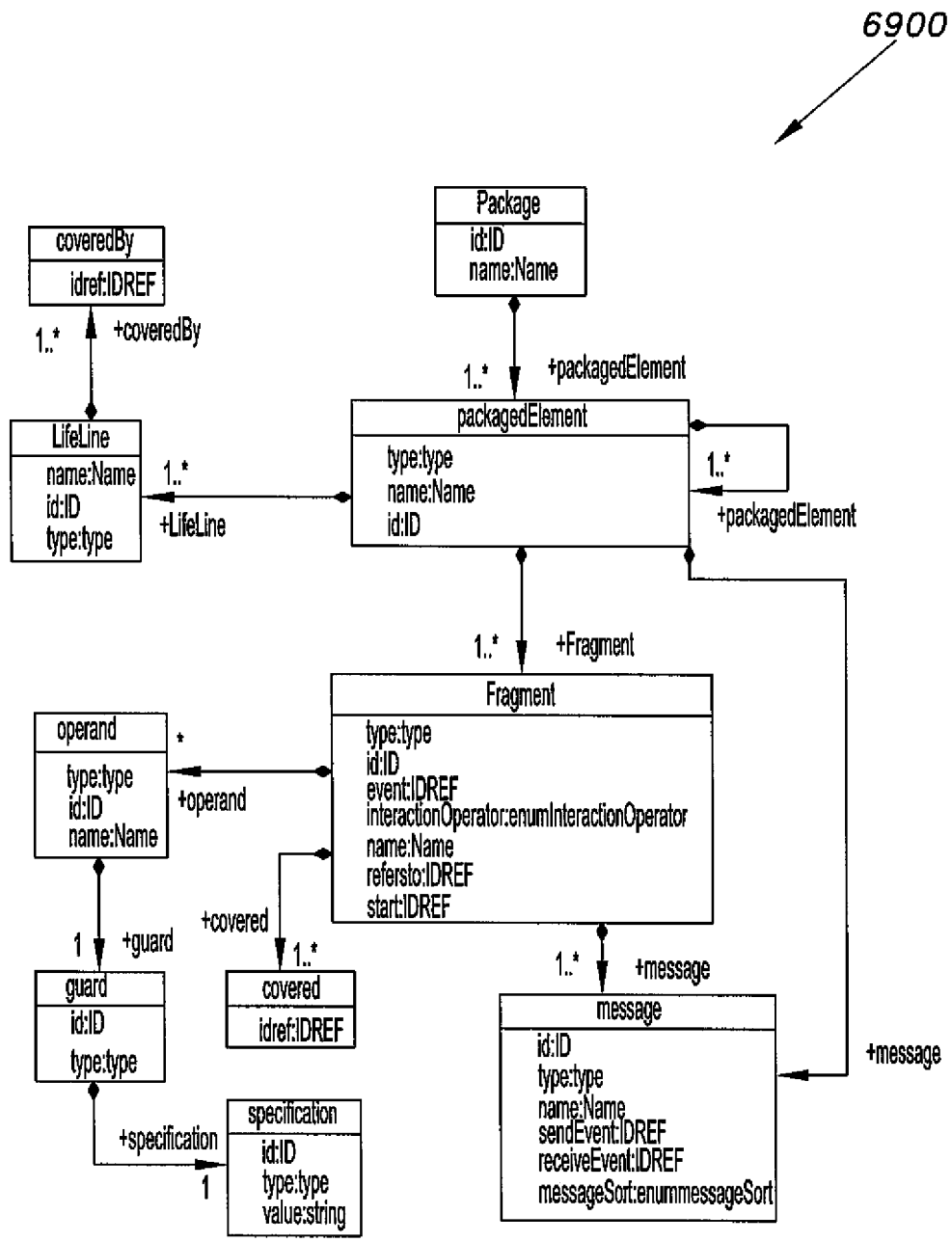
FIG. 69 is a block diagram showing the XML Schema Diagram of the UML Sequence Diagram according to the present invention.

In order to be consistent in our approach, we decided to follow the current XMI Schema Version 2.1 and UML version 2.4. An XML Schema class diagram 6800 for the accepted UML class model and XML Schema sequence diagram 6900 for the UML sequence model are shown in FIGS. 68 and 69, respectively. An exemplary XML Schema diagram for the Use Case model is used as the standard UML CASE tool exported XMI does not include its behavioral information. A UML CASE tool that supports these schemas (provided by OMG) is Altova's UModel.

The type attribute of the packagedElement element identifies the context of the element whether it is a package (type="uml:Package"), class (type="uml:Class"), association (type="uml:Association"), association class (type="uml:AssociationClass") or a data type (type="uml:DataType"). Similar to the class diagram schema, the type attribute of the packagedElement element identifies the context of the element. It can either be a package (type="uml:Package"), interaction (type="uml:Interaction") or an event (type="uml:CallEvent").

Figure 70:
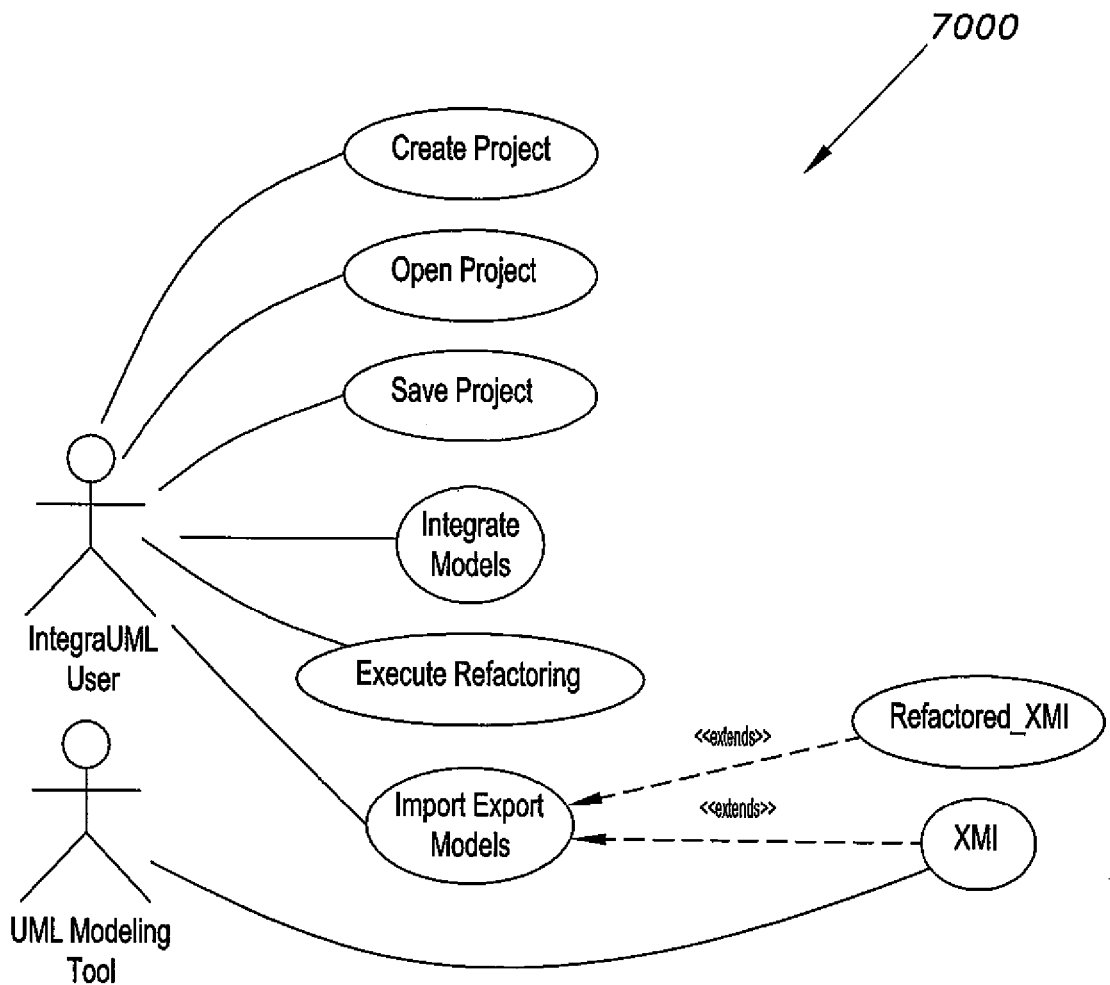
FIG. 70 is a pictorial diagram showing a Use Case Diagram for the IntegraUML tool according to the present invention.

IntegraUML is prototype UML model integration and refactoring tool built in java. Its main usage scenario is to import UML XMI models and generate an integrated model for the purpose of refactoring application. FIG. 70 shows the high-level use cases 7000 that are most pertinent to a developer using IntegraUML.

Figure 71:
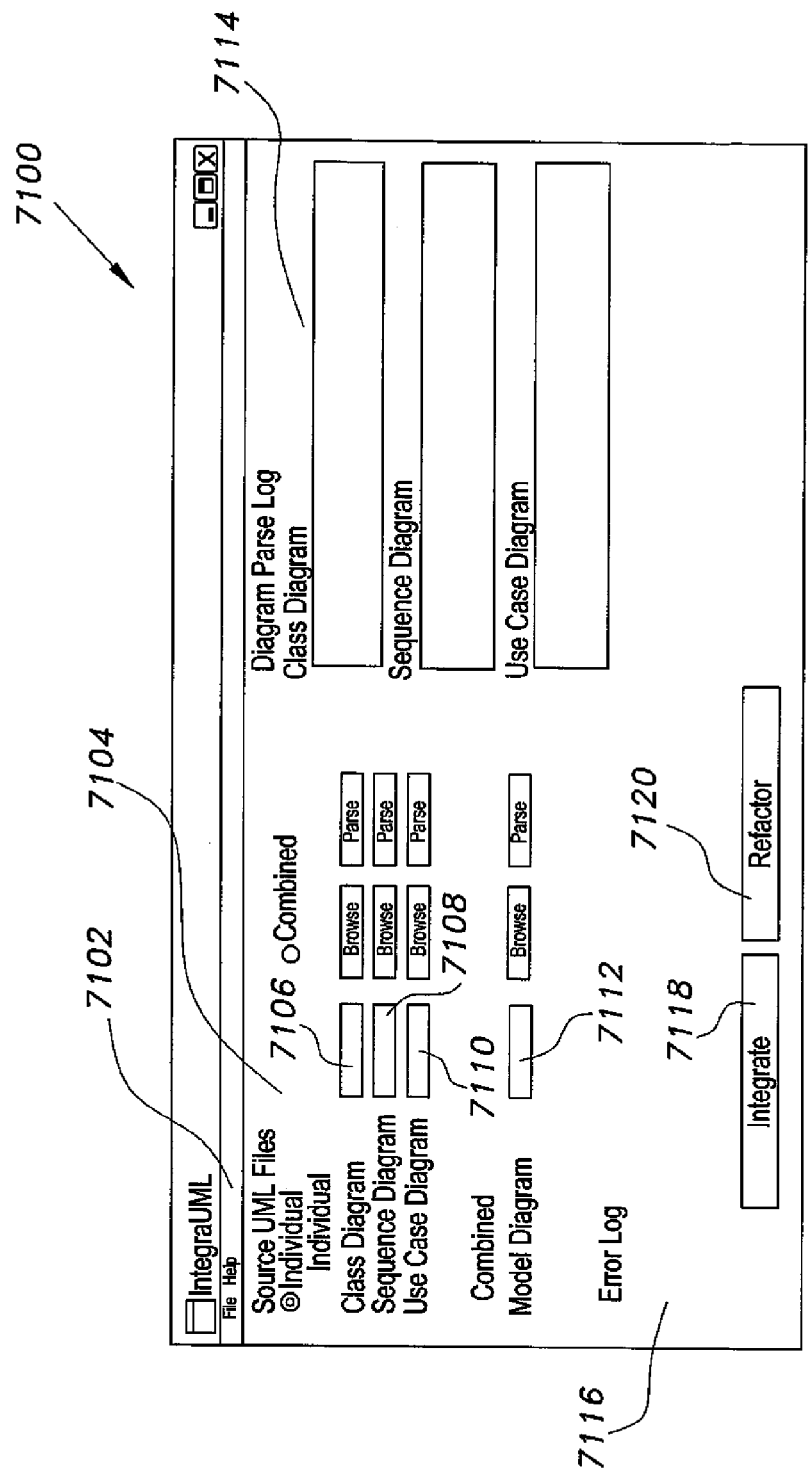
FIG. 71 is a screenshot showing the IntegraUML Main Layout according to the present invention.

The main layout 7100 of IntegraUML is shown in FIG. 71. It consists of a top menu bar and three panels. The Source UML Files panel 7104 is the main input panel. IntegraUML allows users to perform XMI file uploads via class diagram upload field 7106, sequence diagram upload field 7108, use case diagram upload field 7110 or combined upload field 7112. The browsing options are enabled based on the selection of an appropriate radio button at the top of the panel. XMI files can be browsed and parsed from this panel. The results of the parsing process are displayed in the Diagram Parse Log panel 7114. Typical parse log information includes diagram version, tool exported from and statistical information like number of classes, number of interactions and the like.

The Error Log panel 7116 displays any errors that occur during the model integration process. The Integrate 7118 and Refactor 7120 buttons are enabled upon successful model parsing and integration respectively. The refactoring process is an interactive one. Upon detection of a model smell, IntegraUML displays and confirms the refactoring operation from the user before its application.

IntegraUML is a semi-automatic model refactoring tool. It requires the user to confirm refactoring actions before their application. A fully automated refactoring tool requires an additional module that could remember user actions and only confirm those not already applied. Another limitation of the IntegraUML tool is interoperability. As the output of IntegraUML is based on a proprietary metamodel, developed as part of this work, using it with other UML modeling tools is not suitable. Although this could be circumvented by using a model disintegration module, which disintegrates the refactored model into class, sequence and use case diagrams, and then using XSLT transformation to map the resultant XMIs to a particular tools requirement. Finally, IntegraUML accepts a particular format of XMI as input to the tool. As there are myriad formats of XMI available for UML models, providing support for each is difficult to achieve.

It is to be understood that the present method is not limited to the embodiments described above, but encompasses any and all embodiments within the scope of the following claims.

We claim:

1. A computer-implemented unified modeling language (UML) model integration and refactoring method, comprising the steps of:

accepting and inputting for further processing a plurality of UML metamodels, the UML metamodels including structural, behavioral, and functional providing structural, behavioral, and functional views diagrams of a system, wherein the structural view diagrams inputting step includes the step of inputting a UML class diagram metamodel, the behavioral view diagrams inputting step includes the step of inputting a sequence diagram metamodel, and the functional view diagrams inputting step includes the step of inputting a UML use case diagram metamodel;

extending the functional and the behavioral metamodels, wherein the extending step further comprises the steps of:

extending the use case diagram metamodel with behavior information in order to establish its relation to the sequence diagram metamodel; and extending the sequence diagram metamodel to provide model traceability and act as a liaison between the use case diagram metamodel and the class diagram metamodel, wherein the sequence diagram metamodel extension further comprises the steps of:

forming a first new meta-class, SingleOperand, and a second new meta-class, MultiOperand, the new meta-classes deprecating at least one well-formedness rule enforced through constraints on the sequence diagram;

adding a single meta-class for each InteractionOperandKind to the extended metamodel; and breaking out the each InteractionOperandKind metaclass into a subclass selected from one of said SingleOperand and said MultiOperand metaclasses, thereby permitting a subset of combined fragment operators to be added as metamodel extensions;

composing an integrated UML model derived from the extended metamodels, the integrated UML model integrating the structural, behavioral, and functional system views, wherein the composing further comprises the steps of:

identifying, based on the mapping links, syntactic similarity (SYN) correspondence relationships among the at least two meta-classes, the SYN correspondence relationships indicating that the meta-classes are syntactically equivalent;

merging together the syntactically similar meta-classes, in the resulting metamodel;

identifying, based on the mapping links, Semantic Similarity (SEM) correspondence relationship indicating that the two meta-classes related to each other by this relation are semantically equivalent;

merging together said semantically similar meta-classes based on predefined correspondence rules;

determining, based on an Inclusion (INC) mapping link, that a subject meta-class is included in the resulting metamodel although no similarity exists between the subject meta-class with other meta-classes;

defining correspondence rules to describe an association of the subject meta-class with other meta-classes in said resulting metamodel;

excluding from the resulting metamodel metaclasses having an Exclusion (EXC) mapping link;

determining, based on a Dependency (DEP) mapping link that the at least two meta-classes related to each other by the DEP relation are dependent;

retaining the DEP related at least two meta-classes in the resulting metamodel; and wherein the use case and sequence metamodels are integrated into the resulting metamodel;

detecting anti-patterns in the integrated UML model, the anti-patterns defining refactoring opportunities and transformation operations applicable to the integrated UML model, wherein detection step further comprises the step of detecting and removing ripple effect smells over the use case, sequence and class diagrams, further wherein the ripple effect smell detection and removing step further comprises the steps of:

calculating a number of associations linked to a Class (NASC) for each class;

calculating a number of internal connections (NOIC);

calculating a number of external connections (NOEC) for each class in a use case behavior, said NOEC calculation being characterized by the following relations, $$NOEC_{class} = NASC_{class} - NOIC_{class}$$

where NOEC is a measure of the number of classes that may be affected because of any change occurring to the description of the class;

calculating an impact factor (IF) for each use case, said IF calculation being characterized by the following relation, $$IF_{use\ case} = \sum_{class} NOEC_{class};$$

calculating a maximum threshold value $UP_{IF}$ which quantifies an acceptable impact factor (IF) for each use case, said maximum threshold value calculation being characterized by the following relation, $$UP_{IF} = 0.3 * NCM,$$

where NCM is the number of classes in the system;

creating a list of use cases exceeding said maximum threshold value $UP_{IF}$;

selecting a class contributing most to the value of IF for each use case in the use case list;

creating two sub classes for each said selected class;

assigning methods from each said selected class to its corresponding two sub classes; and replacing corresponding lifelines with their appropriate child classes from the structural view; and applying the refactoring opportunities and transformation operations to remove the anti-patterns (model smells) from the integrated UML model.

2. The computer-implemented UML model integration and refactoring method according to claim 1, wherein said UML modeling accepting step further comprising the steps of:

inputting diagrams capturing a physical organization of fundamental elements of said system, the physical organization representing said structural view;

inputting diagrams capturing interactions between said system's fundamental elements, the interactions representing said behavioral view; and inputting diagrams modeling workflow and business processes of said system, the workflow and business processes modeling representing said functional view.

3. The computer-implemented UML model integration and refactoring method according to claim 1, wherein said UML model integration comprises the step of incorporating an object constraint language (OCL) metamodel in said UML model integration, said OCL metamodel structurally representing constraints from said class diagrams, invariants and guards from said sequence diagrams, and pre and post conditions from said use case diagrams.

4. The computer-implemented UML model integration and refactoring method according to claim 3, further comprising the step of storing in a database a template which provides rules for said refactoring opportunities and transformation operations definitions.

5. The computer-implemented UML model integration and refactoring method according to claim 1, further comprises the step of utilizing sequences of primitive refactoring operations to form a composite refactoring over said UML model.

6. The computer-implemented UML model integration and refactoring method according to claim 5, further comprising the step of generating a traceability matrix highlighting mapping links between at least two of said metamodels.

7. The computer-implemented UML model integration and refactoring method according to claim 1, further comprising the steps of:

adding a dependency relation between a class meta-class from said class diagram and a lifeline and actor meta-class from said use case and sequence diagrams to a traceability mapping between said class and lifeline and actor UC-SD meta-classes;

adding a dependency (DEP) relation between an operation meta-class from said class diagram and a message meta-class from said use case and sequence diagrams to a traceability mapping between said operation and said message UC-SD meta-class;

adding a syntactic similarity (SYN) relation between a parameter meta-class from said class diagram and an argument meta-class from said use case and sequence diagrams to a traceability mapping between said parameter meta-class and said argument UC-SD meta-classes; and forming a single association having a direction attribute that determines whether an argument from said argument meta-class is an input or an output argument.

8. The computer-implemented UML model integration and refactoring method according to claim 7, further comprising the step of directly mapping constraints from a constraint meta-class from said use case diagram as context to a Constraint meta-class provided by an extension of said OCL metamodel.

9. The computer-implemented UML model integration and refactoring method according to claim 8, further comprising the steps of:
   establishing a semantic similarity (SEM) correspondence relationship between entity and value objects of said use case diagram constraint meta-class and an expression object of said OCL constraint meta-class; and
   establishing a syntactic similarity (SYN) correspondence relationship between a relation object of said use case diagram constraint meta-class and an operator object of said OCL constraint meta-class.

10. The computer-implemented UML model integration and refactoring method according to claim 9, further comprising the steps of:
   using an XMI parser to traverse said integrated UML model while searching for said bad smells;
   invoking a refactoring module to perform said refactoring if a model bad smell exists;
   performing said refactoring based on said rules provided by said template only if said pre-condition is satisfied;
   checking said post conditions over said integrated UML model; and
   rolling back said refactoring operations if said post conditions are not met.

11. The computer-implemented UML model integration and refactoring method according to claim 10, wherein said smell detection step further comprises the step of detecting and removing functional decomposition (creeping featurism) over said use case, sequence and class diagrams.

12. The computer-implemented UML model integration and refactoring method according to claim 11, wherein said functional decomposition detection and removing step further comprises the steps of:
   identifying a use case that is an inclusion use case, has no actors associated with it, and is included only once by another use case, wherein a lazy use case is identified; and
   returning the intersection of lifelines in a parent including said lazy use case and lifelines in said lazy use case if said intersection is a data class.

13. The computer-implemented UML model integration and refactoring method according to claim 12, wherein said smell detection step further comprises the step of detecting and removing multiple personality use cases over said use case, sequence and class diagrams.

14. The computer-implemented UML model integration and refactoring method according to claim 13, wherein said multiple personality use case detection and removing step further comprises the steps of:
   identifying a use case whose implementation contains more than a predetermined high number of classes and whose behavior has more than a predetermined high number of transactions, whereby said use case so identified is a multiple personality use case;
   identifying whether a lifeline has the sole task of delegating message between lifelines, whereby said lifeline so identified is a middle-man lifeline; and
   removing said multiple personality use case and said middle-man lifeline.

15. The computer-implemented UML model integration and refactoring method according to claim 14, wherein said smell detection step further comprises the step of detecting and removing excessive alternation use cases over said use case, sequence and class diagrams.

16. The computer-implemented UML model integration and refactoring method according to claim 15, wherein said excessive alternation use case detection and removing step further comprises the steps of:
   identifying a use case having a number of extension points that exceeds a predetermined number of extension point (NOEP) metric;
   dividing said NOEP exceeding use case into a preamble, body, and post;
   identifying said NOEP exceeding use case as a base use case having excessive alternation model smell when said preamble length is greater than two, said body has only an "alt" fragment, and a length of said post is equal to zero; and
   removing said excessive alternation base use case from said integrated UML model.

17. The computer-implemented UML model integration and refactoring method according to claim 16, wherein said smell detection step further comprises the step of detecting and removing undue familiarity use cases over said use case, sequence and class diagrams.

18. The computer-implemented UML model integration and refactoring method according to claim 17, wherein said undue familiarity use case detection and removing step further comprises the steps of:
   identifying pairs of bi-directionally associated classes;
   examining, for each said bi-directionally associated class pairs, message interactions between said pairs;
   categorizing said message interactions as inappropriate if said pair of classes frequently access data and methods from each other in the form of update and access message exchanges;
   determining that an undue familiarity model smell exists if said pair of classes occurs in interaction parts of more than one use case; and
   removing said update and access messages from said integrated UML model.

19. The computer-implemented UML model integration and refactoring method according to claim 18, wherein said smell detection step further comprises the step of detecting and removing spider's web use cases over said use case, sequence and class diagrams.

20. The computer-implemented UML model integration and refactoring method according to claim 19, wherein said spider's web use case detection and removing step further comprises the steps of:
   selecting an actor associated with multiple use cases where said multiple exceeds an upper limit threshold number of use cases per actor (NUCA);
   associating a behavior signature with each use case associated with said selected actor;
   characterizing said model as exhibiting the spider's web anti-pattern if said selected actor is associated with multiple behavior signatures, wherein a behavior signature is a set of lifelines interacting with said selected actor to realize functionality of said use case in said sequence diagram;
   splitting said selected actor into a plurality of new actors;
   associating each new actor with a subset of use cases assigned to said selected actor;
   removing unwanted associations based on names of the use cases; and
   removing said selected actor from the model thereby redistributing actor responsibility to eliminate said spider's web anti-pattern.

21. The computer-implemented UML model integration and refactoring method according to claim 20, wherein said spider's web use case detection and removing step further comprises the steps of:
creating a new class based on one of the new actors if a lifeline for said selected actor has an incoming call event in its interaction; and
moving said incoming call event to said new class associated with said one of the new actors.

22. The computer-implemented UML model integration and refactoring method according to claim 20, wherein said smell detection step further comprises the step of detecting and removing specters' model smells over said use case, sequence and class diagrams.

23. The computer-implemented UML model integration and refactoring method according to claim 22, wherein said specters' model smell detection and removing step further comprises the steps of:
selecting classes with no attributes and associated with a number of other classes;
characterizing said model as exhibiting said specters' smell if said selected classes are invoked by other classes and merely delegate or simply invoke other classes without receiving any reply;
moving said selected classes' methods to classes using said selected classes' methods;
moving corresponding start method invocations of said selected classes to an invoking lifeline in all interactions including said specters' classes;
inserting an interaction fragment of an inclusion use case into the interaction diagram of the including/base use case at the point of inclusion (ref fragment) if said interaction belongs to said inclusion use case and removal of said specters class result in a no message occurrence except for other inclusions and extensions through a "ref" fragment;
merging said inclusion use case into its including use case; and
removing said selected classes from the structural view of the model to eliminate said specters' class anti-pattern.

24. The computer-implemented UML model integration and refactoring method according to claim 20, wherein said smell detection step further comprises the step of detecting and removing model duplication smells over said use case, sequence and class diagrams.

25. The computer-implemented UML model integration and refactoring method according to claim 24, wherein said model duplication smell detection and removing step further comprises the steps of:
selecting an Actor-Use Case relationship as the point of origin for duplication detection and analysis;
constructing a tree with the actor as a root node for each actor in the model, each tree being composed of multiple paths from said root node to a leaf node;
designating a maximum depth of paths traversed metric as being equivalent to a maximum value among the maximum depth of inclusion relationship (DOIR) and the maximum depth of extension relationship (DOER);
investigating any two of said paths for similarity if the actor root nodes and the extension or inclusion use case leaf nodes are the same;
characterizing said model as exhibiting said model duplication smell if among said any two similar paths the lifelines involved in both interactions are the same and alternatively at least different ones are sub classes of the same super class, and sequence of message interactions among lifelines is the same, size of arguments are same for messages between the same sequence, extension and inclusion use cases are invoked at the same sequence;
creating a new use case to collapse said duplicate paths;
extracting, from said use case sequence diagram of either said any two paths, a complete interaction into said newly created use case;
renaming and merging messages of said two use cases into said newly created use case;
adding a super class to said interaction if different lifelines exist in said two interactions;
adding an association between the actor triggering said two use cases and the new use case; and
isolating and removing said two use cases from the use case model.

26. A computer software product, comprising a non-transitory medium readable by a processor, the non-transitory medium having stored thereon a set of instructions for implementing a unified modeling language (UML) model integration and refactoring method, the set of instructions including a first sequence of instructions which, when executed by the processor, causes said processor to:
accept and input for further processing a plurality of UML metamodels, the UML metamodels including structural, behavioral, and functional providing structural, behavioral, and functional views diagrams of a system, wherein the structural view diagrams inputting step includes the step of inputting a UML class diagram metamodel, the behavioral view diagrams inputting step includes the step of inputting a sequence diagram metamodel, and the functional view diagrams inputting step includes the step of inputting a UML use case diagram metamodel;
extend the functional and the behavioral metamodels, wherein the extending step further comprises the steps of:
extend the use case diagram metamodel with behavior information in order to establish its relation to the sequence diagram metamodel; and
extend the sequence diagram metamodel to provide model traceability and act as a liaison between the use case diagram metamodel and the class diagram metamodel, wherein the sequence diagram metamodel extension further comprises the steps of:
form a first new meta-class, SingleOperand, and a second new meta-class, MultiOperand, the new meta-classes deprecating at least one well-formedness rule enforced through constraints on the sequence diagram;
add a single meta-class for each InteractionOperandKind to the extended metamodel; and
break out the each InteractionOperandKind metaclass into a subclass selected from one of said SingleOperand and said MultiOperand meta-classes, thereby permitting a subset of combined fragment operators to be added as metamodel extensions;
compose an integrated UML model derived from the extended metamodels, the integrated UML model integrating the structural, behavioral, and functional system views, wherein the composing further comprises the steps of:
identify, based on the mapping links, syntactic similarity (SYN) correspondence relationships among the at least two meta-classes, the SYN correspondence relationships indicating that the meta-classes are syntactically equivalent;
merge together the syntactically similar meta-classes, in the resulting metamodel;
identify, based on the mapping links, Semantic Similarity (SEM) correspondence relationship indicating that the two meta-classes related to each other by this relation are semantically equivalent;
merge together said semantically similar meta-classes based on predefined correspondence rules;

determine, based on an Inclusion (INC) mapping link, that a subject meta-class is included in the resulting metamodel although no similarity exists between the subject meta-class with other meta-classes;

define correspondence rules to describe an association of the subject meta-class with other meta-classes in said resulting metamodel;

exclude from the resulting metamodel metaclasses having an Exclusion (EXC) mapping link;

determine, based on a Dependency (DEP) mapping link that the at least two meta-classes related to each other by the DEP relation are dependent;

retain the DEP related at least two meta-classes in the resulting metamodel; and wherein the use case and sequence metamodels are integrated into the resulting metamodel;

detect anti-patterns in the integrated UML model, the anti-patterns defining refactoring opportunities and transformation operations applicable to the integrated UML model, wherein detection step further comprises the step of detecting and removing ripple effect smells over the use case, sequence and class diagrams, further wherein the ripple effect smell detection and removing step further comprises the steps of:

calculate a number of associations linked to a Class (NASC) for each class;

calculate a number of internal connections (NOIC);

calculate a number of external connections (NOEC) for each class in a use case behavior, said NOEC calculation being characterized by the following relations, $$NOEC_{class} = NASC_{class} - NOIC_{class}$$

where NOEC is a measure of the number of classes that may be affected because of any change occurring to the description of the class;

calculate an impact factor (IF) for each use case, said IF calculation being characterized by the following relation, $$IF_{use\ case} = \sum_{class} NOEC_{class};$$

calculate a maximum threshold value $UP_{IF}$ which quantifies an acceptable impact factor (IF) for each use case, said maximum threshold value calculation being characterized by the following relation, $$UP_{IF} = 0.3 * NCM,$$

where NCM is the number of classes in the system;

creating a list of use cases exceeding said maximum threshold value $UP_{IF}$;

select a class contributing most to the value of IF for each use case in the use case list;

create two sub classes for each said selected class;

assign methods from each said selected class to its corresponding two sub classes; and replace corresponding lifelines with their appropriate child classes from the structural view; and apply the refactoring opportunities and transformation operations to remove the anti-patterns (model smells) from the integrated UML model.

* * * * *